(12) United States Patent
Seo et al.

(10) Patent No.: US 9,652,135 B2
(45) Date of Patent: May 16, 2017

(54) MOBILE DEVICE OF BANGLE TYPE, CONTROL METHOD THEREOF, AND USER INTERFACE (UI) DISPLAY METHOD

(71) Applicant: Samsung Electronics Co., Ltd., Suwon-si, Gyeonggi-do (KR)

(72) Inventors: Joon-kyu Seo, Seoul (KR); Young-joon Choi, Uiwang-si (KR); Ji-yeon Kwak, Seoul (KR); Hyun-jin Kim, Seoul (KR); Yeo-jun Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/101,727

(22) Filed: Dec. 10, 2013

(65) Prior Publication Data

US 2014/0160078 A1 Jun. 12, 2014

(30) Foreign Application Priority Data

Dec. 10, 2012 (KR) .................. 10-2012-0143064
Jan. 4, 2013 (KR) .................. 10-2013-0001235
(Continued)

(51) Int. Cl.
*G06F 3/0484* (2013.01)
*G06F 1/16* (2006.01)
(Continued)

(52) U.S. Cl.
CPC .......... *G06F 3/04847* (2013.01); *G06F 1/163* (2013.01); *G06F 1/1652* (2013.01);
(Continued)

(58) Field of Classification Search
CPC ....... A44C 5/0015; G06F 1/163; G06F 3/014; G06F 2200/1637; G06F 2203/04806;
(Continued)

(56) References Cited

U.S. PATENT DOCUMENTS 3,911,664 A * 10/1975 Haber .................... G04C 3/001
                                                              368/224
5,931,764 A *  8/1999 Freeman et al. .................. 482/4
(Continued)

FOREIGN PATENT DOCUMENTS

EP          0951883 A2    10/1999
EP          2182642 A2     5/2010

OTHER PUBLICATIONS

PCT Search Report KR2013/0411429.

*Primary Examiner* — Larry Sternbane
(74) *Attorney, Agent, or Firm* — Jefferson IP Law, LLP

(57) ABSTRACT

A mobile device is provided. The mobile device includes a body of a bangle type configured to be worn on a user body, a display mounted in the body, a motion sensor configured to detect a motion, a storage configured to store control information which is differently set according to a motion state, and, when a motion is detected by the motion sensor, a controller configured to change a screen of the display according to control information corresponding to the detected motion. Accordingly, the mobile device is easily carried and used.

25 Claims, 76 Drawing Sheets

(30) Foreign Application Priority Data

Jan. 7, 2013 (KR) ........................ 10-2013-0001820
Nov. 21, 2013 (KR) ........................ 10-2013-0141955

(51) Int. Cl.
| | | |
|---|---|---|
| G06F 3/00 | (2006.01) | |
| G06F 3/01 | (2006.01) | |
| G06F 3/0482 | (2013.01) | |
| G06F 3/0483 | (2013.01) | |
| G06F 3/0485 | (2013.01) | |
| G06F 21/31 | (2013.01) | |
| G06F 3/0488 | (2013.01) | |
| G06F 3/0346 | (2013.01) | |
| H04M 1/05 | (2006.01) | |
| H04M 1/725 | (2006.01) | |
| G09G 5/00 | (2006.01) | |

(52) U.S. Cl.
CPC ............ *G06F 1/1694* (2013.01); *G06F 3/005* (2013.01); *G06F 3/013* (2013.01); *G06F 3/014* (2013.01); *G06F 3/017* (2013.01); *G06F 3/0346* (2013.01); *G06F 3/0482* (2013.01); *G06F 3/0483* (2013.01); *G06F 3/0485* (2013.01); *G06F 3/04883* (2013.01); *G06F 21/31* (2013.01); *G09G 5/003* (2013.01); *H04M 1/05* (2013.01); *H04M 1/7253* (2013.01); *G06F 2200/1637* (2013.01); *G06F 2203/04102* (2013.01); *G06F 2203/04806* (2013.01); *G09G 2300/04* (2013.01); *H04M 2250/12* (2013.01)

(58) Field of Classification Search
CPC ...... G06F 1/1652; G06F 3/017; G06F 3/0485; G06F 3/0346; G06F 2203/04102; H04M 2250/12; H04W 4/027; H04W 52/0254; G09G 5/003; G09G 2380/02; G09G 2300/04
See application file for complete search history.

(56) References Cited

U.S. PATENT DOCUMENTS

| | | | |
|---|---|---|---|
| 2005/0174302 A1* | 8/2005 | Ishii | G06F 3/1423 345/30 |
| 2006/0028429 A1 | 2/2006 | Kanevsky et al. | |
| 2006/0136173 A1* | 6/2006 | Case et al. | 702/182 |
| 2008/0291225 A1* | 11/2008 | Arneson | G06F 3/011 345/698 |
| 2009/0259865 A1* | 10/2009 | Sheynblat | G06F 1/3203 713/323 |
| 2009/0265671 A1 | 10/2009 | Sachs et al. | |
| 2010/0045705 A1* | 2/2010 | Vertegaal | A47G 19/2227 345/661 |
| 2010/0156676 A1 | 6/2010 | Mooring et al. | |
| 2010/0315439 A1* | 12/2010 | Huang | G06F 1/1626 345/661 |
| 2011/0157022 A1* | 6/2011 | Goldburt | 345/169 |
| 2011/0187681 A1 | 8/2011 | Kim et al. | |
| 2012/0212433 A1* | 8/2012 | Lee | G06F 1/1652 345/173 |
| 2012/0212922 A1* | 8/2012 | Schneider | 361/807 |
| 2012/0255978 A1* | 10/2012 | Williams | A45F 5/00 224/219 |
| 2013/0083496 A1* | 4/2013 | Franklin | G06F 1/1626 361/749 |
| 2013/0191741 A1* | 7/2013 | Dickinson et al. | 715/702 |
| 2013/0271351 A1* | 10/2013 | Lyons et al. | 345/1.1 |
| 2015/0116920 A1* | 4/2015 | Franklin | G06F 1/1626 361/679.26 |

\* cited by examiner

FIG. 8
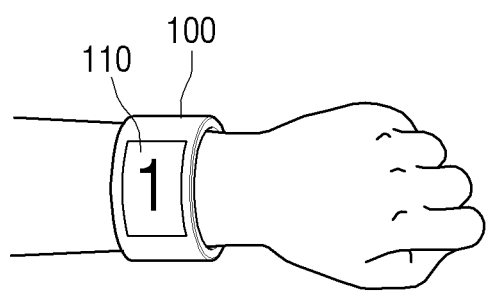
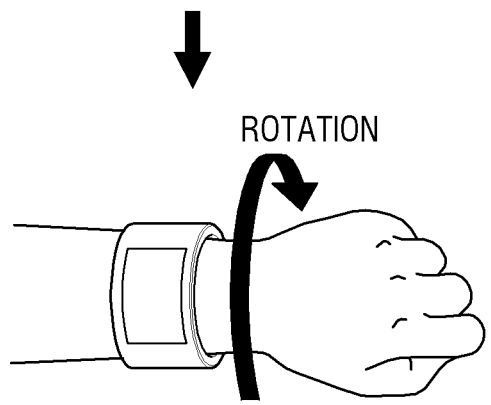

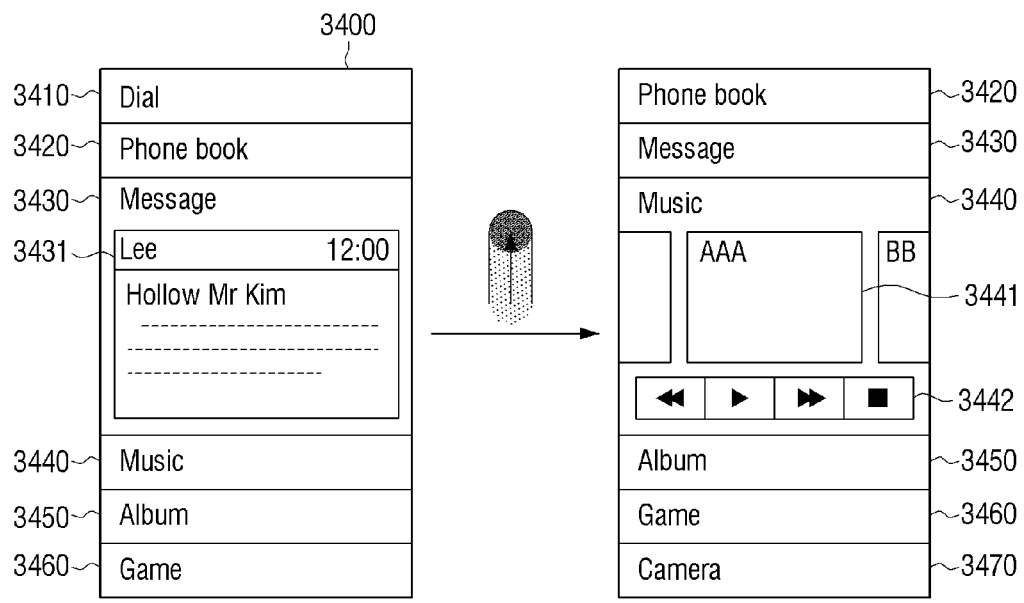
FIG. 34A
FIG. 34B
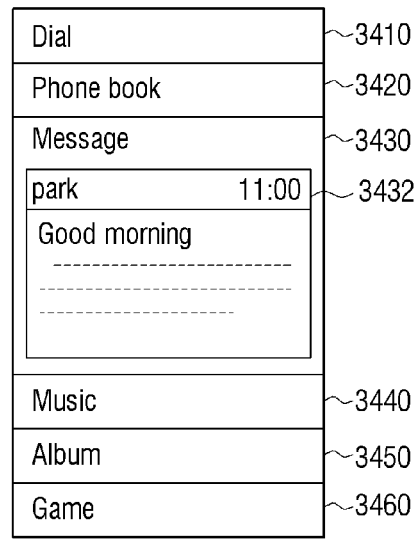
FIG. 34C

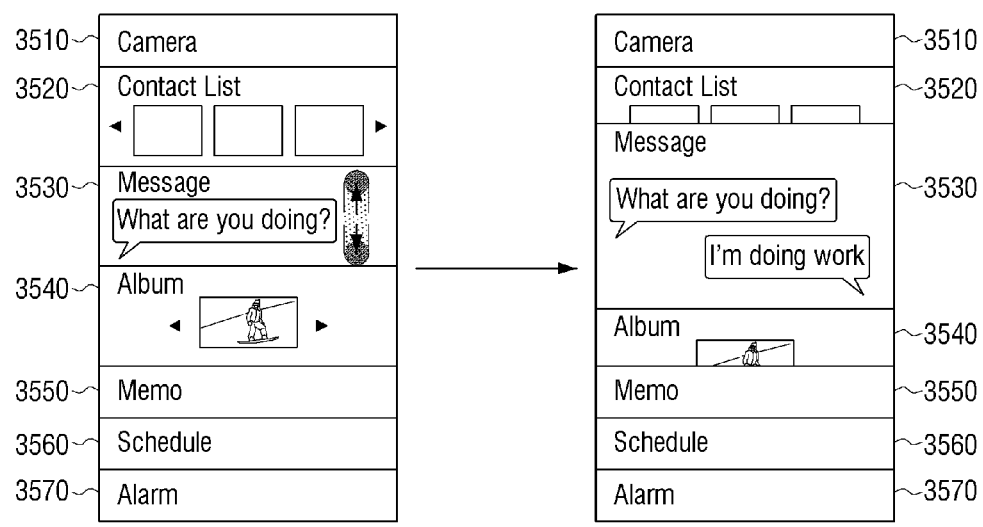
FIG. 35B
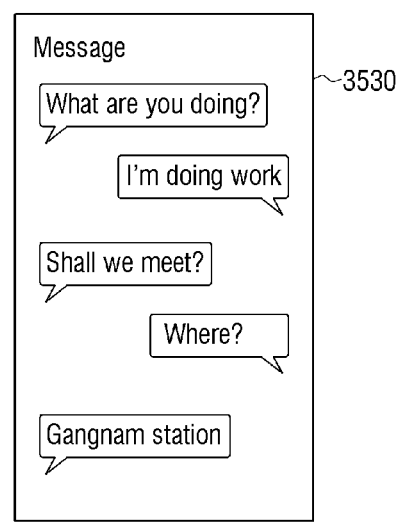
FIG. 35A
FIG. 35C

FIG. 38A

| | |
|---|---|
| 4 | |
| 5 | |
| 6 | A |
| 7 | B |
| 8 | C |
| 9 | D |
| 10 | E |
| 11 | F |
| 12 | |
| 13 | |

3800, 3810

Drag Up →

FIG. 38B

| | |
|---|---|
| 10 | |
| 11 | |
| 12 | A |
| 13 | B |
| 14 | C |
| 15 | D |
| 16 | E |
| 17 | F |
| 18 | |
| 19 | |

3800, 3810

↓ Select E

FIG. 38C

| | |
|---|---|
| 41 | |
| 42 | |
| 43 | A |
| 44 | B |
| 45 | C |
| 46 | D |
| 47 | E |
| 48 | F |
| 49 | |
| 50 | |

3800, 3810

FIG. 44A
FIG. 44B
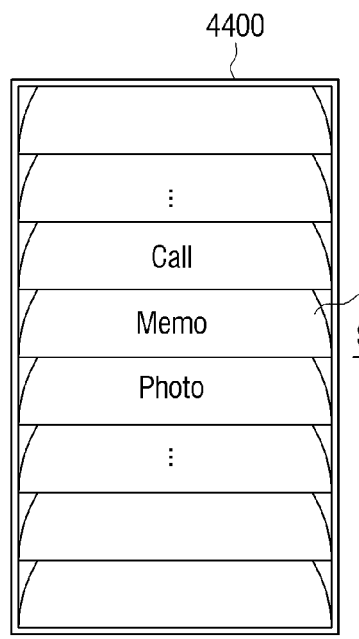
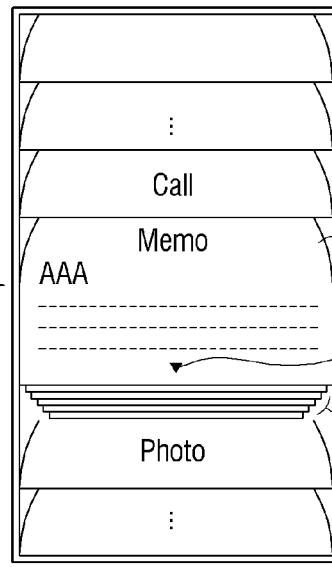
FIG. 44C
FIG. 44D
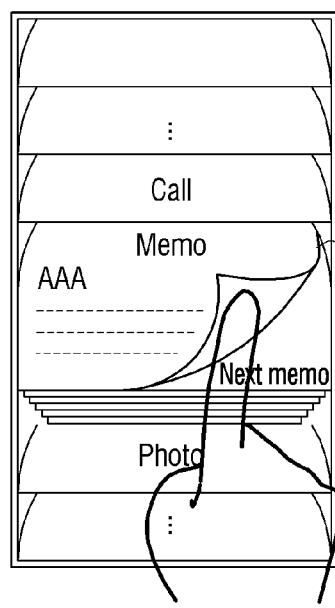
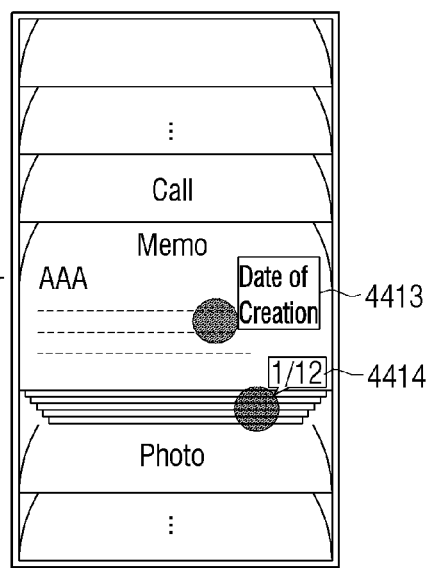

2 Depth Structure

3 Depth Structure

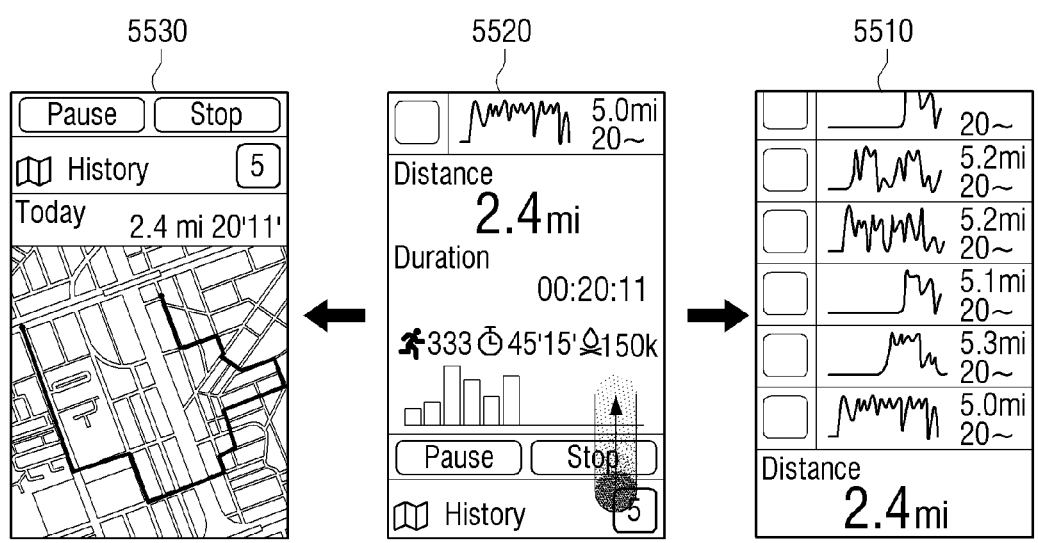

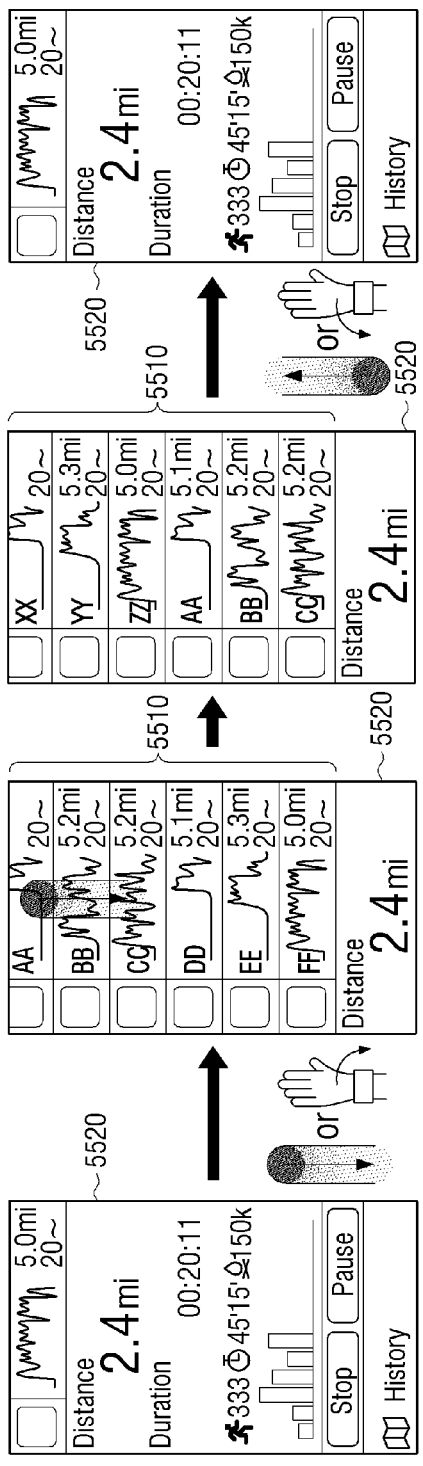

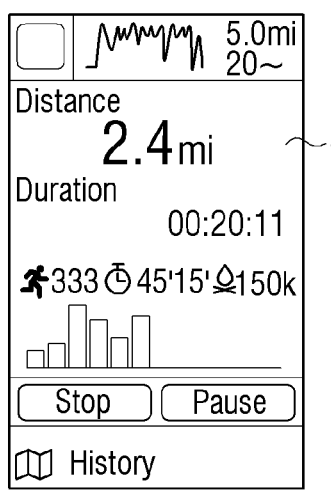 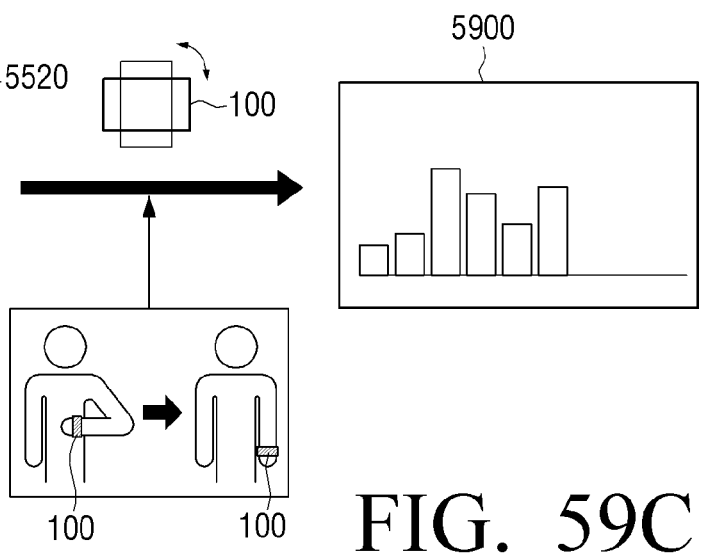
FIG. 59A  FIG. 59C
FIG. 59B

FIG. 61A  FIG. 61B  FIG. 61C
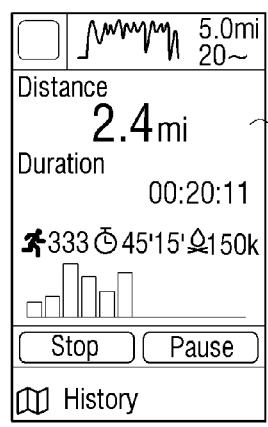
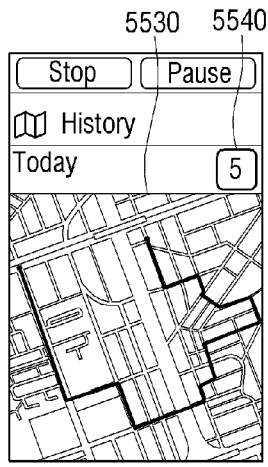
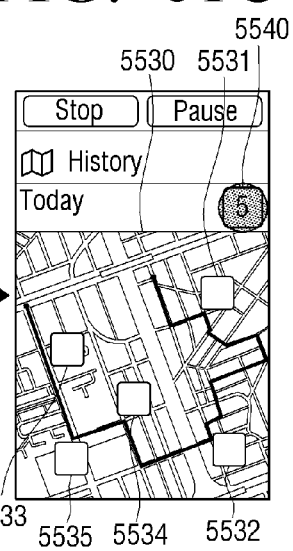
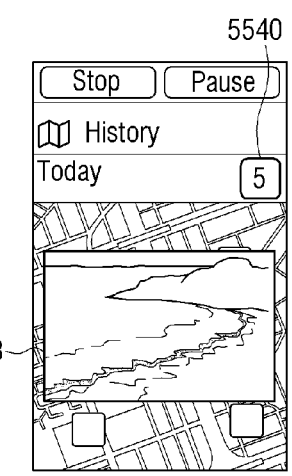
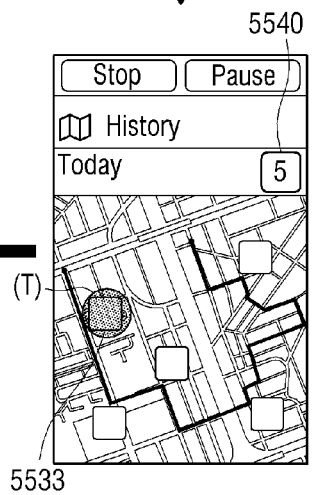
FIG. 61E  FIG. 61D FIG. 64A
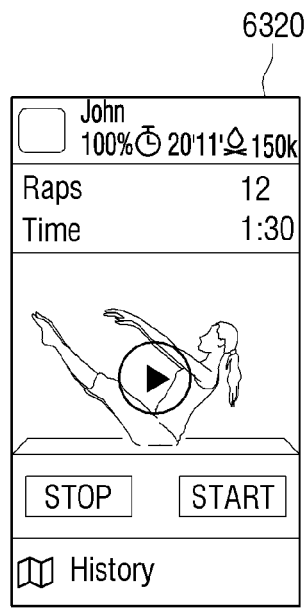
FIG. 64B
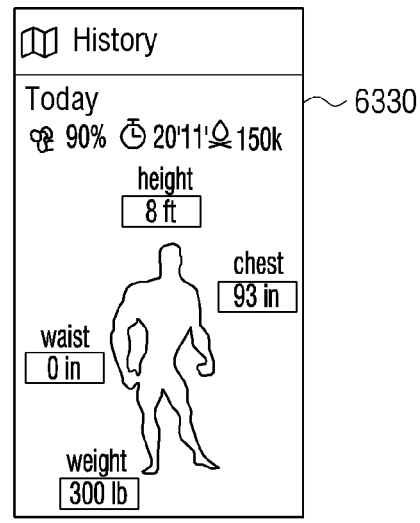
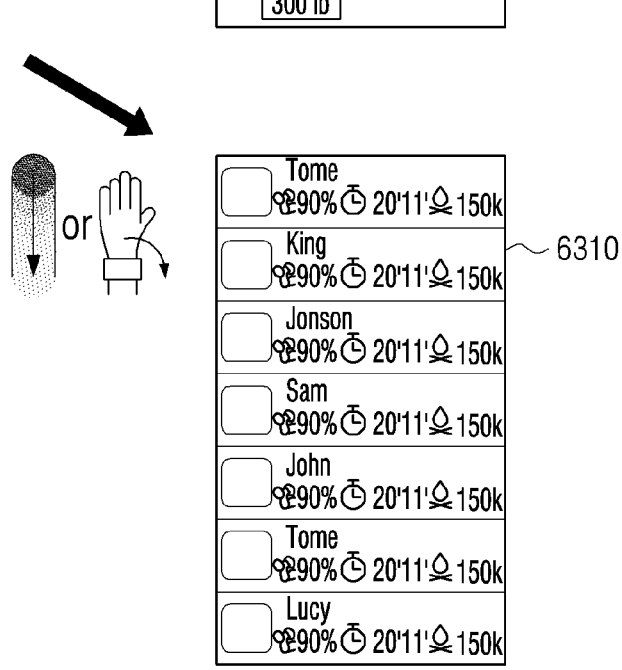
FIG. 64C FIG. 65B
FIG. 65A
FIG. 65D
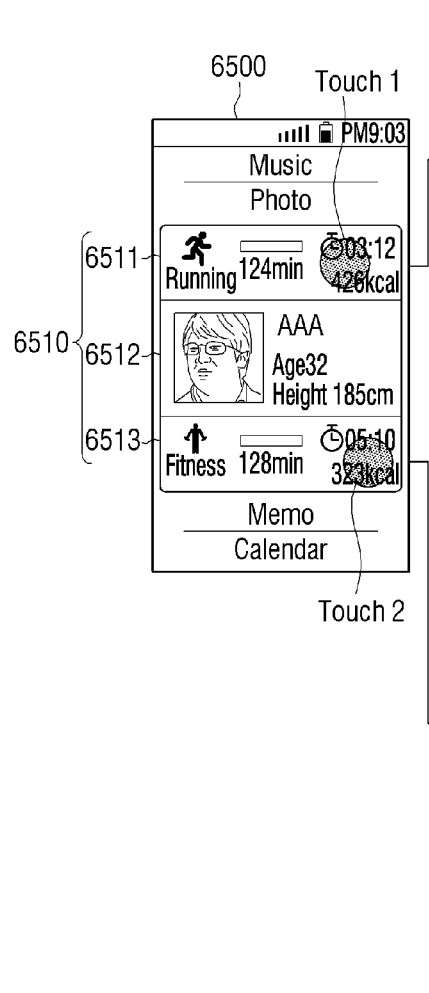
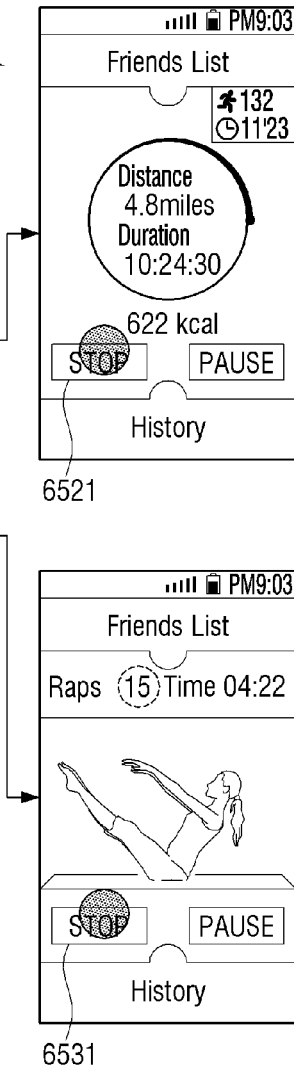
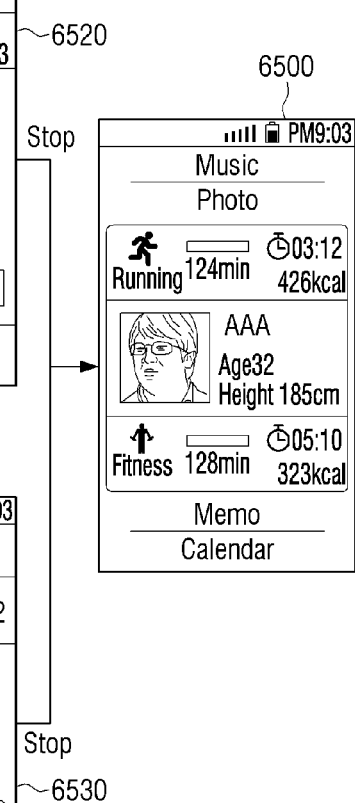
FIG. 65C

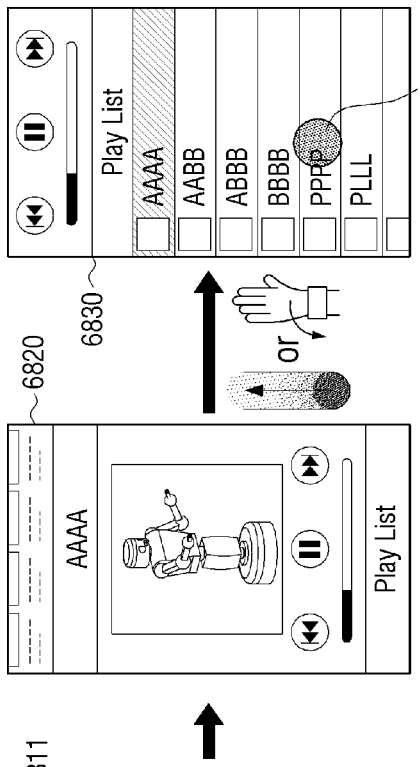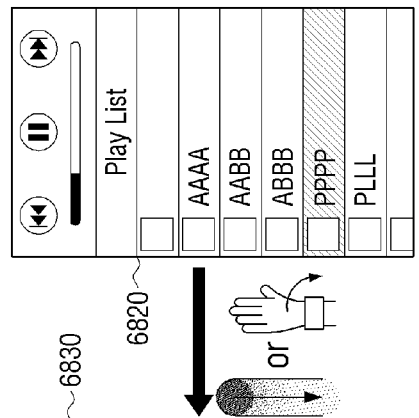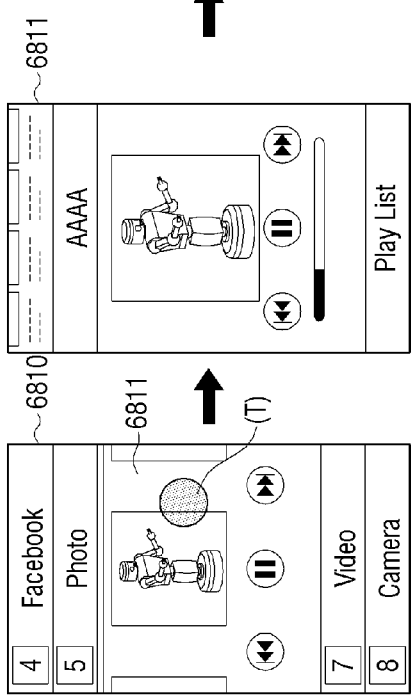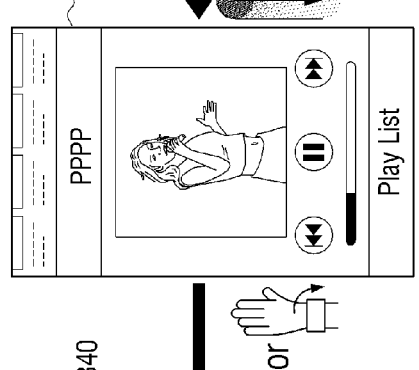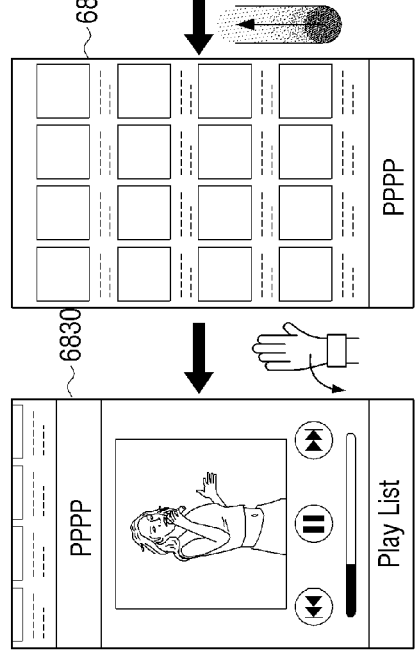

FIG. 69A
FIG. 69B
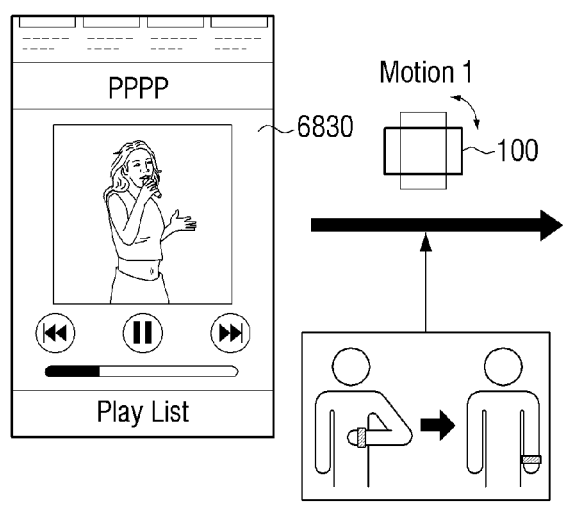
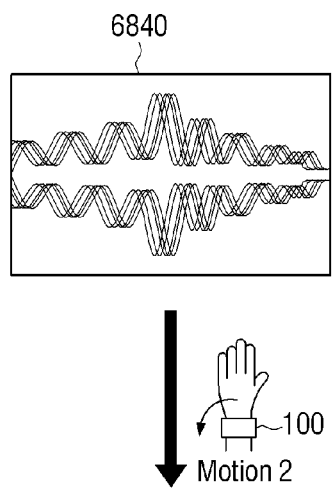
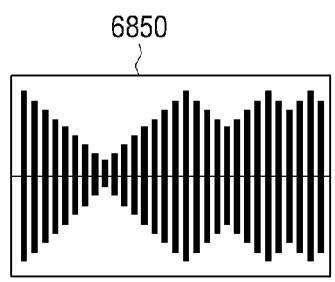
FIG. 69D
FIG. 69C

FIG. 70A
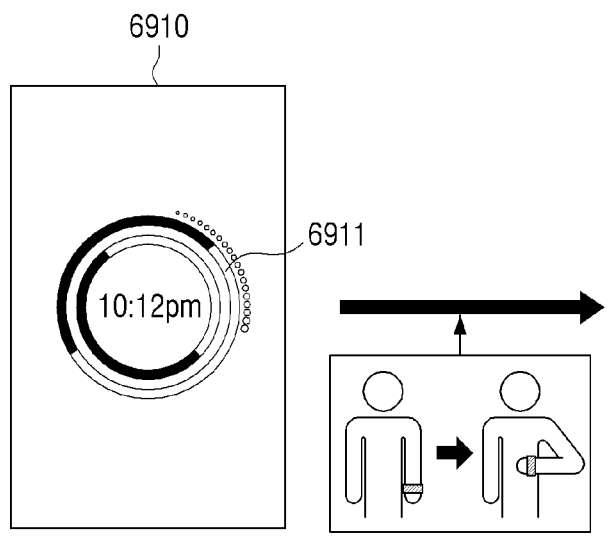
FIG. 70B
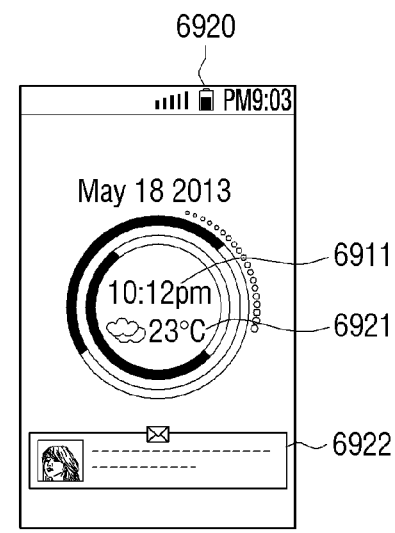
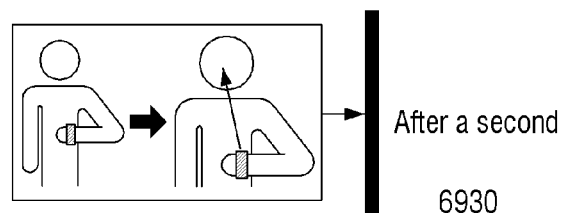
FIG. 70D
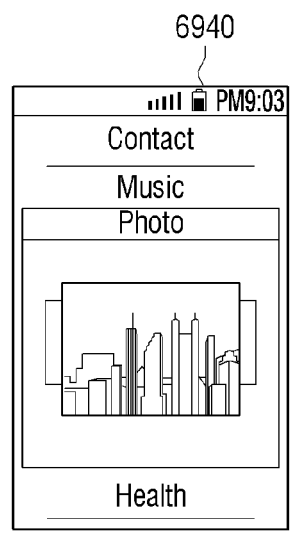
FIG. 70C
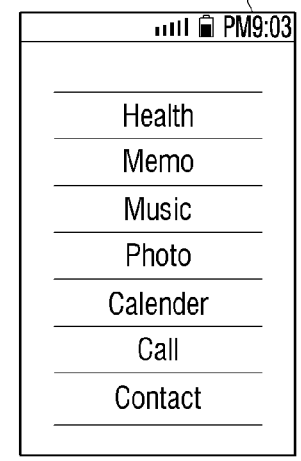

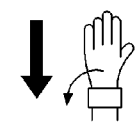

MOBILE DEVICE OF BANGLE TYPE, CONTROL METHOD THEREOF, AND USER INTERFACE (UI) DISPLAY METHOD

CROSS-REFERENCE TO RELATED APPLICATION(S)

This application claims the benefit under 35 U.S.C. §119 (a) of Korean patent applications filed on Dec. 10, 2012, Jan. 4, 2013, Jan. 7, 2013, and Nov. 21, 2013 in the Korean Intellectual Property Office and assigned Serial Nos. 10-2012-0143064, 10-2013-0001235, 10-2013-0001820, and 10-2013-0141955, the entire disclosures of each of which is hereby incorporated by reference.

TECHNICAL FIELD

The present disclosure relates to apparatuses and methods consistent with various embodiments of a mobile device, a control method thereof, and a User Interface (UI) display method. More particularly, the present disclosure relates to a mobile device which is of a bangle type and operates according to a motion thereof, a control method thereof, and a UI display method.

BACKGROUND

With the development of electronic technologies, various kinds of electronic apparatuses have been developed and distributed. In particular, as high performance parts can be microminiaturized in recent years, the electronic apparatuses can be implemented in a small size and accordingly mobile devices equipped with a variety of functions such as a mobile phone, a tablet PC, a laptop PC, and an MP3 player are increasingly used.

Most of the mobile devices are put into a user's bag or pocket and carried by the user. For example, when the mobile device is put into a pocket and carried, the mobile device is likely to come out from the pocket when the user sits on a chair or lies. In the case of a light and small mobile device, the user may not recognize that the mobile device comes out from the pocket. Therefore, the risk that the user loses the user's mobile device increases. In addition, when the mobile device is carried in the bag or pocket along with a key or any other hard object, the mobile device may be hit by these objects when the user walks and may be scratched or damaged.

Therefore, there is an increasing need for a method of manufacturing mobile devices in a form that is easy to carry. In addition, there is a need for a method for controlling an operation of such a mobile device easily.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

Accordingly, an aspect of the present disclosure is to provide a mobile device of a bangle type, which is worn on a user's body and is easy to carry and use, and a control method thereof.

In accordance with an aspect of the present disclosure, a mobile device of a wearable bangle type is provided. The mobile device includes a display, a motion sensor configured to detect a motion of the mobile device, a storage configured to store control information which is differently set according to a motion state, and, when a motion is detected by the motion sensor, a controller configured to change a screen of the display according to control information corresponding to the detected motion.

In accordance with an aspect of the present disclosure, when the display is moved in a first direction while a content is being played back, the controller may change the screen to a previous content playback screen, and, when the display is moved in a second direction opposite to the first direction, the controller may change the screen to a next content playback screen.

In accordance with an aspect of the present disclosure, when the display is moved in a first direction, the controller may change the screen to a zoom-out screen, and, when the display is moved in a second direction opposite to the first direction, the controller may change the screen to a zoom-in screen.

In accordance with an aspect of the present disclosure, the controller may perform at least one of operations of changing a content, zooming in/zooming out, changing a screen arrangement direction, activating the display, inactivating the display, turning off, turning on, unlocking, authenticating and selecting an application, according to the motion detected by the motion sensor.

In accordance with an aspect of the present disclosure, when a detecting result of the motion sensor satisfies a predetermined non-use condition, the controller may inactivate the display, and, when a detecting result of the motion sensor satisfies a predetermined use condition, the controller may activate the display.

In accordance with an aspect of the present disclosure, the mobile device may further include a photographer disposed on the body. When a detecting result of the motion sensor satisfies a predetermined condition while the mobile device is a locked state, the controller may control the photographer to perform photographing, and, when a user is recognized in a photographed image, the controller may perform an unlock operation.

In accordance with an aspect of the present disclosure, the mobile device may include a body which is made of a flexible material such that the body is wound around the user body.

In accordance with an aspect of the present disclosure, the display may be formed on an entire surface of one side of the body.

In accordance with an aspect of the present disclosure, when one end of the body is unfolded while the body is worn on the user body, the controller may display a key pad on a display area provided on the one end.

In accordance with an aspect of the present disclosure, the body may include a first part in which the display is mounted; a second part; first protrusions spaced a predetermined distance apart from one another on the first part; and second protrusions formed on the second part to be engaged with the first protrusions, and configured to support the first part to slide along an outer surface of the second part in phases. When the first part slides along the second part and is rotated, the controller may display a screen corresponding to a sliding phase.

In accordance with an aspect of the present disclosure, the display may be disposed on an entire outer surface of the body, and the mobile device may further include: a cushion provided on an inner surface of the body; and an air driver configured to expand the cushion and bring the cushion into close contact with the user body when the mobile device is worn on the user body, and, when a command to remove the mobile device is input, the air driver configured to contract the cushion into an original state.

In accordance with an aspect of the present disclosure, the body may be comprised of a flexible band, and the display, the motion sensor, and the controller may be an integrated module which is mountable in or dismountable from the body.

In accordance with another aspect of the present disclosure, a mobile device is provided. The mobile device includes a body of a wearable bangle type, a display disposed on at least one area of a surface of the body and rotatable on the body, a motion sensor configured to detect a rotation state of the display, a storage configured to store control information which is differently set according to a rotation state, a controller configured to change a screen of the display according to control information corresponding to the rotation state detected by the motion sensor.

In accordance with another aspect of the present disclosure, a method for controlling a mobile device which includes a body of a bangle type configured to be worn on a user body, and a display mounted in the body is provided. The method includes detecting a motion of the mobile device, and changing a screen displayed on the display according to the detected motion.

In accordance with an aspect of the present disclosure, the changing the screen may include, when the display is moved in a first direction while a content is being played back, changing the screen to a previous content playback screen, and, when the display is moved in a second direction opposite to the first direction, changing the screen to a next content playback screen.

In accordance with an aspect of the present disclosure, the changing the screen may include, when the display is moved in a first direction, changing the screen to a zoom-out screen, and, when the display is moved in a second direction opposite to the first direction, changing the screen to a zoom-in screen.

In accordance with an aspect of the present disclosure, the motion may be at least one of a rotation motion of the display rotating around an outer circumference of the body, and a moving motion of the mobile device.

In accordance with an aspect of the present disclosure, the method may further include performing at least one of operations of changing a content, zooming in/zooming out, changing a screen arrangement direction, activating the display, inactivating the display, turning off, turning on, unlocking, authenticating and selecting an application, according to the detected motion.

In accordance with an aspect of the present disclosure, the method may further include photographing, determining a user position using at least one of a result of the photographing and a motion of the mobile device, and performing a control operation corresponding to the determined user position.

In accordance with an aspect of the present disclosure, the method may further include when a motion state of the mobile device satisfies a predetermined non-use condition, inactivating the display, and, when a motion state of the mobile device satisfies a predetermined use condition, activating the display.

In accordance with an aspect of the present disclosure, the body may be made of a flexible material such that the body is wound around the user body, and the display may be formed on an entire surface of one side of the body.

In accordance with an aspect of the present disclosure, the method may further include, when one end of the body is unfolded while the body is worn on the user body, displaying a key pad on a display area provided on the one end.

In accordance with an aspect of the present disclosure, the display may be connected to the body in such a manner that the display is slidable along an outer circumference of the body in phases.

In accordance with an aspect of the present disclosure, the changing the screen may include changing the screen to a screen corresponding to a sliding phase of the display.

In accordance with an aspect of the present disclosure, the method may further include when a command to wear the mobile device is input, expanding a cushion provided on an inner surface of the body, and bringing the cushion into close contact with the user body, and, when a command to remove the mobile device is input, contracting the cushion into an original state.

In accordance with another aspect of the present disclosure, a mobile device of a wearable bangle type is provided. The mobile device includes a storage configured to store a pre-installed application, a display configured to display a list UI in which an application item corresponding to each application stored in the storage is arranged, and a controller configured to control the display to display an execution screen of an application corresponding to at least one of the application items on a display location of the corresponding application item in the list UI, and to change a display state of the list UI according to a user manipulation.

In accordance with another aspect of the present disclosure, a method for controlling a mobile device which includes a body of a bangle type configured to be worn on a user body, and a display mounted in the body is provided. The method includes detecting a motion of the mobile device, and controlling operation of the mobile device according to the detected motion.

In accordance with another aspect of the present disclosure, a method for displaying a UI of a mobile device, which comprises a body of a wearable bangle type and a display mounted on the body is provided. The method includes displaying a list UI in which an application item corresponding to a pre-installed application is arranged, executing an application corresponding to at least one of the application items, displaying an execution screen of the executed application on a display location of the corresponding application item in the list UI, and changing a display state of the list UI according to a user manipulation.

In accordance with another aspect of the present disclosure, a mobile device of a wearable bangle type is provided. The mobile device includes a storage, a display formed on an outer surface of the mobile device seamlessly and configured to display an execution screen of an application stored in the storage on a whole display area, a sensor configured to detect a user interaction, and a controller configured to change a part of a screen displayed on a visible area of the whole display area in the execution screen according to the user interaction.

In accordance with another aspect of the present disclosure, a mobile device of a wearable bangle type is provided. The mobile device includes a storage configured to store a pre-installed application, a sensor configured to detect a user interaction, a display, a controller configured to display a first line UI on a first edge of a screen of the display when a first user interaction is detected, and to display a second line UI on a second edge of the screen of the display when a second user interaction is detected.

In accordance with another aspect of the present disclosure, a method for displaying a UI of a mobile device of a wearable bangle type is provided. The method includes detecting a user interaction, and when a first user interaction is detected, displaying a first line UI on a first edge of a screen of a display, and, when a second user interaction is detected, displaying a second line UI on a second edge of the screen of the display.

According to the various embodiments as described above, the user can easily wear the mobile device on the user's body and easily carry the mobile device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6, 7, and 8 are views to illustrate examples of an operation corresponding to a motion direction of a mobile device such as, for example, the mobile device of FIG. 5 according to an embodiment of the present disclosure;

FIGS. 34A, 34B, and 34C are views illustrating an example of a configuration of a list User Interface (UI) of a mobile device according to an embodiment of the present disclosure;

FIGS. 35A, 35B, and 35C are views illustrating a screen of a mobile device which provides a plurality of execution screens according to an embodiment of the present disclosure;

FIGS. 38A, 38B, and 38C are views illustrating a screen on which a list UI is displayed along with indicators according to an embodiment of the present disclosure;

FIGS. 44A, 44B, 44C, and 44D illustrate an example of a list UI shape according to an embodiment of the present disclosure;

FIGS. 52, 53, 54, 55, 56A, 56B, and 56C are views to illustrate a UI display method using a display of a seamless form according to an embodiment of the present disclosure;

FIGS. 58A, 58B, 58C, 58D, 58E, 58F, and 58G are views to illustrate a method for using a whole execution screen of a run management application according to an embodiment of the present disclosure;

FIGS. 59A, 59B and 59C illustrate change in the screen when a user lowers a mobile device while the mobile device is executing a run management application according to an embodiment of the present disclosure;

FIGS. 61A, 61B, 61C, 61D, and 61E are views to illustrate a method for displaying a screen of a mobile device according to an embodiment of the present disclosure;

FIGS. 64A, 64B, and 64C are views to illustrate a method for changing an execution screen such as, for example, the execution screen of FIG. 63 according to a user interaction according to an embodiment of the present disclosure;

FIGS. 65A, 65B, 65C, and 65D are views illustrating an example of a list UI in which a variety of application information including a health application is displayed according to an embodiment of the present disclosure;

FIGS. 68A, 68B, 68C, 68D, 68E, 68F, 68G, and 68H are views to illustrate a method for manipulating an execution screen of a music application according to an embodiment of the present disclosure;

FIGS. 69A, 69B, 69C, and 69D are views illustrating a change example of an execution screen according to an embodiment of the present disclosure;

FIGS. 70A, 70B, 70C, and 70D are views illustrating an example of a screen manipulation method of a mobile device according to an embodiment of the present disclosure;

The same reference numerals are used to represent the same elements throughout the drawings.

DETAILED DESCRIPTION

Figure 1:
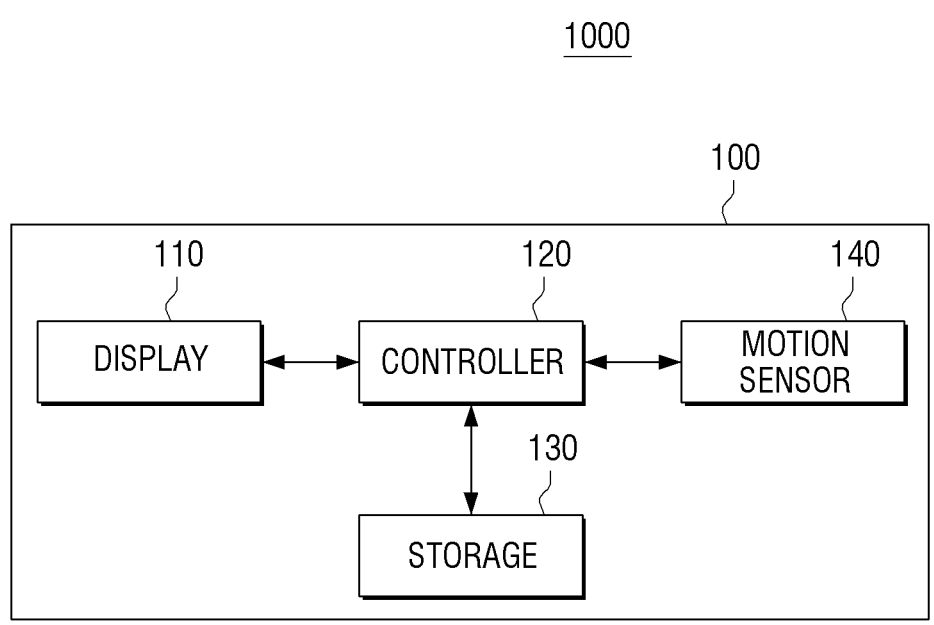
FIG. 1 is a view illustrating a configuration of a mobile device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, same reference numerals are used for the same elements when they are depicted in different drawings. The matters defined in the description, such as detailed construction and elements, are provided to assist in a comprehensive understanding of various embodiments. Thus, it is apparent that various embodiments can be carried out without those specifically defined matters. In addition, functions or elements known in the related art are not described in detail because such a description may obscure the various embodiments with unnecessary detail.

FIG. 1 is a view illustrating a configuration of a mobile device according to an embodiment of the present disclosure.

Referring to FIG. 1, a mobile device 1000 includes a body 100, a display 110, a controller 120, a storage 130, and a motion sensor 140.

The body 100 may be implemented in a wearable bangle type. The bangle type refers to a type that the user can wear on a part of the user's body, such as wrist, ankle, belly, and head. A detailed configuration of the body 100 will be explained below.

According to various embodiments of the present disclosure, the display 110, the controller 120, the storage 130, and the motion sensor 140 are mounted in the body 100.

The motion sensor 140 is configured to detect a motion. According to an embodiment of the present disclosure, the motion sensor 140 may detect a motion of the mobile device 100, or a motion and rotation of the display 110. A type of the motion or a detecting method thereof will be explained in detail below.

The storage 130 stores control information which is differently set according to a motion state. The control information may include a variety of information such as an application, a control command, setting data, screen configuration data, and transition platform. In addition, the storage 130 may store various data such as an Operating System (OS) for operating the mobile device, firmware, and applications. The storage 130 may include a non-volatile memory such as a flash memory.

The controller 120 controls an operation of the mobile device according to a result of detecting of the motion sensor 140. Specifically, when a motion is detected by the motion sensor 140, the controller 120 reads out control information corresponding to the detected motion from the storage 130. The controller 130 may control the display 110 to display various screens according to the read-out control information.

As described above, the mobile device may be implemented in various shapes. Accordingly, the controller 120 may perform a different operation according to a shape of the mobile device. In addition, according to an embodiment of the present disclosure, the body of the mobile device itself may be moved or the body of the mobile device may be fixed and only the display may be moved (e.g., the display of the mobile device may be moved in relation to the body of the mobile device). When the body of the mobile device itself is moved, the controller 120 may detect a motion of the body and perform a corresponding operation. According to an embodiment of the present disclosure, in which only the display is moved, the controller 120 may perform a corresponding operation according to a motion state of the display.

Hereinafter, a shape of a mobile device and an operation thereof according to various embodiments will be explained.

Figures 2A, 2B:
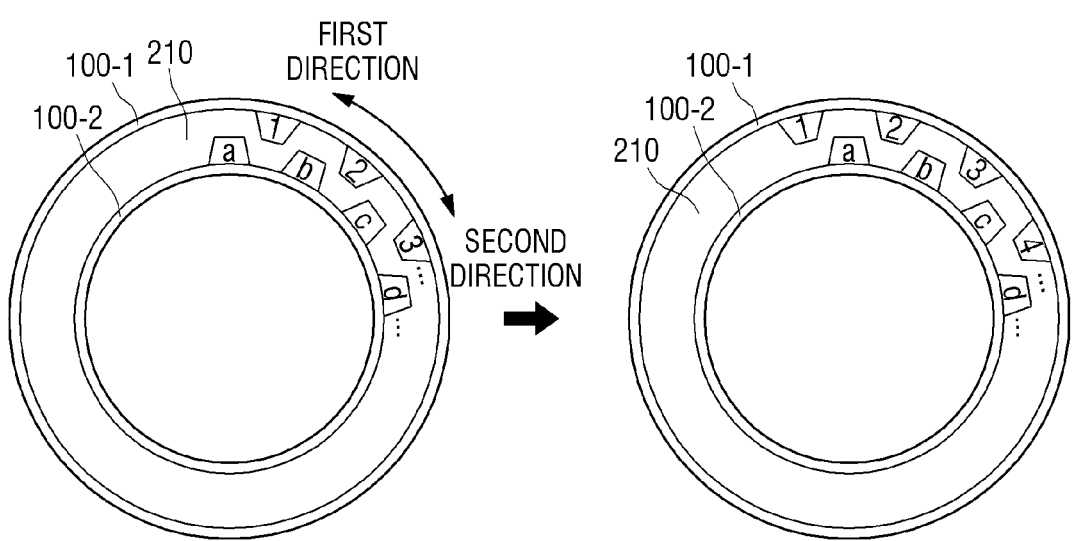
FIGS. 2A and 2B are views illustrating a configuration of a rotatable mobile device according to an embodiment of the present disclosure.

FIGS. 2A and 2B are views illustrating a configuration of a rotatable mobile device according to an embodiment of the present disclosure. For example, FIGS. 2A and 2B are views illustrating a configuration of a mobile device in which a body of the mobile device is fixed and a display is connected to the body to be slidable along the body according to an embodiment of the present disclosure.

Referring to FIGS. 2A and 2B, the body 100 is divided into a first part 100-1 and a second part 100-2. The first part 100-1 is disposed in an outer direction of the mobile device 100, and the second part 100-2 is disposed in an inner direction. The first part 100-1 is slidable along an outer circumference of the second part 100-2. According to various embodiments of the present disclosure, a connection surface between the first part 100-1 and the second part 100-2 is coated with material having less friction, so that the first part 100-1 is slidable on (or otherwise in relation to) the second part 100-2. According to various embodiments of the present disclosure, a space between the first part 100-1 and the second part 100-2 may be filled with lubricating material such as liquid or gas.

First protrusions 1, 2, 3, . . . are formed on an inner circumference of the first part 100-1 facing the second part 100-2 at predetermined intervals. Second protrusions a, b, c, . . . corresponding to the first protrusions 1, 2, 3, . . . are formed on the second part 100-2. The second protrusions a, b, c . . . are arranged to be engaged with the first protrusions 1, 2, 3, . . . . Although the first protrusions 1, 2, 3, . . . and the second protrusions a, b, c, . . . are arranged on the whole inner circumference of the first part and the whole outer circumference of the second part, respectively, the first protrusions 1, 2, 3, . . . and the second protrusions a, b, c, . . . may be formed on parts of the inner circumference of the first part and the outer circumference of the second part.

Accordingly, the first part 100-1 is supported to be slidable along the outer circumference of the second part 100-2 in phases. For example, the user may rotate the first part 100-1 in a first direction or a second direction by applying an external force to the first part 100-1. Specifically, as shown in view FIG. 2A, when one of the first protrusions 1 is placed between protrusions a and b of the second protrusions, a force may be applied to the first part 100-1 in the first direction. In this case, the first protrusion 1 collides with the second protrusion a. Accordingly, when a force greater than a predetermine value is applied, the first protrusion 1 goes over the second protrusion a. Accordingly, the first protrusion 2 is placed between the second protrusions a and b and the first part 100-1 slides in the first direction during the first phase, as shown in FIG. 2B.

Although the first protrusions and the second protrusions are formed in a connector between the first and second parts 100-1 and 100-2 in FIGS. 2A and 2B, one of the protrusions may be replaced with a depression or any other patterns may be formed.

When the first part 100-1 slides along the second part 100-2 and rotates, the controller 120 may perform an operation corresponding to the sliding phase.

For example, when the first-phase sliding is performed in the first direction while an execution screen of a first application is displayed, the controller 120 may execute a second application and display an execution screen thereof. On the other hand, when the first-phase sliding is performed in the second direction, the controller 120 may execute a third application and display an execution screen thereof.

The application may be executed according to various criteria such as in order of installation, in order defined by the user, in order of name of application, and/or the like. For example, when the criterion is the order of installation, and, when rotation in the first direction is performed, an application that is installed prior to a currently executed application is executed, and, when rotation in the second direction is performed, an application that is installed after a current application is executed. When the criterion is the order of name, the applications may be arranged in alphabetical order of initial sounds of the applications.

In addition, when the first part slides while a content is being played back, the controller 120 may play back a previous content or a next content according to a sliding direction. When sliding is performed through several phases at a time, the controller 120 may change a plurality of content at the same time.

Figure 3:
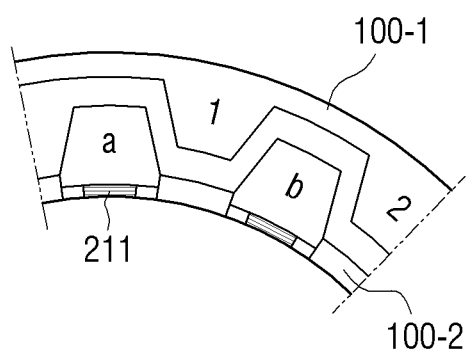
FIG. 3 is a view to illustrate a detailed configuration of a rotator of a mobile device such as, for example, the mobile device of FIGS. 2A and 2B according to an embodiment of the present disclosure.

FIG. 3 is a view to illustrate a detailed configuration of a rotator of a mobile device such as, for example, the mobile device of FIGS. 2A and 2B according to an embodiment of the present disclosure. For example, FIG. 3 is a view to illustrate a detailed configuration of the connector 210 according to an embodiment of the present disclosure.

Referring to FIG. 3, the first protrusions 1, 2, . . . and the second protrusions a, b, . . . are formed in a trapezoidal shape such that their lateral surfaces are inclined. An elastic member such as a spring may be provided on a lower portion of at least one of the first protrusions 1, 2, . . . and the second protrusions a, b, . . . .

In FIG. 3, an elastic member 211 is provided in a lower space of the second protrusions a and b. In this case, when the first protrusion moves to the second protrusion and collides with the second protrusion, the elastic member 211 contracts and the second protrusion moves downwardly. Accordingly, the first protrusion goes over the second protrusion.

The motion sensor 140 counts a number of collisions between the first protrusions and the second protrusions, calculates the sliding phase, and notifies the controller 120 of the number of collisions between the first protrusion and the second protrusion, or of the sliding phase. For example, the elastic member 211 may be implemented by using a strain gage. The strain gage may be made of metal or semiconductor which greatly changes a resistance value according to a magnitude of an applied force. For example, when a compressive force is applied, the resistance value is reduced. When the resistance value of the elastic member 211 provided in the second protrusion is reduced, the motion sensor 140 may detect that the first-phase sliding is performed.

According to various embodiments of the present disclosure, the display 110 may be disposed on the entire outer circumference of the first part 100-1. According to various embodiments of the present disclosure, the display 110 may be disposed on a part of the outer circumference of the first part 100-1. In addition, a plurality of displays may be arranged on the body of the mobile device side by side. In this case, when rotation is performed, screens displayed on the display are changed from one to another according to a rotation state.

Figure 4A:
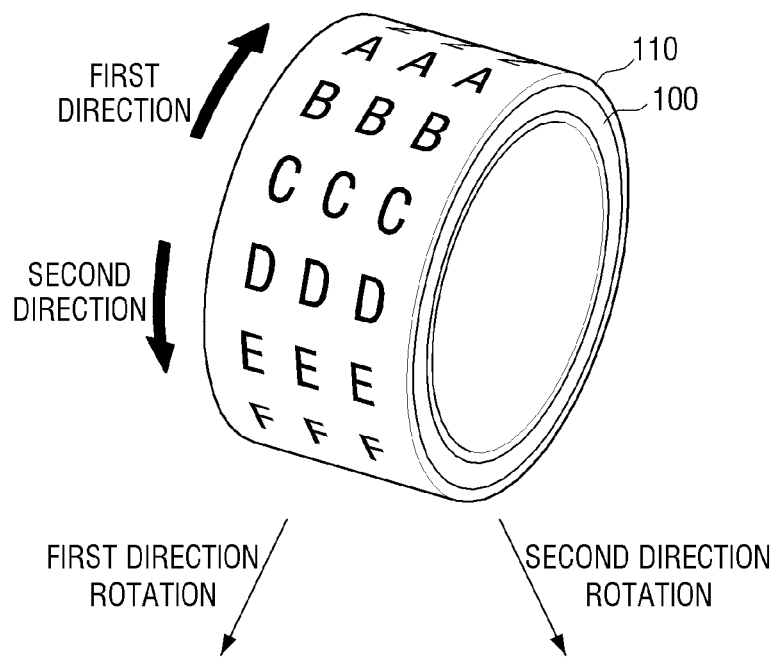
FIGS. 4A, 4B, and 4C are views to illustrate an example of an operation corresponding to rotation of a mobile device according to an embodiment of the present disclosure.
Figures 4B, 4C:
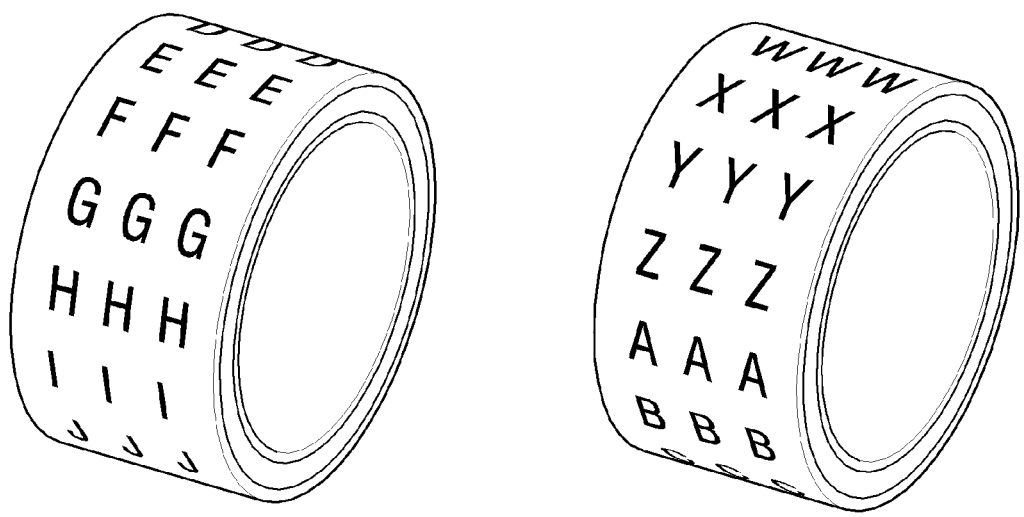

FIGS. 4A, 4B, and 4C are views to illustrate an example of an operation corresponding to rotation of a mobile device according to an embodiment of the present disclosure. For example, FIGS. 4A, 4B, and 4C illustrate a display which is disposed on the entire outer circumference according to an embodiment of the present disclosure.

Referring to FIGS. 4A to 4C, the display 110 is disposed enclosing the outer circumference of the body 100. Accordingly, various screens are displayed along the entire outer circumference of the mobile device of the bangle type as shown in FIGS. 4A, 4B, and 4C.

The body 100 may be rotatable as shown in FIGS. 2A, 2B, and 3. In this case, the user may rotate the display 110 in the first direction or the second direction manually. The screen may be changed to a previous screen or a next screen according to a rotation direction as shown in FIGS. 4B and 4C.

Although the screen is changed by rotating the display in the embodiments of the present disclosure illustrated in FIGS. 2A to 4C, the operation may be controlled by rotating the body of the mobile device. Hereinafter, an embodiment of the present disclosure in which an operation is controlled according to a motion of the mobile device will be explained.

Figure 5:
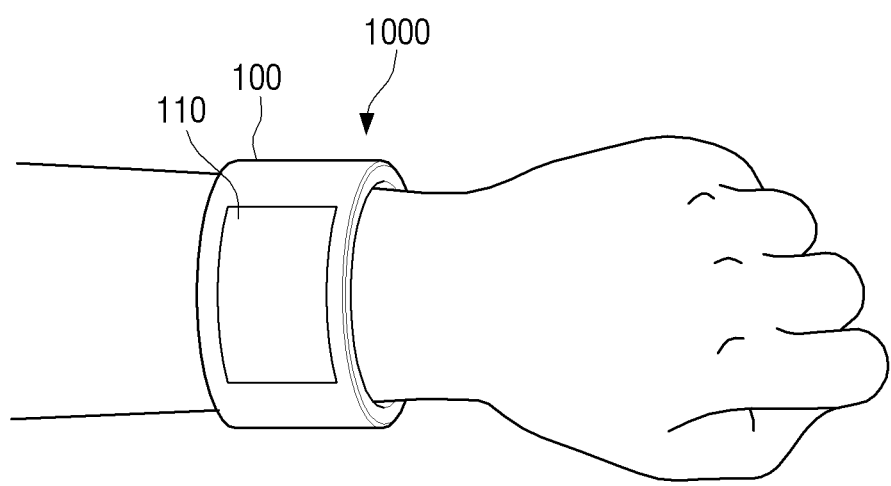
FIG. 5 is a view to illustrate a configuration of a mobile device according to an embodiment of the present disclosure.

FIG. 5 is a view to illustrate a configuration of a mobile device according to an embodiment of the present disclosure.

Referring to FIG. 5, the display 110 is disposed on a part of the outer circumference of the body 100. However, the display 110 may be formed on the entire outer circumference as shown in FIG. 4.

As illustrated in FIG. 5, the mobile device 1000 may be implemented in such a form that the user can wear the mobile device 1000 around the user's wrist. The user may make various kinds of gestures such as raising the user's arm or flicking or rotating the user's wrist while wearing the mobile device around the user's wrist.

Figure 6:
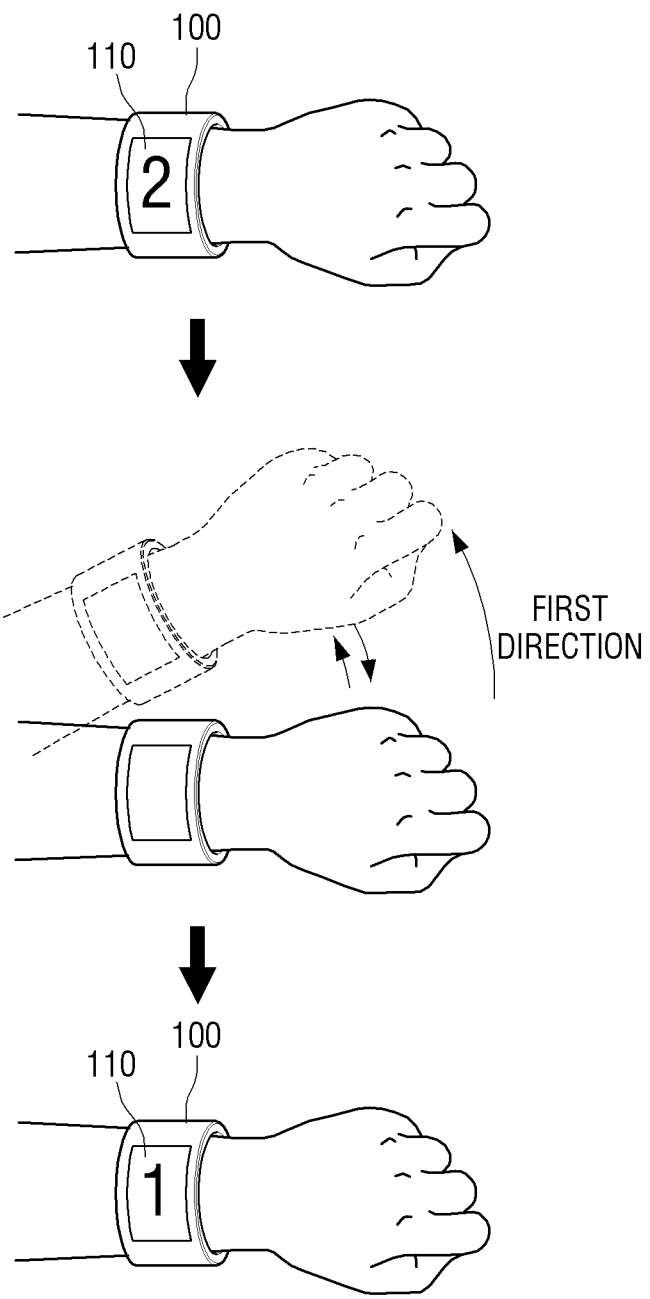
Figure 7:
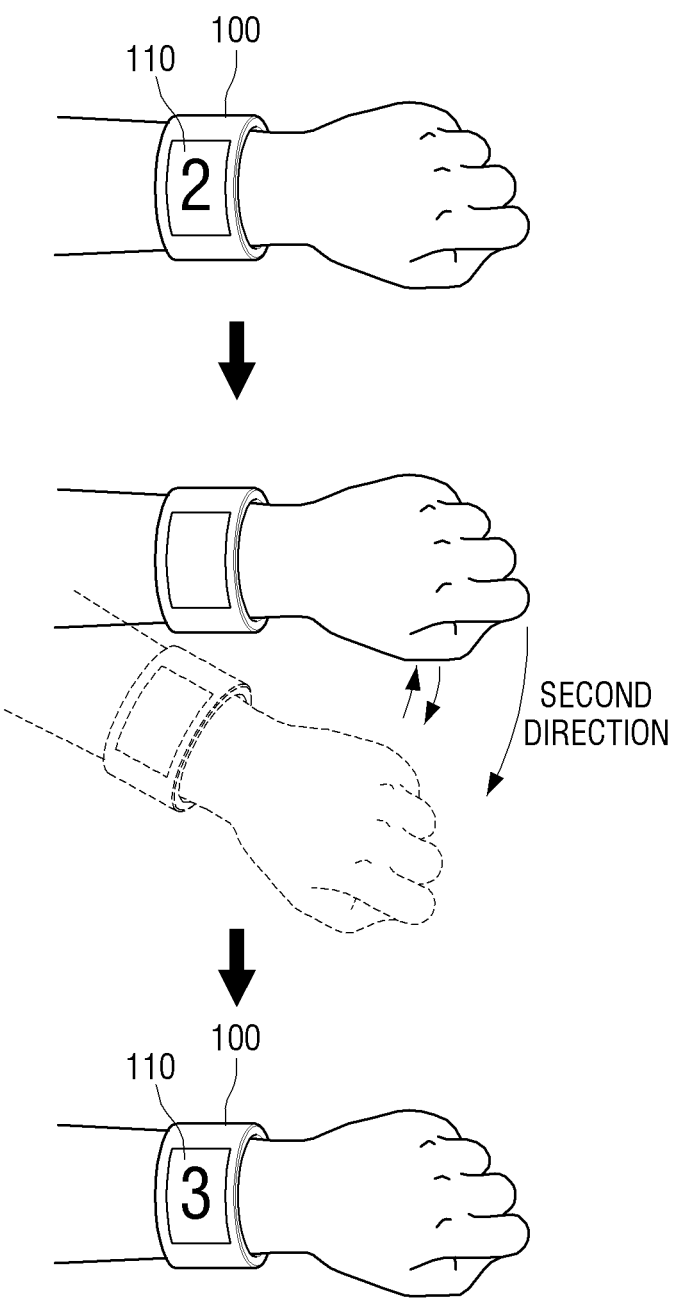

FIGS. 6, 7, and 8 are views to illustrate examples of an operation corresponding to a motion direction of a mobile device such as, for example, the mobile device of FIG. 5 according to an embodiment of the present disclosure.

For example, FIGS. 6 and 7 are views to illustrate an operation of a mobile device which is controlled according to a user gesture according to an embodiment of the present disclosure.

Referring to FIG. 6, the user may make a gesture of flicking in a first direction while wearing the mobile device around the user's wrist. The flicking gesture refers to a gesture of moving the mobile device quickly in one direction, holding the mobile device, and then returning the mobile device to an original state thereof.

When such a gesture is recognized, the controller 120 changes a screen displayed on the display 110. For example, when a motion in the first direction is detected while screen 2 is displayed, screen 1 which is a previous screen is displayed.

In contrast, when the user makes a gesture of flicking in a second direction as shown in FIG. 7, screen 3 which is a next screen is displayed.

The controller 120 may skip over a plurality of phases according to a degree of flicking operation, and, when the user holds the flicking operation without returning to the original state, the controller 120 may continue to change the screen.

FIG. 8 illustrates a case in which the user makes a gesture of rotating the user's wrist while wearing the mobile device according to an embodiment of the present disclosure.

Referring to FIG. 8, when screen 1 is displayed on the display 110, the user may rotate the mobile device by twisting the user's wrist. In this state, when the user returns the mobile device to an original state thereof after a predetermined time ('a' second) elapses, the screen is changed during that time and screen n is displayed. Although not shown in the drawing, a different screen may be displayed by rotating the mobile device in the opposite direction to that illustrated in FIG. 8.

In addition, besides the screen changing operation, other operations such as an editing operation may be performed according to a motion of the mobile device.

Figure 9:
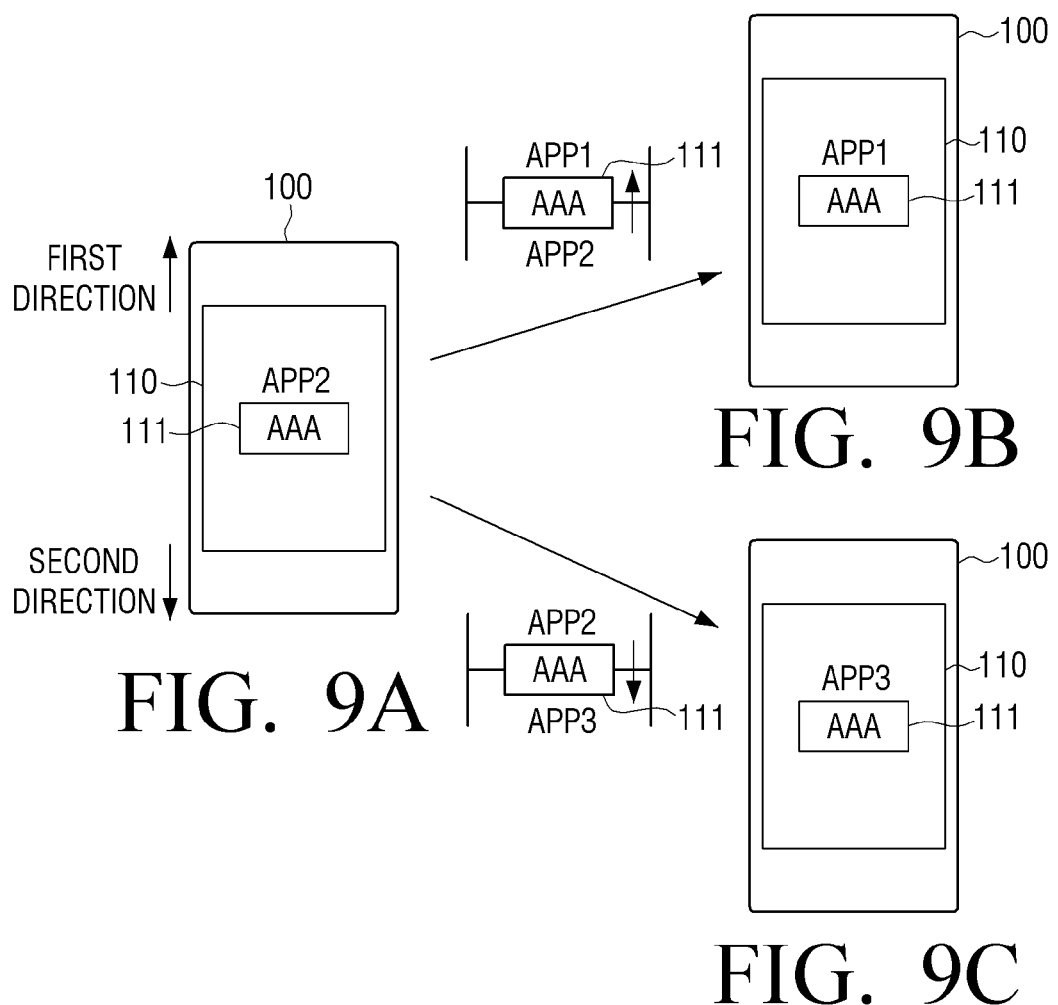
FIGS. 9A, 9B and 9C are views to illustrate an operation corresponding to a motion direction of a mobile device such as, for example, the mobile device of FIG. 5 according to an embodiment of the present disclosure.

FIGS. 9A, 9B and 9C are views to illustrate an operation corresponding to a motion direction of a mobile device such as, for example, the mobile device of FIG. 5 according to an embodiment of the present disclosure.

For example, FIGS. 9A, 9B and 9C are views to illustrate an editing operation of the mobile device according to an embodiment of the present disclosure.

Referring to FIGS. 9A, 9B, and 9C, the display 110 of the mobile device displays a screen (APP2) including an object 111 such as an image, a text, a photo, and/or the like.

In this state, when the user makes a gesture of flicking the user's wrist in the first direction or second direction, the screen is changed according to the moving direction. For example, as illustrated in FIG. 9B, when a gesture in the first direction is made, the screen is changed to a screen APP1 which is a previous screen of the current screen APP2, and the object 111 is moved to the screen APP1. When the mobile device returns to the original position thereof, the screen APP1 including the object 111 is displayed.

In contrast, as illustrated in FIG. 9C, when a gesture in the second direction is made, the screen is changed to a screen APP3 which is a next screen of the current screen APP2. Accordingly, the object 111 is displayed on the screen APP3.

According to various embodiments of the present disclosure, the object 111 may include various kinds of objects such as photos, images, texts, and/or the like. In order to move the display of the object, an operation of specifying the object may be performed first. For example, the user may change the object display screen by specifying the object 111 by touching the object 111 and then flicking the user's wrist in the first direction or the second direction. The touch may include various kinds of touch operations such as a simple touch, a long touch, a double touch, and/or the like. When the user touches the object 111, the controller 120 fixes the touched object 111 and changes a background screen to a previous screen or a next screen.

According to various embodiments of the present disclosure, when the user photographs an image in the mobile device using a photographing program or when the user generates a text or an image through a notepad, a document creating program, or a paint, the photographed image or the text or image generated by the corresponding task may be directly utilized in a specific application. For example, by making a gesture in the first direction or second direction while the object such as the photographed image or text or image is displayed, an application to which the generated object is applied may be selected. For example, when a gesture in the first direction is made, a program for managing a stored still image or moving image content may be executed and the corresponding object may be stored. In addition, when a gesture in the second direction is made, an e-mail program may be executed and an email to which the corresponding object is attached may be generated.

According to various embodiments of the present disclosure, to detect the user gesture described above, the motion sensor 140 may further include an acceleration sensor, a geomagnetic sensor, a gyro sensor, and/or the like.

Figure 10:
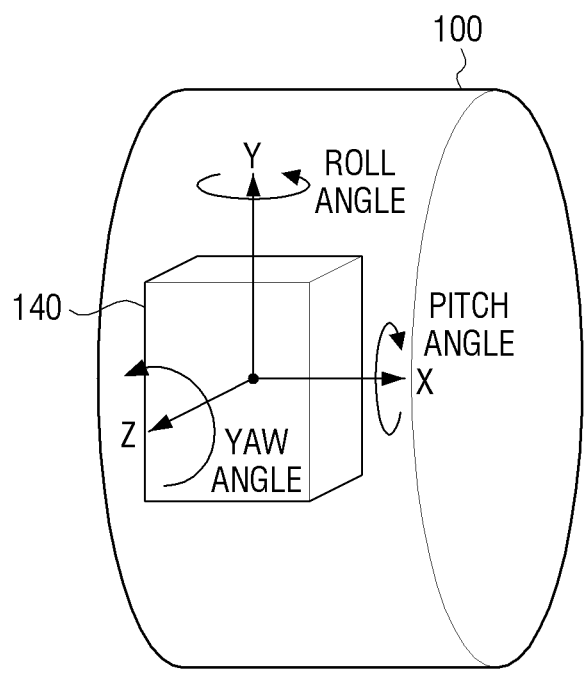
FIG. 10 is a view to illustrate a method for detecting a motion of a mobile device according to an embodiment of the present disclosure.

FIG. 10 is a view to illustrate an example of a method for detecting a motion in a mobile device according to an embodiment of the present disclosure.

Referring to FIG. 10, the motion sensor 140 is mounted in the body 100 and detects a motion of the mobile device.

According to various embodiments of the present disclosure, when the motion sensor 140 is provided in the mobile device, X, Y, and Z-axes, which are orthogonal to one another, are determined according to a placement direction of the motion sensor 140. A pitch angle refers to a rotation angle that is measured when the mobile device is rotated about the Y-axis, and a roll angle refers to a rotation angle that is measured when the mobile device is rotated about the X-axis. A yaw angle refers to a rotation angle that is measured when the mobile device is rotated about the Z-axis. The pitch angle and the roll angle are measured by the acceleration sensor, and the yaw angle is measured by the geomagnetic sensor or gyro sensor.

According to various embodiments of the present disclosure, the acceleration sensor and the geomagnetic sensor may include a 2-axis fluxgate or a 3-axis fluxgate. However, to manufacture a thin mobile device, the acceleration sensor and the geomagnetic sensor may be made of the 2-axis fluxgate.

The controller 120 may calculate the pitch angle, roll angle, and yaw angle based on output values of the acceleration sensor and the geomagnetic sensor, and may determine a user gesture according to a resulting value of the calculation.

According to various embodiments of the present disclosure, the controller 120 may normalize the output values of the X-axis and Y-axis acceleration sensors to map them onto output values of a predetermined range. For example, the normalizing process may be performed using Equation 1:

$$Xt_{norm} = \frac{2Xt - (Xt_{max} + Xt_{min})}{Xt_{max} - Xt_{min}} \qquad \text{Equation 1}$$

$$Yt_{norm} = \frac{2Yt - (Yt_{max} + Yt_{min})}{Yt_{max} - Yt_{min}}$$

where Xt is an output value of the X-axis acceleration sensor, Yt is an output value of the Y-axis acceleration sensor, $Xt_{norm}$ is a normalized output value of the X-axis acceleration sensor, and $Yt_{norm}$ is a normalized output value of the Y-axis acceleration sensor.

When the normalizing is performed, the controller 120 may calculate a pitch angle (θ) and a roll angle (φ) using Equation 2:

$$\theta = \sin^{-1}(Xt_{norm}) \qquad \text{Equation 2}$$

$$\phi = \sin^{-1}\left(\frac{Yt_{norm}}{\cos\theta}\right)$$

where $Xt_{norm}$ is a normalized output value of the X-axis acceleration sensor, $Yt_{norm}$ is a normalized output value of the Y-axis acceleration sensor, θ is a pitch angle, and φ is a roll angle.

In contrast, according to various embodiments of the present disclosure, the geomagnetic sensor may be implemented in a configuration similar to that of the acceleration sensor. First, the controller 120 may normalize the output values of the X-axis and Y-axis fluxgates in the geomagnetic sensor using Equation 3:

$$Xf_{norm} = \frac{(Xf - Xf_{bias})}{Xf_{sf}} \quad \text{Equation 3}$$

$$Yf_{norm} = \frac{(Yf - Yf_{bias})}{Yf_{sf}} * \alpha$$

$$Xf_{bias} = \frac{Xf_{max} + Xf_{min}}{2},$$

$$Xf_{sf} = \frac{Xf_{max} - Xf_{min}}{2}$$

$$Yf_{bias} = \frac{Yf_{max} + Yf_{min}}{2},$$

$$Yf_{sf} = \frac{Yf_{max} - Yf_{min}}{2}$$

where Xf and Yf are real output values of the X-axis and Y-axis geomagnetic sensors, respectively, $Xf_{norm}$ and $Yf_{norm}$ are normalized values of the X-axis and Y-axis, $Xf_{max}$ and $Xf_{min}$ are a maximum value and a minimum value of Xf, and $Yf_{max}$ and $Yf_{min}$ are a maximum value and a minimum value of Yf. Although not shown in Equation 3, each of the normalized values may further be multiplied by a predetermined constant.

The controller 120 may calculate a direction in which the motion sensor 140 is placed in a 3-dimensional space, for example, azimuth, using the normalized values. The azimuth is a 3-dimensional space value that is represented by three axes, and thus an output value of the Z-axis which is perpendicular to the plane formed by the X-axis and Y-axis is required to calculate the azimuth. However, because the output value of the Z-axis cannot be directly calculated in the 2-axis fluxgate, the output value of the Z-axis should be calculated virtually. The controller 120 may calculate a virtually normalized output value of the Z-axis by assigning the normalized output values of the X-axis and Y-axis, the pitch angle, the roll angle, and the yaw angle using Equation 4:

$$Zf_{norm} = \frac{(Xf_{norm} * \sin\theta - Yf_{norm} * \cos\theta * \sin\phi + \sin\lambda)}{\cos\theta * \cos\phi} \quad \text{Equation 4}$$

where Zf is a virtual voltage value of the Z-axis, $Zf_{norm}$ is a normalized value of the Z-axis voltage value, $\lambda$ is a yaw angle, $\theta$ is a pitch angle, and $\phi$ is a roll angle.

When the normalized value of the virtual Z-axis voltage value is calculated in this way, azimuth is finally calculated using Equation 5:

$$\alpha = \tan^{-1}\left(\frac{Zf_{norm}*\sin\phi - Yf_{norm}*\cos\phi}{Xf_{norm}*\cos\theta + Yf_{norm}*\sin\theta * \sin\phi + Zf_{norm}*\sin\theta*\cos\phi}\right) \quad \text{Equation 5}$$

where $\alpha$ is azimuth, $Xf_{norm}$, $Yf_{norm}$, and $Zf_{norm}$ are normalized output values of the X-axis, Y-axis, and Z-axis fluxgates, respectively, $\theta$ is a pitch angle, $\phi$ is a roll angle, and $\lambda$ is a yaw angle.

The controller 120 may calculate the yaw angle by comparing the azimuth calculated using the geomagnetic sensor and previously calculated azimuth. For example, when the previous azimuth is $\alpha$ and the current azimuth is $\alpha$+30, the controller 120 may determined that the mobile device is rotated by 30 degrees in a clockwise direction. In addition, the controller 120 may determine which direction the mobile device is placed in and how much the mobile device is tilted according to a change in the pitch angle or roll angle calculated by the acceleration sensor.

When the user wears the mobile device around the user's wrist, and raises the user's arm and looks at the mobile device, the plane formed by the X-axis and the Y-axis is maintained parallel with the surface of the earth as shown in FIG. 10. In this state, when the user makes a gesture of flicking, equilibrium is maintained in the X-axis and Y-axis directions and rotation is performed about the Z-axis. Therefore, the yaw angle is changed. The flicking gesture is different from a simple moving gesture in that the flicking gesture accelerates, abruptly stops, and then returns to an original position thereof. The controller 120 may determine whether the gesture accelerates or not by counting a time from when a motion is detected by the motion sensor 140 to when the motion is stopped. As described above, the controller 120 may determine whether the flicking gesture is made or not based on a change in the yaw angle and a time during which the yaw angle is changed.

In addition, when the user makes a gesture of rotating the user's wrist, rotation is performed about the X-axis. Accordingly, the controller 120 may determine whether the user makes the gesture of rotating the user's wrist or not based on a change in the pitch angle and a time during which the pitch angle is changed.

In addition, when the user lowers the user's arm in a palm down direction or when the user raises the user's arm to look the display 110, the rotation is performed about the Y-axis. Therefore, the controller 120 may determine whether the user raises or lowers the user's arm based on a change in the roll angle and a time during which the roll angle is changed.

According to an embodiment of the present disclosure, the motion sensor may be implemented in various forms. For example, when the mobile device is configured as shown in FIGS. 2A, 2B, and 3, the motion sensor may detect a rotation direction and a degree of rotation according to a relative rotation between the first part and the second part. In this configuration, the motion sensor may include a geomagnetic sensor, a gyro sensor, an acceleration sensor, and/or the like.

According to various embodiments of the present disclosure, the motion sensor may include a geomagnetic sensor, a gyro sensor, and an acceleration sensor as described in FIG. 10. In this case, even when the body 100 is formed in an integrated configuration rather than a two-part configuration as shown in FIGS. 2A, 2B, and 3, various motions such as rotation or movement may be detected.

As described above, the mobile device is rotatable and movable in various directions, and the controller 120 may detect the rotation or movement and may perform various operations according to an exemplary embodiment.

FIGS. 11A, 11B, 11C, 12A, 12B, 12C, 13A, 13B, and 13C are views to illustrate various control operations of a mobile device according to various embodiments of the present disclosure.

For example, FIGS. 11A, 11B, 11C, 12A, 12B, 12C, 13A, 13B, and 13C are views to illustrate examples of an operation performed according to a motion of the mobile device according to an embodiment of the present disclosure.

Figure 11A:
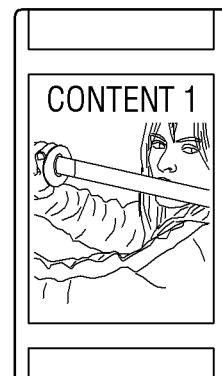
FIGS. 11A, 11B, 11C, 12A, 12B, 12C, 13A, 13B, and 13C are views to illustrate various control operations of a mobile device according to various embodiments of the present disclosure.
Figure 11B:
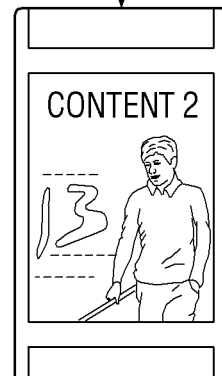
Figure 11C:
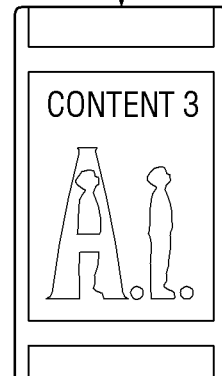

Referring to FIGS. 11A, 11B, and 11C, a case in which a motion is made while a content is being played back is illustrated. When the mobile device is moved while a content is being played back, a screen is changed according to a direction of the motion. For example, when a motion in a first direction is detected while a single content playback screen (content 2) is being displayed as shown in FIG. 11B, the controller 120 plays back content 1 which is placed before content 2 in a content arrangement order. Accordingly, as shown in FIG. 11A, the content playback screen is changed to a previous content playback screen (content 1).

In contrast, when the mobile device is moved in a second direction opposite to the first direction, a next content (content 3) is played back and the content playback screen is changed to a next content playback screen as shown in FIG. 11C.

According to various embodiments of the present disclosure, the content may be content that is stored in the storage 130, or may be content that is provided from a server apparatus connected through a network.

According to various embodiments of the present disclosure, the content playing back operation may be changed instead of the content. For example, when the mobile device is moved in the first direction, rewinding may be performed, and, when the mobile device is moved in the second direction, fast forwarding may be performed.

According to various embodiments of the present disclosure, the content may include a variety of content such as a moving image content, a music content, a photo content, an e-book content, and/or the like.

Figure 12A:
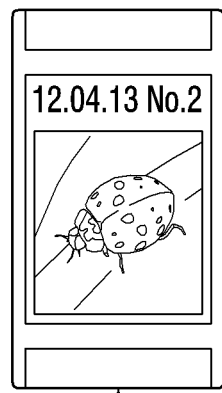
Figure 12B:
Figure 12C:
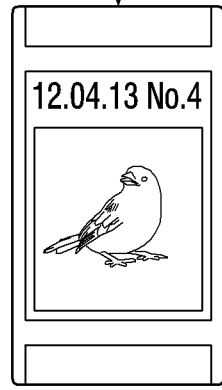

Referring to FIGS. 12A, 12B, and 12C, a control operation performed while a photo content is being displayed is illustrated. As illustrated in FIGS. 12A to 12C, a screen is changed to a previous photo screen or a next photo screen according to a motion direction of the mobile device.

Figure 13A:
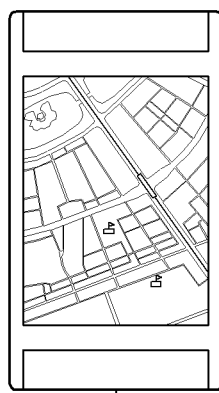
Figure 13B:
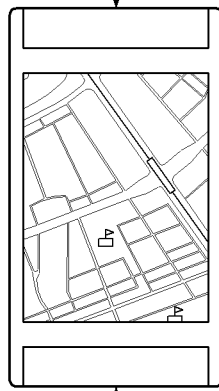
Figure 13C:
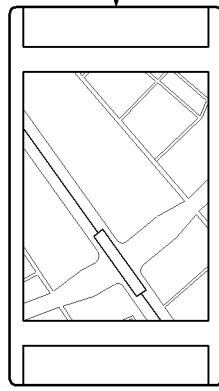

Referring to FIGS. 13A, 13B, and 13C, a case in which a zoom-in operation and a zoom-out operation are performed is illustrated. As illustrated in FIG. 13B, when the mobile device is moved in the first direction while a still image such as a photo or a map is being displayed, zooming-out is performed. Accordingly, a screen is changed to a zoom-out screen as illustrated in FIG. 13A. In contrast, as illustrated in FIG. 13C, when the mobile device is moved in the second direction, zooming-in is performed and the screen is changed to a zoom-in screen.

According to various embodiments of the present disclosure, the controller 120 may change a screen arrangement direction according to a motion of the mobile device.

Figure 14:
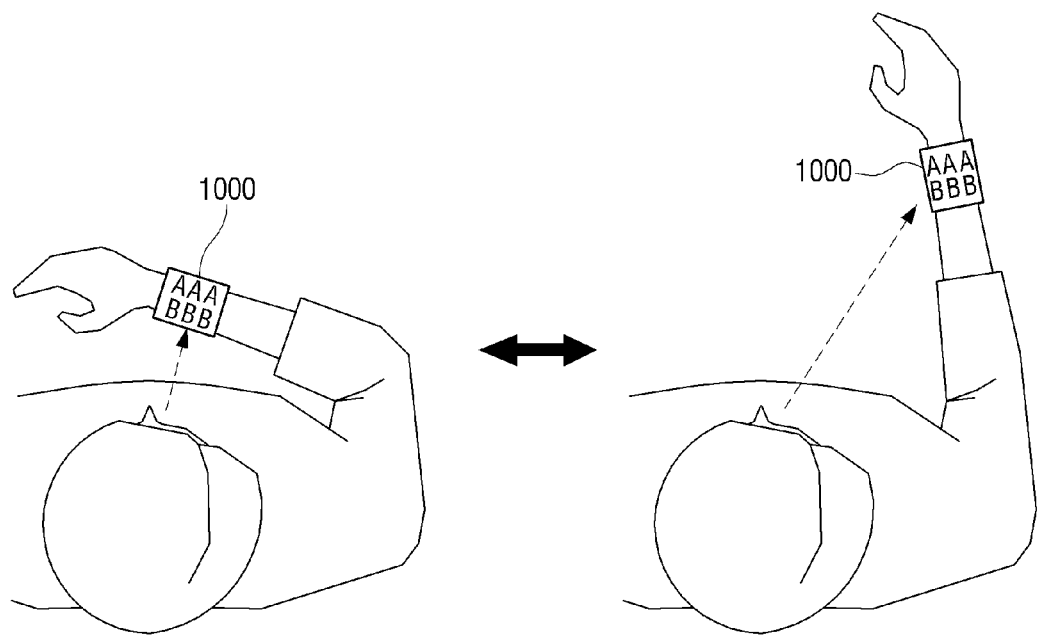
FIG. 14 is a view to illustrate an operation of changing a screen arrangement direction according to a motion of a mobile device according to an embodiment of the present disclosure.

FIG. 14 is a view to illustrate an operation of changing a screen arrangement direction according to a motion of a mobile device according to an embodiment of the present disclosure.

Referring to FIG. 14, in a position in which the user raises the user's right hand while wearing a mobile device 1000 around the user's right wrist, and sees a display 110 of the mobile device 1000, the width of the display screen is seen as being greater than the height. Accordingly, the screen is placed in a horizontal direction as shown in FIG. 14. In this state, when the user unfolds the user's right arm, the rotation is performed with reference to the Z-axis from among the X, Y, and Z-axis of FIG. 10. For example, when the user unfolds the user's right arm, the yaw angle is changed. The controller 120 changes the screen direction when the yaw angle is changed more than a predetermined threshold. Accordingly, the screen is placed in a vertical direction.

According to various embodiments of the present disclosure as described above, the controller 120 may change the screen to a screen that is easy to see according to a position of the user, and may display the screen.

According to various embodiments of the present disclosure, the controller 120 may perform activating or inactivating according to a motion of the mobile device. The inactivating refers to an operation of turning off backlight of the display 110 or displaying a power saving screen or other monochrome screens. Alternatively, the inactivating may refer to a lock state. The activating refers to an operation of returning to the original screen from such an inactivation state. Alternatively, the activating may refer to a unlock state.

Figures 15A, 15B, 15C:
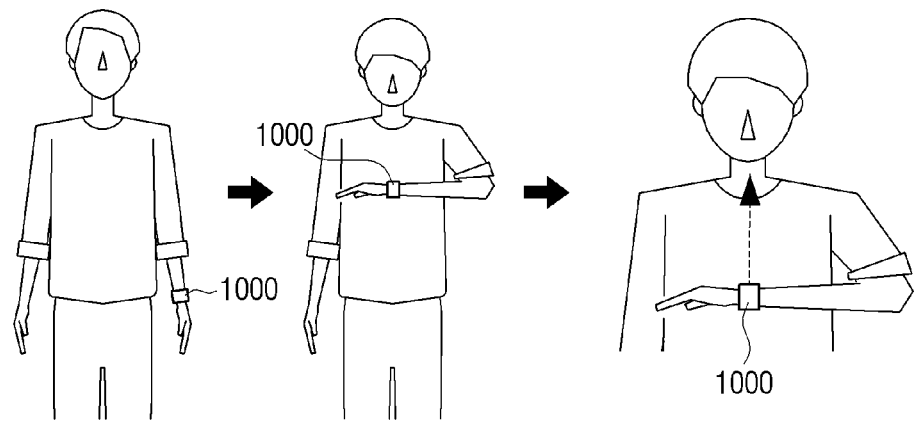
FIGS. 15A, 15B, and 15C are views to illustrate a method for activating a mobile device according to a motion of the mobile device according to an embodiment of the present disclosure.

FIGS. 15A, 15B, and 15C are views to illustrate an operation performed according to a motion of a mobile device according to an embodiment of the present disclosure.

For example, FIGS. 15A, 15B, and 15C are views to illustrate an operation performed according to a motion of the mobile device and a change in a user's position according to an embodiment of the present disclosure.

Referring to FIGS. 15A, 15B, and 15C, the controller 120 compares a motion state detected by the motion sensor 130 and a condition pre-stored in the storage 130. The condition includes various state conditions such as a pitch angle, a roll angle, a yaw angle, rotation information, and a moving time, which are detected by the motion sensor 140. The condition may be divided into a use condition and a non-use condition. A manufacturer of the mobile device or a content creator may make a plurality of test subjects wear the mobile device, may calculate detecting results of the motion sensor 140, which are measured when the mobile device is in use and when the mobile device is not in use, may set the calculated values as a use condition or a non-use condition, and may store the values.

When the mobile device (e.g., the controller 120) determines that the non-use condition is satisfied, the controller 120 may inactivate the display 110. When the mobile device (e.g., the controller 120) determines that a detecting result of the motion sensor 140 satisfies a predetermined use condition, the controller 120 may activate the display 110.

When the user lowers the user's arm while wearing the mobile device 1000 around the user's wrist as illustrated in FIG. 15A, the controller 120 inactivates the display 110. In this state, when the user raises the user's arm as illustrated in FIG. 15B, the controller 120 detects user's eyes. When the mobile device (e.g., the controller 120) determines that the user sees the mobile device as shown in FIG. 15C, the controller 120 activates the display 110. According to various embodiments of the present disclosure, to detect the user's eyes, the mobile device may further include a photographer such as a camera.

Figure 16:
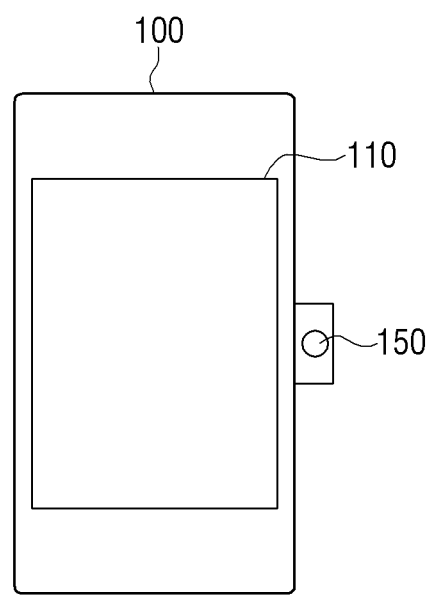
FIG. 16 is a view to illustrate a configuration of a mobile device which further includes a camera to recognize a user according to an embodiment of the present disclosure.

FIG. 16 is a view to illustrate a configuration of a mobile device which further includes a camera to recognize a user according to an embodiment of the present disclosure.

Referring to FIG. 16, the mobile device 100 includes a photographer 150 (e.g., a camera) provided on one side of the display 110. The photographer 150 may include a lens and an image sensor. A general-purpose lens, a wide-angle lens, a zoom lens, and the like may be used in the photographer 150. The kind of lens used in the photographer 150 may be determined according to a kind of a mobile device and a characteristic, and a use environment. The image sensor includes a Complementary Metal Oxide Semiconductor (CMOS) and a Charge Coupled Device (CCD). According to various embodiments of the present disclosure, when the mobile device is rotatable as shown in FIGS. 2A, 2B, and 3, the photographer 150 may be disposed on a side surface of the second part 100-2 so that the location of the photographer 150 can be maintained even when the mobile device is rotated.

Although only a single photographer is provided in FIG. 16, according to various embodiments of the present disclosure, a plurality of photographers may be provided. In addition, locations of the photographers may be determined variously.

Figures 17A, 17B:
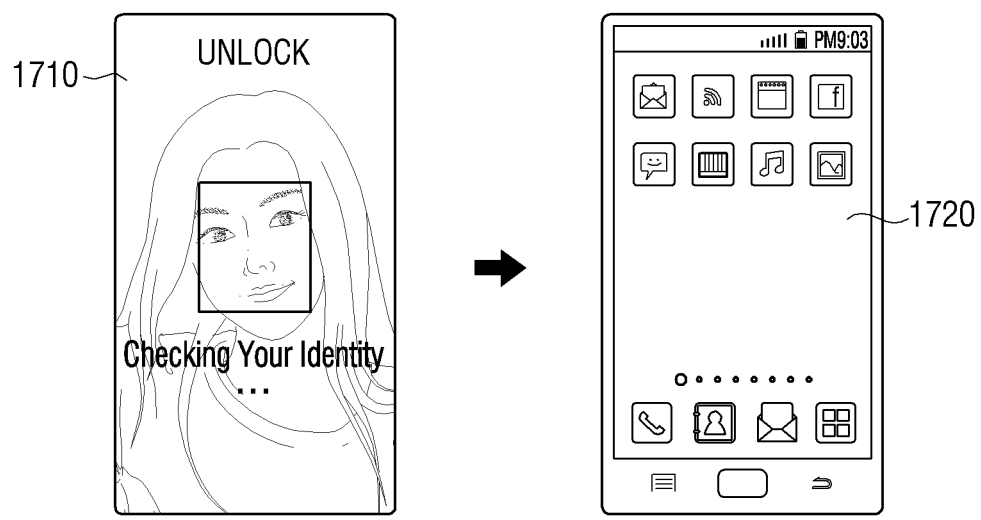
FIGS. 17A and 17B are views to illustrate a method for recognizing a user and performing a unlock operation according to an embodiment of the present disclosure.

FIGS. 17A and 17B are views to illustrate a method for recognizing a user and performing a unlock operation according to an embodiment of the present disclosure.

For example, FIGS. 17A and 17B are views to illustrate a process of performing a unlock operation using a photographed image according to an embodiment of the present disclosure.

According to various embodiments of the present disclosure, the controller 120 determines whether a detecting result of the motion sensor 140 satisfies a predetermined condition or not while the mobile device is locked. The predetermined condition may be a use condition such as information on a pitch angle, a roll angle, and a yaw angle which are measured when the user raises the user's arm to see the mobile device as shown in FIG. 15B, and a holding time of the user gesture. For example, when the pitch angle, the roll angle, the yaw angle, and/or the like satisfy a condition stored in the storage 130 for a predetermined time, the controller 120 determines that the user moves the mobile device to a position at which use of the mobile device is easy. Then, the controller 120 may control the photographer 150 to photograph an image.

Referring to FIG. 17A, the display 110 displays a photographed image 1710. The controller 120 analyzes the photographed image and recognizes a characteristic of the image. For example, the controller 120 may recognize a user's eyes or a user's face. Specifically, the controller 120 divides the photographed image 1710 into a plurality of pixel blocks. The controller 120 calculates an average of pixel values of pixels included in each pixel block and sets the average as a representative value of the corresponding pixel block. The controller 120 selects the pixel blocks one by one in sequence from the upper corner of the leftmost side in a right line direction and compares a representative value of the selected pixel block and representative values of the adjacent pixel blocks, and repeats this operation. When a difference between the representative values is greater than or equal to a predetermined threshold, the controller 120 may determine the corresponding pixel block as a pixel block corresponding to an edge. By performing this operation, the controller 120 groups the pixel blocks having similar pixel values from among the pixel blocks divided with reference to the edge, and recognizes the grouped pixel blocks as a single object.

The controller 120 searches for an object that has information corresponding to information registered in the storage 130 from among the recognized objects. When a pixel block group having pixel values corresponding to predetermined face color is searched, the controller 120 may recognize the pixel block group as a user face.

Referring to FIGS. 17A and 17B, when the user face is recognized as illustrated in FIG. 17A and the recognized face is determined as an already registered user face, the controller 120 performs unlocking, and displays a desktop screen 1720 or a final screen displayed when the locking operation is performed, as illustrated in FIG. 17B.

Although the user face is photographed and the unlocking is performed in FIG. 17, according to various embodiments of the present disclosure, the unlocking may be performed using a password screen.

Figures 18A, 18B:
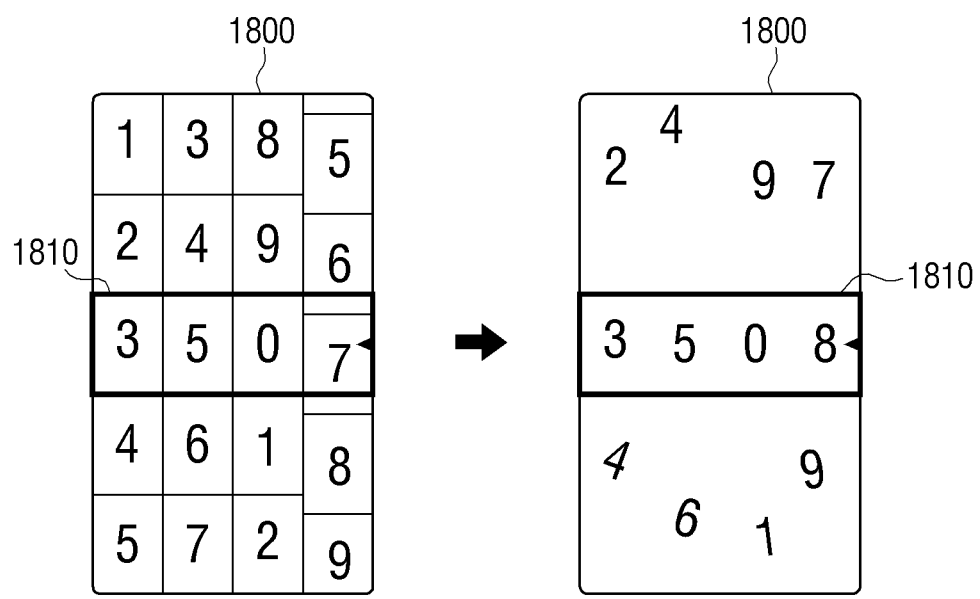
FIGS. 18A and 18B are views to illustrate an example of a password screen to perform a unlock operation according to an embodiment of the present disclosure.

FIGS. 18A and 18B are views to illustrate an example of a password screen to perform a unlock operation according to an embodiment of the present disclosure.

Referring to FIGS. 18A and 18B, an operation of the mobile device which performs unlocking using a password according to an embodiment of the present disclosure is illustrated. When the motion of the mobile device 1000 satisfies the use condition as shown in FIG. 15, the controller 120 displays a password input screen 1800 as illustrated in FIG. 18A. The password input screen 1800 may be comprised of a plurality of lines according to a shape of the mobile device of the bangle type like an analogue dial. The user inputs a password in a password input area 1810 by scrolling each line in a touch and drag method. When a determined password is input, the password input screen 1800 is changed and the unlocking operation is performed as shown in FIG. 18B. Accordingly, a desktop screen or a final screen is displayed.

In the above-described various embodiments of the present disclosure, the controller 120 is operated when the motion detected by the motion sensor 140 satisfies the predetermined use condition. However, according to various embodiments of the present disclosure, the controller 120 may start to be operated when the motion is held for a predetermined time without satisfying a separate use condition.

Figure 19:
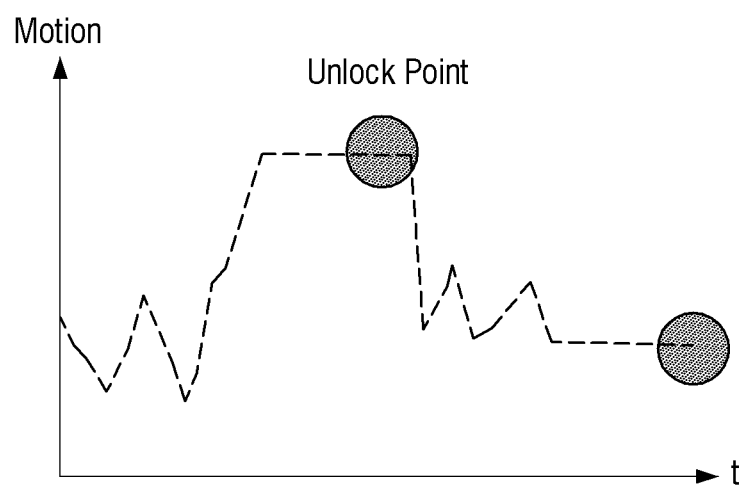
FIG. 19 is a view to illustrate a method for performing a unlock operation according to a change in a tilt angle of a mobile device according to an embodiment of the present disclosure.

FIG. 19 is a view to illustrate a method for performing a unlock operation according to a change in a tilt angle of a mobile device according to an embodiment of the present disclosure.

For example, FIG. 19 is a view to illustrate a method for performing a control operation according to a motion state according to an embodiment of the present disclosure.

Referring to FIG. 19, the output value of the motion sensor 140 that has been frequently changed is maintained within a predetermined range when the user fixes the user's position. As illustrated in FIG. 19, when the output value detected by the motion sensor 140 is maintained for a predetermined time, the controller 120 performs a unlock operation at that time.

Figure 20:
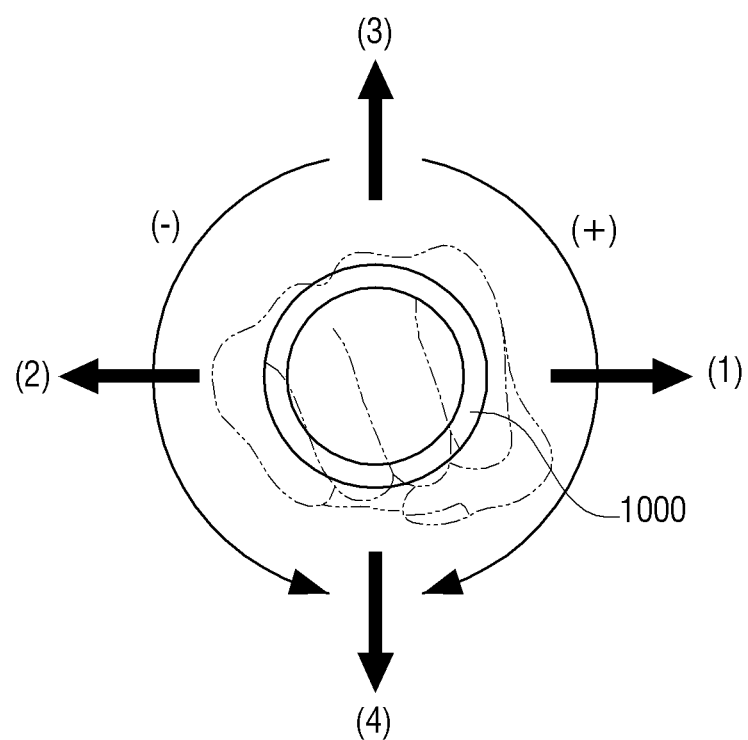
FIG. 20 is a view to illustrate examples of a rotation direction and a motion direction of a mobile device according to an embodiment of the present disclosure.

In addition, diverse motions of the mobile device may be measured according to shapes of the motion sensor 140. FIG. 20 illustrates examples of the motion of the mobile device according to an embodiment of the present disclosure.

FIG. 20 is a view to illustrate examples of a rotation direction and a motion direction of a mobile device according to an embodiment of the present disclosure.

Referring to FIG. 20, the mobile device 1000 may be rotated in a (+) direction or (−) direction while the mobile device 1000 is worn around the user's wrist. In addition, the mobile device 1000 may be moved in various directions such as directions (1) to (4). To detect the rotation in the (+) or (−) direction, the body 100 of the mobile device may be configured as illustrated in FIGS. 2A, 2B, and 3. In addition, the mobile device may be configured to include a geomagnetic sensor or a gyro sensor and an acceleration sensor to detect the movement in the directions (1) to (4) as well as the rotation in the (+) or (−) direction as illustrated in FIG. 10.

The controller 120 may detect diverse motions of the mobile device such as a shaking pattern, a movement order, a rhythm, and a direction using the motion sensor 140. When a different function matches each of these motions and is stored in the storage 130, the controller 120 performs a function matching a detected motion.

When the mobile device further includes the photographer as shown in FIG. 16, the controller 120 may determine a user position by combining a detecting result of the motion sensor 140 and a photographing result of the photographer 150. For example, when the motion detected by the motion sensor 140 satisfies the use condition, the controller 120 controls the photographer 150 to photograph an image. The controller 120 analyzes the photographed image and detects a location of the user's face or eyes. When it is determined that the user face is not detected or the user's eyes are not on the mobile device, the controller 120 may maintain a previous state without performing a separate control operation. For example, when the mobile device is in the lock state, the controller 120 may maintain the lock state without unlocking. In contrast, when the user's face or eyes are detected, the controller 120 may perform various control operations as describe above.

In the above-described various embodiments of the present disclosure, the user's position is determined using the photographing operation and the motion detecting operation. However, the user's position may be recognized by detecting a muscular movement of the user other than using the photographing operation. For example, according to various embodiments of the present disclosure, the mobile device may include an Electromyogram (EMG) sensor disposed on a part of the inner circumference of the body of the mobile device that is directly in contact with the user's body. The controller 120 recognizes a change in the user's position based on a detecting value output from the EMG sensor, and performs a control operation corresponding to the recognized change in the position.

According to various embodiments of the present disclosure, the mobile device may further include a light sensor. In this case, the controller 120 may measure brightness using the light sensor and may automatically determine whether to display information according to the brightness. For example, when the measured brightness is higher than predetermined illuminance, the mobile device may display information, and, when the brightness is low, the mobile device may not display information. In addition, when the brightness is low, the mobile device may display a caution screen and may prevent an accident.

When the mobile device is implemented in a bangle type such that the mobile device can be worn around the user's wrist as described above, the mobile device may perform various functions which are set according to a position or a direction of the wrist, a speed and a direction of a gesture, a number of times that rotation is input, a direction of rotation input, an intensity of rotation input, and information on whether rotation input is retained or not.

For example, when the user unfolds the user's arm and moves quickly or irregularly, the mobile device may turn off a screen. In contrast, when the user moves slowly or when the mobile device is determined to have been placed where the user can see the mobile device in a still state, the mobile device may display a screen.

According to various embodiments of the present disclosure, when the user lowers the user's arm, the mobile device may change a mode to a standby mode, and, when the user raises the user's arm to middle height as if the user looks a watch, the mobile device may perform a unlock operation. In this case, the mobile device may perform the unlock operation more safely by displaying a face recognition screen or a unlock pattern.

According to various embodiments of the present disclosure, when the user raises the user's arm higher than the user's eyes, the mobile device may perform various operations such as executing an application through face recognition, entering a standby mode, automatically playing back a content, text auto scroll, and the like.

The mobile device may be implemented in various shapes. Hereinafter, shapes of the mobile device according to various exemplary embodiments of the present disclosure will be explained.

Figures 21A, 21B:
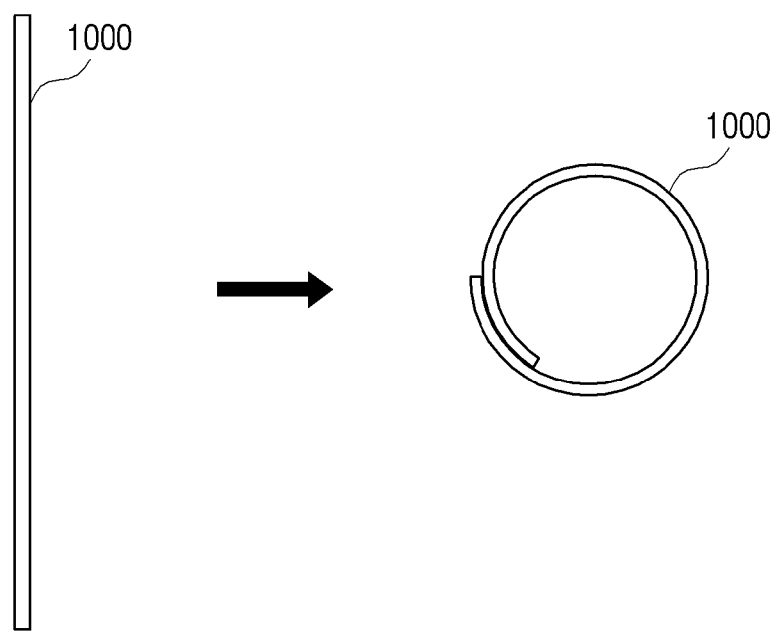
FIGS. 21A and 21B are views to illustrate a mobile device which is implemented as a flexible device according to an embodiment of the present disclosure.

FIGS. 21A and 21B are views to illustrate a mobile device which is implemented as a flexible device according to an embodiment of the present disclosure.

Referring to FIG. 21, a body of the mobile device may be made of flexible material such that the mobile device can be wound around a user's body.

In this case, a display 110 may be formed on an entire surface of one side of the body 100. The display 110 may also be made of flexible material such that the display 110 can be bent along with the body 100. For example, the mobile device 1000 is manufactured in a flat state as shown in FIG. 21A. The user places the mobile device 1000 on the user's body such as a wrist, and bends and winds the mobile device 1000 around the wrist as shown in FIG. 21B.

According to various embodiments of the present disclosure, when the mobile device 1000 is in the flat state, the controller 120 may inactivate various elements. According to various embodiments of the present disclosure, when the mobile device 1000 is bent as shown in FIG. 21, the controller 120 may activate the elements.

When one end of the body 100 is unfolded with the body 100 being in contact with the user's body, the controller 120 may display a key pad on a display area provided on the one end of the body 100.

Figure 22:
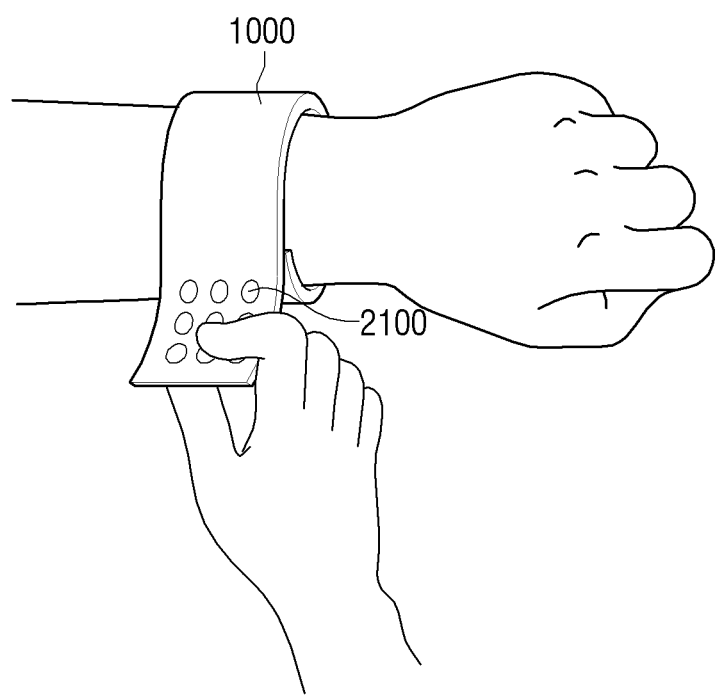
FIG. 22 is a view to illustrate an example of an operation of a mobile device which is implemented as a flexible device according to an embodiment of the present disclosure.

FIG. 22 is a view to illustrate an example of an operation of a mobile device which is implemented as a flexible device according to an embodiment of the present disclosure.

For example, FIG. 22 illustrates one end of the body 100 which is unfolded according to an embodiment of the present disclosure.

Referring to FIG. 22, in general, the user may control an operation using a touch or motion while wearing the mobile device around the user's wrist. In this case, when the user needs to input various symbols, characters, or numbers to send a message or a mail as in a messenger or a document creating program, one end of the body 100 may be unfolded as shown in FIG. 22. In this case, a key pad 2100 is displayed on the unfolded area. The user may use the mobile device 1000 by touching keys matching symbols, characters, numbers, or various commands on the key pad 2100.

Figures 23A, 23B:
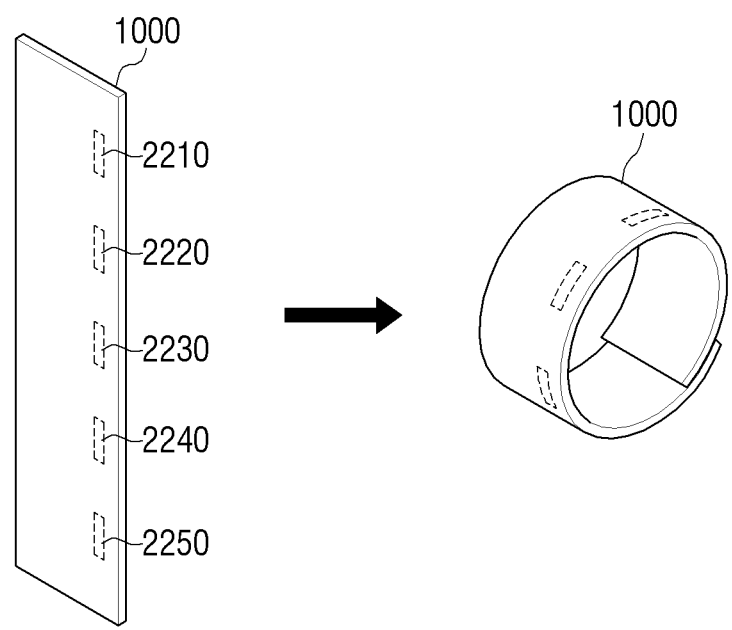
FIGS. 23A and 23B are views to illustrate an example of a configuration for detecting a bending state of a flexible device according to an embodiment of the present disclosure.

FIGS. 23A and 23B are views to illustrate an example of a configuration for detecting a bending state of a flexible device according to an embodiment of the present disclosure.

For example, FIGS. 23A and 23B are views to illustrate a mobile device which is implemented as a flexible device according to an embodiment of the present disclosure.

Referring to FIG. 23A, a plurality of bend sensors 2210, 2220, 2230, 2240, and 2250 may be provided in the mobile device 1000. The bend sensors 2210, 2220, 2230, 2240, and 2250 may be implemented by using strain gages or piezoelectric sensors as described above.

Accordingly, when the mobile device 1000 is bent in a bangle shape as illustrated in FIG. 23B, each of the bend sensors 2210 to 2250 detects bending. When the bending is detected, the controller 120 may activate the various elements including the display 110. In this case, the display 110 and the body 110 may be implemented as one body.

Figure 24:
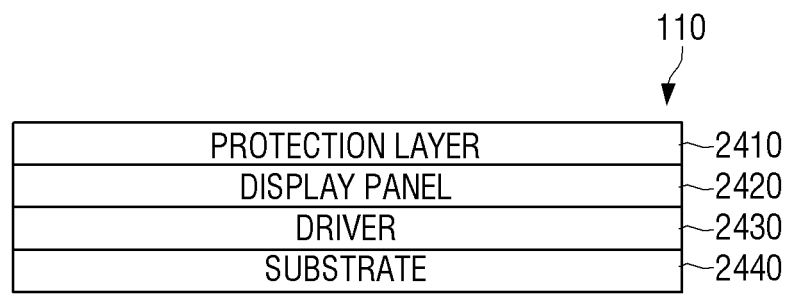
FIG. 24 is a view illustrating an example of a cross section configuration of a mobile device such as, for example, the mobile device of FIGS. 21A and 21B according to an embodiment of the present disclosure.

FIG. 24 is a view illustrating an example of a cross section configuration of a mobile device such as, for example, the mobile device of FIGS. 21A and 21B according to an embodiment of the present disclosure.

For example, FIG. 24 is a view illustrating an example of a cross section configuration of the display 110 according to an embodiment of the present disclosure.

Referring to FIG. 24, the display 110 includes a protection layer 2410, a display panel 2420, a driver 2430, and a substrate 2440.

The protection layer 2410 is formed on a surface of the display panel 2420 to protect the display panel 2420. The protection layer 2410 may be made of transparent silicon or transparent polymer material. The display panel 2420 may be implemented by using various kinds of panels as described above. The display panel may be implemented by using a Liquid Crystal Display (LCD), an Organic Light Emitting Diode (OLED), an Electrophoretic Display (EPD), an Electrochromic Display (ECD), a Plasma Display Panel (PDP), and/or the like. The driver 2430 has a driving circuit mounted therein to drive the display panel. Specifically, the driving circuit may include a transistor such as an a-si Thin Film Transistor (TFT), a Low Temperature Poly Silicon (LTPS) TFT, an Organic TFT (OTFT), and/or the like. When an electric signal is applied, the transistor makes a corresponding pixel cell in the display panel emit light. Accordingly, an image may be displayed on the display panel. Like the protection layer 2410, the substrate 2440 may be made of flexible material such as transparent silicone or transparent polymer.

The display panel 2420 may be provided with a touch sensor. The touch sensor may be implemented by using a capacitive type or a resistive type of sensor. The capacitive type calculates touch coordinates by detecting minute electricity excited in a user's body when a part of the user's body touches the surface of the display 110, using a dielectric substance coated on the surface of the display 110. The resistive type includes two electrode plates embedded in the display 110, and, when the user touches a screen, calculates touch coordinates by detecting an electric current flowing due to contact between upper and lower plates at the touched point. As described above, the touch sensor may be embodied in various forms.

The controller 120 may detect a user touch on the surface of the display 110 while the mobile device 1000 is bent as shown in FIG. 23B, and may perform a corresponding operation.

In contrast, the elements such as the display 110, the controller 120, the storage 130, and the motion sensor 140 may be packaged into a single module. In this case, the body 100 may be made of a flexible band.

Figure 25:
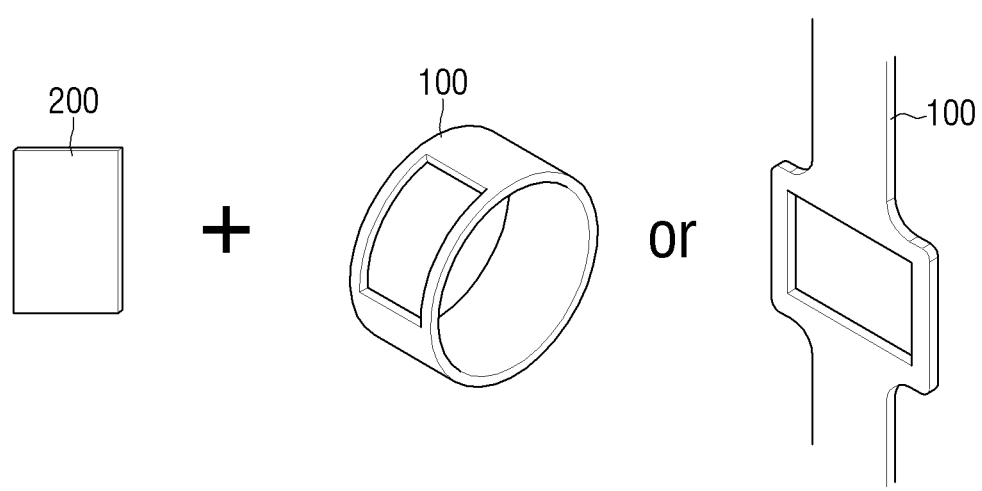
FIG. 25 is a view illustrating a configuration of a mountable/dismountable mobile device according to an embodiment of the present disclosure.

FIG. 25 is a view illustrating a configuration of a mountable/dismountable mobile device according to an embodiment of the present disclosure.

For example, FIG. 25 is a view illustrating a configuration of a mobile device according to an embodiment of the present disclosure.

Referring to FIG. 25, the mobile device 1000 includes a module 200 which is mountable in or dismountable from the body 100. The display 110, the controller 120, the storage 130, and the motion sensor 140 are mounted in the module 200. The module 200 may be formed of a hard case.

The body 100 may be made of flexible material such as rubber, fabric or leather. One area of the body 100 is opened to allow the module 200 to be mounted therein or dismounted therefrom. As illustrated in FIG. 25, the open area may be formed in a vertical direction or a horizontal direction.

Figure 26:
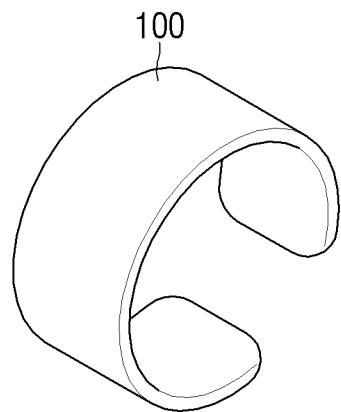
FIG. 26 is a view illustrating a configuration of a mobile device of a bangle type a part of which is opened according to an embodiment of the present disclosure.

FIG. 26 is a view illustrating a configuration of a mobile device of a bangle type a part of which is opened according to an embodiment of the present disclosure.

Referring to FIG. 26, the mobile device may have one side area of the body 100 opened, and may allow a user's body such as a wrist or ankle to be inserted through the open area.

Figure 27:
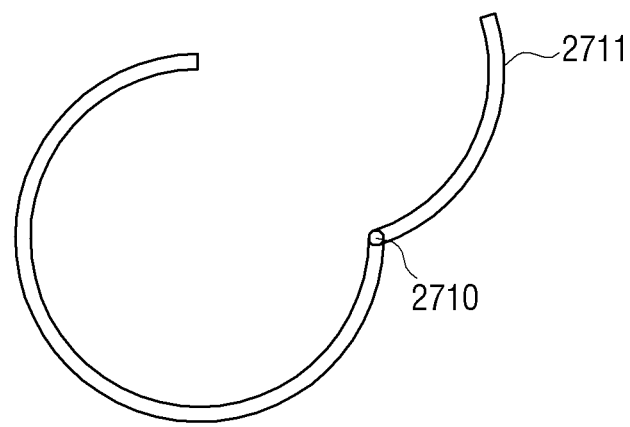
FIG. 27 is a view illustrating a configuration of a mobile device a part of which is opened and closed according to an embodiment of the present disclosure.

FIG. 27 is a view illustrating a configuration of a mobile device a part of which is opened and closed according to an embodiment of the present disclosure.

Referring to FIG. 27, the mobile device may be implemented in a handcuffs shape such that a part of the mobile device is opened and closed. When the mobile device is implemented in the handcuffs shape, a door 2711 to be opened and closed and a hinge 2710 to support the door 2711 are provided on one side of the body 100. The user wears the mobile device by lifting up the door 2711 and opening the door 2711, inserting the user's body (or portion thereof) through the open area, and then locking the door 2711. In this case, the display 110 may be formed opposite to the door.

Although not shown, according to various embodiments of the present disclosure, the mobile device 1000 may be implemented in a watch type.

Figure 28:
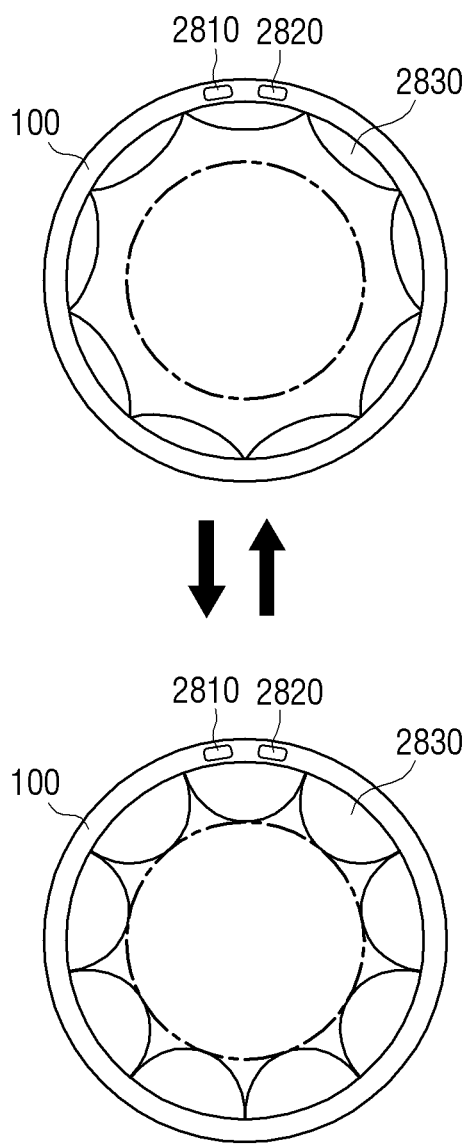
FIG. 28 is a view illustrating a configuration of a mobile device which is manufactured in such a form that the mobile device can be in close contact with a user body according to an embodiment of the present disclosure.

FIG. 28 is a view illustrating a configuration of a mobile device which is manufactured in such a form that the mobile device can be in close contact with a user body according to an embodiment of the present disclosure.

For example, FIG. 28 is a view illustrating an example of an exterior of the mobile device 1000 according to an embodiment of the present disclosure.

Referring to FIG. 28, the mobile device 1000 may further include a cushion 2830 and an air driver.

The cushion 2830 is provided on an inner surface of the body 100. The cushion 2830 may be made of polymer resin such as rubber or vinyl, and may be expanded and contracted by air.

The air driver supplies air to the cushion 2830 or deflates the cushion 2830.

As illustrated in FIG. 28, the mobile device 1000 may be implemented in an annular bangle type. Because the mobile device 1000 does not include openable door in the annular bangle, a diameter of the bangle should be larger than thickness of a user's body so that the user can wear the bangle around the user's wrist. Therefore, there is a risk that the mobile device 1000 falls out of (e.g., off) the user's wrist as the user wears the mobile device 1000. In addition, even after the user wears the mobile device 1000, the mobile device 1000 may be loosely supported and thus may be arbitrarily rotated or moved. Accordingly, controlling the mobile device 1000 by rotating or moving the mobile device 1000 as described above may be difficult. Accordingly, in FIG. 28, the mobile device 1000 may be brought into close contact with the user's body due to the presence of the cushion 2830.

According to various embodiments of the present disclosure, the mobile device 1000 may further include a wearing button 2810 and a release button 2820. The user may wear the mobile device and then may input a wearing command by selecting the wearing button 2810. When the wearing command is input, the controller 120 drives the air driver to inject air into the cushion 2830 and expand the cushion 2830. In contrast, when the release button 2820 is selected, the controller 120 drives the air driver to discharge air. Accordingly, the cushion 2830 may be contracted into the original state. The air driver may be implemented by using an air pump or a pan.

Various buttons may be provided on the side surface of the body 100 of the mobile device 1000.

Figure 29:
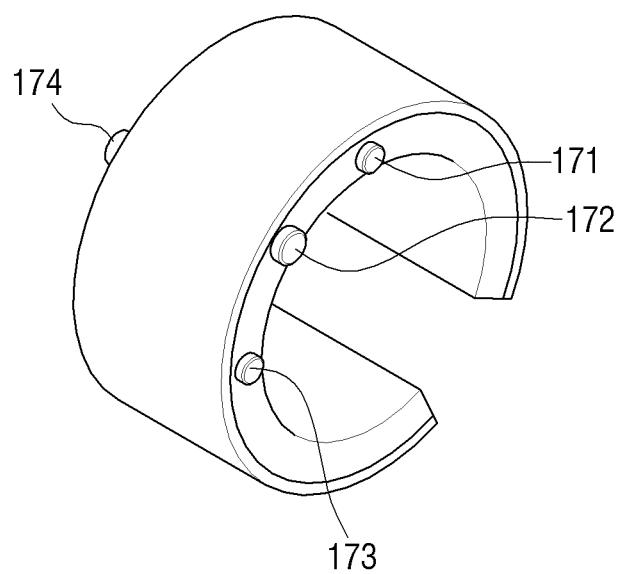
FIG. 29 is a view illustrating a configuration of a mobile device in which a button is provided on a side surface according to an embodiment of the present disclosure.

FIG. 29 is a view illustrating a configuration of a mobile device in which a button is provided on a side surface according to an embodiment of the present disclosure.

For example, FIG. 29 is a view illustrating an example of an exterior of the mobile device 1000 which includes a button according to an embodiment of the present disclosure.

Referring to FIG. 29, a plurality of buttons 171, 172, 173, and 174 of various shapes may be provided on the opposite side surfaces of the body 100 of the mobile device 1000. The buttons may include a wheel button and may include other various types of buttons such as a touch button or a push button.

Various functions may match (e.g., be associated) the plurality of buttons 171, 172, 173, and 174. For example, various functions such as turning on/off, changing a mode, a shortcut function, selecting, controlling a volume, and activating/inactivating may match the buttons.

As described above, the mobile device may be manufactured in various shapes and may be worn on the user's body. Hereinafter, a control method of a mobile device will be explained.

Figure 30:
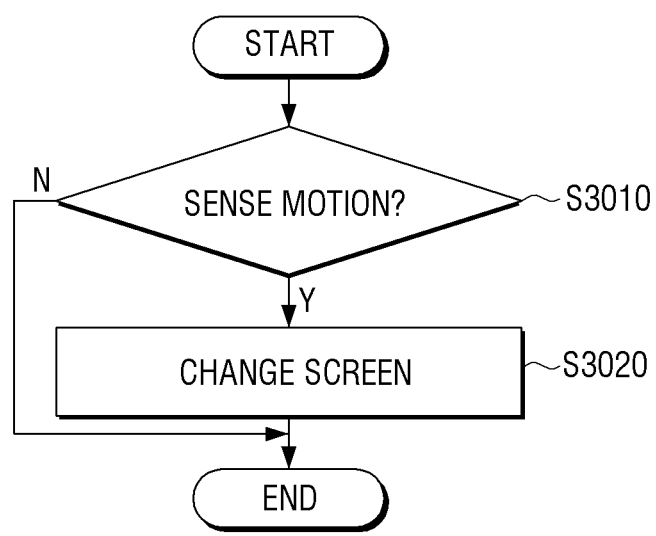
FIG. 30 is a flowchart to illustrate a control method of a mobile device according to an embodiment of the present disclosure.

FIG. 30 is a flowchart to illustrate a control method of a mobile device according to an embodiment of the present disclosure.

Referring to FIG. 30, at operation S3010, the mobile device may detect a motion. The motion may include rotation of an upper plate of the mobile device or a movement of the mobile device. The configuration of the mobile device may be implemented in various ways according to the various exemplary embodiments of the present disclosure as described above. The motion of the mobile device may vary according to a shape of the mobile device. The configuration of the mobile device, the types of motions, and the detecting method thereof have been described above in detail and thus a redundant explanation is omitted.

When the motion is detected at operation S3010, the mobile device may proceed to operation S3020 at which the mobile device changes a currently displayed screen. For example, the mobile device may execute another application instead of a currently executed application, and may display an execution screen of another application. In addition, the mobile device may play back another content instead of a currently played back content, or may change the current screen to a zoom-in or zoom-out screen. In addition, the mobile device may activate or inactivate the screen, or may change the screen to a desktop screen, a lock screen, or a unlock screen.

To detect the motion, the mobile device may employ a rotatable configuration as shown in FIGS. 2A, 2B, and 3, or may use a gyro sensor, a geomagnetic sensor, an acceleration sensor, and/or the like, as described in FIG. 10 or may use any combination thereof. According to various embodiments of the present disclosure, an additional element such as a camera or an EMG sensor may be used.

Figure 31:
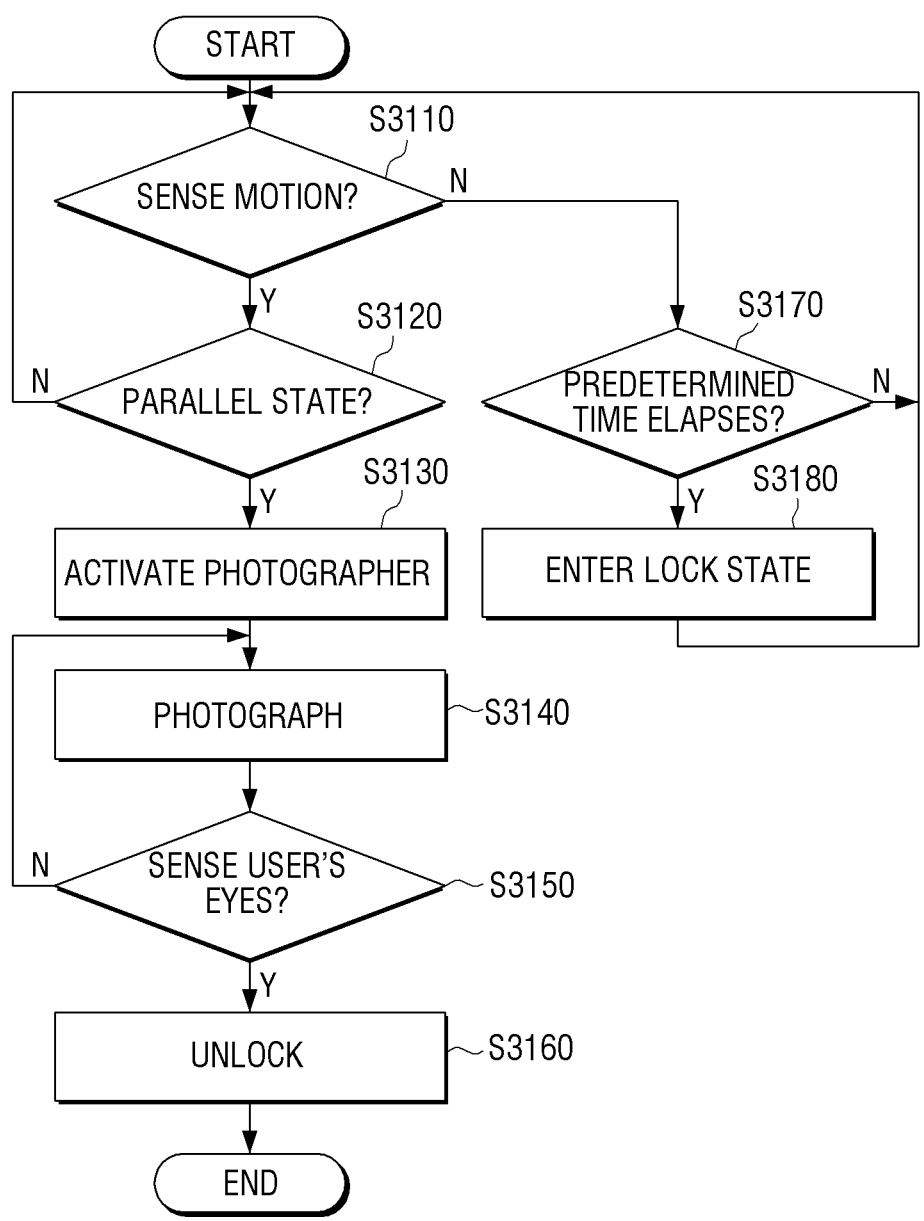
FIG. 31 is a flowchart to illustrate a method for performing a unlock operation according to a motion of a mobile device and a user's eyes according to an embodiment of the present disclosure.

FIG. 31 is a flowchart to illustrate a method for performing a unlock operation according to a motion of a mobile device and a user's eyes according to an embodiment of the present disclosure.

For example, FIG. 31 is a flowchart to explain a process of detecting a motion and performing a unlock operation in detail according to an embodiment of the present disclosure.

Referring to FIG. 31, at operation S3110, the mobile device determines whether a motion of the mobile device is detected.

When a motion is detected at operation S3110, the mobile device proceeds to operation S3120 at which the mobile device determines whether the mobile device is placed in an equilibrium state after being moved. For example, when the mobile device is of a bangle type, it is common that the user brings the mobile device in front of the user and uses the mobile device. In this case, the mobile device is placed in the equilibrium state in parallel with the surface of the earth.

When the mobile device determines that the mobile device is placed in the equilibrium state at operation S3120, the mobile device proceeds to operation S3130 at which the mobile device may activate the photographer.

At operation S3140, the mobile device photographs an image using the activated photographer.

When the image is photographed at operation S3140, the mobile device proceeds to operation S3150 at which the mobile device analyzes the photographed image and detects user's eyes.

When the mobile device detects the user's eyes at operation S3150, the mobile device proceeds to operation S3160 at which the mobile device performs a unlock operation.

In contrast, if the mobile device does not detect the user's eyes at operation S3150, then the mobile device may return to operation S3140.

When a particular motion is not detected at operation S3110, the mobile device proceeds to operation S3170 at which the mobile device determines whether a predetermined time elapses.

When a predetermined time elapses at operation S3170, the mobile device proceeds to operation S3180 at which the mobile device may enter a lock state.

If the mobile device determines that a predetermined time has not elapsed at operation S3170, then the mobile device may return to operation S3110.

As described above, the mobile device determines a user's position by combining a photographed image and other data as well as the motion of the mobile device, and performs an operation corresponding to the user's position.

Figure 32:
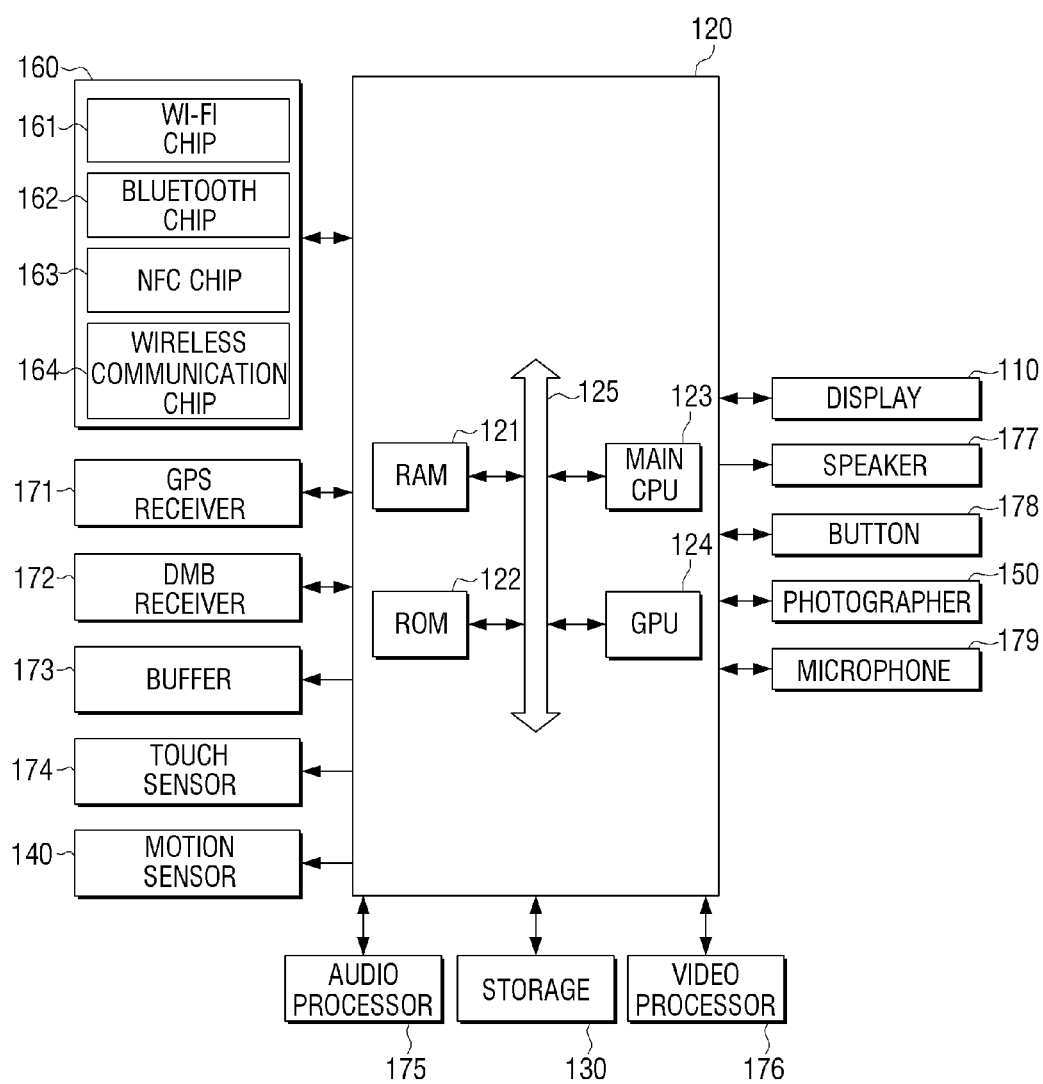
FIG. 32 is a view to illustrate an overall configuration of a mobile device according to an embodiment of the present disclosure.

FIG. 32 is a block diagram to illustrate an overall configuration of a mobile device according to embodiments of the present disclosure.

Referring to FIG. 32, the mobile device 1000 includes a display 110, a controller 120, a storage 130, a motion sensor 140, a photographer 150, a communicator 160, a Global Positioning System (GPS) receiver 171, a Digital Multimedia Broadcasting (DMB) receiver 172, a buffer 173, a touch sensor 174, an audio processor 175, a video processor 176, a speaker 177, a button 178, and a microphone 179.

The controller 120 may control an overall operation of the mobile device using programs stored in the storage 130. Specifically, the controller 120 may determine a user's position based on a motion of the mobile device, and may perform various control operations according to a result of the determining. The configurations and operations of the display 110, the controller 120, the storage 130, and the motion sensor 140 have been described above and thus a redundant explanation is omitted.

The photographer 150 photographs an image to determine presence/absence of the user who wears the mobile device 1000 and the user's location as described above. The photographed image may be analyzed by the controller 120. When it is determined that the user does not exist, the controller 120 may maintain the mobile device in the lock state without performing a particular control operation or changing a screen.

The communicator 160 is configured to communicate with various types of external apparatuses according to various communication methods. The communicator 160 may include a Wi-Fi chip 161, a Bluetooth chip 162, a Near Field Communication (NFC) chip 163, and a wireless communication chip 164. The Wi-Fi chip 161, the Bluetooth chip 162, and the NFC chip 163 communicate with external apparatuses in a Wi-Fi method, a Bluetooth method, and an NFC method, respectively. The wireless communication chip 164 communicates with external apparatuses according various communication standards such as IEEE, Zigbee, $3^{rd}$ Generation (3G), $3^{rd}$ Generation Partnership Project (3GPP), Long Term Evolution (LTE), and/or the like. The communicator 160 includes at least one of the above-described various chips, or a chip according other communication standards, and may communicate with an external server or other apparatuses using the chip. The controller 120 may access a web server through the communicator 160, and may display a web screen.

The GPS receiver 171 receives a GPS signal from a GPS satellite and calculates a current location of the mobile device 100. When a navigation program is executed, the controller 120 may perform a navigation operation with reference to a location detected by the GPS receiver 171.

The DMB receiver 172 receives a DMB signal and processes the same.

The buffer 173 is configured to store screen data to be displayed on the display 110.

The touch sensor 174 is configured to detect a touch on the surface of the display 110. The controller 120 compares coordinate values of each object in the displayed screen and touch coordinate values of the touch sensor 174, and determines which object is selected. The controller 120 may perform various control operations according to the touch manipulation detected by the touch sensor 174, in addition to or alternative to operations according to the motion detected by the motion sensor 140.

The audio processor 175 refers to an element that processes audio data included in a content. The audio processor 175 performs various processing operations such as decoding, amplifying, and noise filtering with respect to audio data.

The video processor 176 refers to an element that processes video data included in a content. The video processor 176 may perform various image processing operations such as decoding, scaling, noise filtering, frame rate conversion, and resolution conversion with respect to video data.

The audio processor 175 and the video processor 176 may be driven when a program to play back a content received from an external source or a content stored in the storage 130 is executed. As described above, when the user moves the mobile device while a single audio content, moving image content, or photo content is being played back, the controller 120 may control the audio processor 175 or the video processor 176 to play back another content according to a degree of the motion and a direction of the motion.

The display 110 may display an image frame which is generated by the video processor 176. In addition, the speaker 177 may output audio data which is generated by the audio processor 175.

The microphone 179 receives a user's voice or other sounds and converts the user's voice or other sounds into audio data. The controller 130 may use a user's voice input through the microphone 179 for a call process or may convert the user's voice into audio data and store the audio data in the storage 130. For example, when a call is made, the controller 120 may activate the microphone 179 and the speaker 177.

The button 178 may be arranged on the side surface of the body 100 as described in FIG. 29.

The controller 120 may boot the mobile device 1000 using various programs and data stored in the storage 130, and may perform an image display method according to the above-described exemplary embodiments.

The controller 120 includes a Random Access Memory (RAM) 121, a Read Only Memory (ROM) 122, a main CPU 123, a Graphic Processing Unit (GPU) 124, and a bus 125.

The RAM 121, the ROM 122, the main CPU 123, and the GPU 124 may be connected to one another through the bus 125. Besides these, the controller 120 may further include various interfaces, but illustration and description thereof are omitted.

The main CPU 123 accesses the storage 130 and performs booting using the O/S stored in the storage 130. The ROM 122 stores a set of commands to boot the system. When a turn on command is input and power is supplied, the main CPU 123 copies the O/S stored in the storage 130 to the RAM 121 according to a command stored in the ROM 122, executes the O/S and boots the system. When the booting is completed, the main CPU 123 copies the various programs stored in the storage 130 into the RAM 121, executes the programs copied into the RAM 121, and performs various operations.

The GPU 124 may generate a desktop screen, an icon display screen, a unlock screen, and other transition screens under the control of the main CPU 123. The GPU 124 calculates attribute values of objects in the screen such as coordinate values, shape, size, and color based on the screen data stored in the storage 130. The GPU 124 may generate the above-described various screens based on the calculated attribute values. The generated screen data is stored in the buffer 173. The screen data stored in the buffer 173 may be displayed by the display 110.

When the communicator 160 is included as illustrated in FIG. 32, the mobile device 1000 may be interlocked with another mobile device or share data with another mobile device. For example, when a gesture of slapping high fives to another user who wears a mobile device of a bangle type is detected, the mobile device may exchange commands or data with the mobile device of another user using NFC or other wireless communication methods.

FIG. 32 illustrates various elements which are mountable in the mobile device when the mobile device is implemented as a terminal apparatus supporting various functions, such as a communicating function, a DMB function, and a GPS receiving function according to an embodiment of the present disclosure. Accordingly, some of the elements shown in FIG. 32 may be omitted or changed, and another element may be added according to an exemplary embodiment.

According to various embodiments of the present disclosure, the mobile device may be manufactured in various shapes, and thus the mobile device may be employed in an external apparatus for use. For example, when the mobile device is employed in a vehicle such as a bicycle, an auto bike, or a car instead of the user's body, the mobile device may be used by detecting a moving direction or speed of the vehicle. For example, the mobile device may display locations of members of a group or may inform the user of whether there is a member distanced away from the group. In addition, when the mobile device is used in a shopping cart of a major supermarket, the mobile device may communicate with a server provided in the major supermarket, and may support various services. For example, when information on a product that the user wishes to buy is input, the mobile device may display a location or direction of the product to be bought. In addition, the mobile device may provide a variety of event information provided by the server through a screen or a sound. In addition, the mobile device may display a list of products that the user wishes to buy, or may allow the user to make a payment for the bought product directly using a card recognition function.

According to the various embodiments of the present disclosure as described above, the user may wear the mobile device on various objects as well as the user's wrist or other bodies, and may easily carry and use the mobile device. The user may interact with the mobile device by making various gestures, such as moving user's arm vertically or horizontally, unfolding user's arm and lowering user's wrist, raising user's wrist as if the user looks a watch, moving user's hand up, rotating user's wrist in a clockwise direction or a counter clockwise direction like the user flicks the user's wrist, and/or the like. Accordingly, the user's convenience can be greatly improved.

According to the above-described embodiments of the present disclosure, the user wearing the mobile device of the bangle type controls the operations of the mobile device by moving the user's body. However, the operations of the mobile device may be controlled according to a touch manipulation other than the motion. In this case, according to various embodiments of the present disclosure, the mobile device may provide User Interfaces (UIs) of various configurations to allow the user to use a pre-installed application easily.

Figure 33:
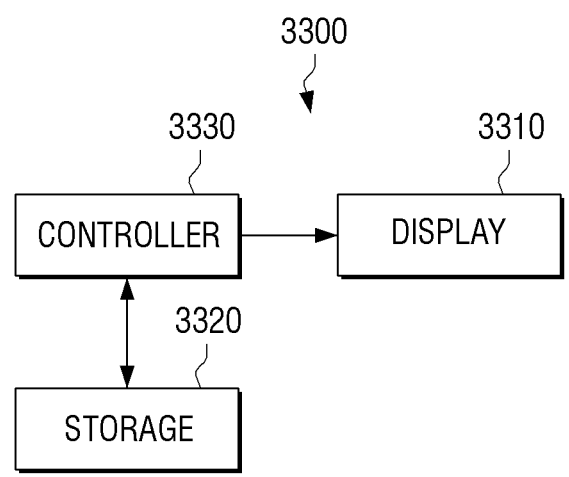
FIG. 33 is a block diagram illustrating a configuration of a mobile device according to an embodiment of the present disclosure.

FIG. 33 is a block diagram illustrating a configuration of a mobile device according to an embodiment of the present disclosure.

Referring to FIG. 33, a mobile device 3300 includes a display 3310, a storage 3320, and a controller 3330.

The storage 3320 stores an application that is installed in the mobile device 3300. The application may be downloaded from an application store or may be installed as default.

The controller 3330 generates a list UI using information on the application stored in the storage 3320. The list UI includes application items corresponding to the applications stored in the storage 3320. For example, an application item may display an icon indicating a name and a characteristic of each of the applications associated therewith.

The display 3310 displays the list UI which is generated by the controller 3330.

When a predetermined event occurs, the controller 3330 executes an application corresponding to at least one application item in the list UI, and generates an execution screen of the application. The controller 3330 displays the execution screen on a display location of the corresponding application item in the list UI.

According to various embodiments of the present disclosure, the event recited herein may include an event in which the mobile device 3300 is turned on, an event in which the mobile device 3300 is unlocked, an event in which an application item is selected in the list UI, an event in which user's eyes on the list UI is detected, an event in which a predetermined time period arrives, and/or the like.

FIGS. 34A, 34B, and 34C are views illustrating an example of a configuration of a list UI of a mobile device according to an embodiment of the present disclosure.

Referring to FIG. 34A, a list UI 3400 includes a plurality of application items 3410 to 3460. One application item 3430 out of the application items 3410 to 3460 may be displayed in the form of an execution screen and the other application items are displayed with application names only. When a message application is executed, a message 3431 which is transmitted or received may be displayed in an execution screen 3430 of the message application. Accordingly, the user can easily determine the applications stored on the mobile device 3300 (e.g., check kinds of installed applications) and may view execution screens of some of the applications on the mobile device 3300.

The controller 3330 may control the display 3310 to change a display state of the list UI according to a user manipulation.

Specifically, when a first user manipulation is performed in a direction parallel to an arrangement direction of the application items in the list UI 3400, the controller 3330 rotates the list UI according to the direction of the first user manipulation and changes the execution screen to an execution screen of another application.

In addition, when a second user manipulation is performed on the execution screen of the application, the controller 3330 changes a content displayed on the execution screen of the application according to the direction of the second user manipulation. For example, when a second user manipulation is performed on the execution screen of the application in a direction perpendicular to the arrangement direction of the items, the controller 3330 changes a content displayed on the execution screen of the application according to the direction of the second user manipulation.

According to various embodiments of the present disclosure, as shown in FIG. 34A, when the application items are arranged in a vertical direction, the first user manipulation corresponds to a manipulation of dragging, flicking, or the like in the vertical direction, and the second user manipulation corresponds to a manipulation of dragging, flicking, or the like in a horizontal direction.

When the user performs the first user manipulation in an upward or downward direction after touching the application execution screen 3430 or the list UI 3400 in FIG. 34A, the list UI moves in a direction corresponding to the direction of the first user manipulation and a new execution screen 3440 is opened as shown in FIG. 34B. In FIG. 34B, the first user manipulation is performed in the upward direction and a music application placed under the message application is executed. Accordingly, the execution screen 3440 of the music application is displayed on a corresponding item location in the list UI. In the execution screen 3440 of the music application, a display area 3441 displaying information such as an image or an album photo identifying a music content, a music content name, and the like, and a menu area 3442 displaying a menu for controlling playback of the music content may be displayed. The user may input various control commands to play back, stop, pause, fast rewind, and fast forward the music content using the menu area 3442.

In addition, the user may perform the second user manipulation of dragging or flicking on the application execution screen in the horizontal direction. For example, when the second user manipulation is performed on the execution screen 3430 of the message application in the leftward or rightward direction, a previous content 3431 is changed to another content 3432 as shown in FIG. 34C.

As described above, the user of the mobile device may freely change the application or contents only with a simple manipulation.

Although only one application item is displayed in the form of an execution screen in FIGS. 34A, 34B, and 34C, execution screens of the plurality of applications may be displayed. In this case, a size of each execution screen may be adjusted according to a user manipulation.

FIGS. 35A, 35B, and 35C are views illustrating a screen of a mobile device which provides a plurality of execution screens according to an embodiment of the present disclosure.

Referring to FIG. 35A, a plurality of execution screens 3520, 3530, and 3540 are displayed in a list UI 3500 along with application items 3510, 3550, 3560, and 3570. Each of the execution screens 3520, 3530, and 3540 displays a result of executing the corresponding application. For example, the execution screen 3520 of the contact list application may display contact information and phone numbers stored in the mobile device, and the execution screen 3530 of the message application may display messages which are transmitted or received. The execution screen 3540 of the album application may display images and moving image contents stored.

In this state, the user may increase or reduce a size of the execution screen by performing an appropriate manipulation on the execution screen. For example, the size of the execution screen may be adjusted by performing a manipulation like pinch out or pinch in. The pinch in refers to an operation of touching the screen with two or more fingers and then moving the user's fingers closer together, and the pinch out refers to an operation of touching the screen with two or more fingers and then moving the user's fingers further apart.

The controller 3330 calculates a coordinate value of a touch point using a touch sensor operatively integrated with the display 3310. For example, the touch sensor may be embedded in the display 3310. When a plurality of touch points are calculated, the controller 3330 calculates a distance between a coordinate value of a first touch point and a coordinate value of a next touch point. In addition, the controller 3330 monitors whether the calculated distance is changed or not. As a result of the monitoring, when the calculated distance decreases, the controller 3330 determines that a pinch in occurs, and, when the calculated distance increases, the controller 3330 determines that a pinch out occurs.

When the controller 3330 determines that the pinch in occurs, the controller 3330 reduces the size of the execution screen at which each touch coordinate values is placed by as much as the degree of the pinch in. When the controller 3330 determines that the pinch out occurs, the controller 3330 increases the size of the execution screen at which each touch coordinate value is placed by as much as the degree of pinch out.

FIG. 35B illustrates a state in which the pinch out is performed on the execution screen 3530 of the message application and the execution screen 3530 elongates in the vertical direction. Because the size of the whole execution screens 3520, 3530, and 3540 is fixed in FIG. 35B, as the execution screen 3530 of the message application is enlarged, the sizes of the other execution screens 3520 and 3540 are reduced. Alternatively, the sizes of the other execution screens 3520 and 3540 may be maintained and eventually the size of the whole execution screens 3520, 3530, and 3540 may increase.

The user may enlarge the execution screen 3530 to a full screen by performing a predetermined manipulation such as simple touch, long touch, double touch, and/or the like on the execution screen 3530. For example, when the execution screen 3530 of the message application is touched in FIG. 35B, the controller 3330 may enlarge the execution screen to the full screen of the display as shown in FIG. 35C. When the execution screen is enlarged to the full screen, the user may check (e.g., view) messages exchanged with another user by scrolling up or down the execution screen or manipulating the execution screen to the left or right.

In the above-described embodiment of the present disclosure, the execution screen is always displayed on the list UI. However, the execution screen may be in an on or off state in the list UI according to user selection.

Figures 36A, 36B:
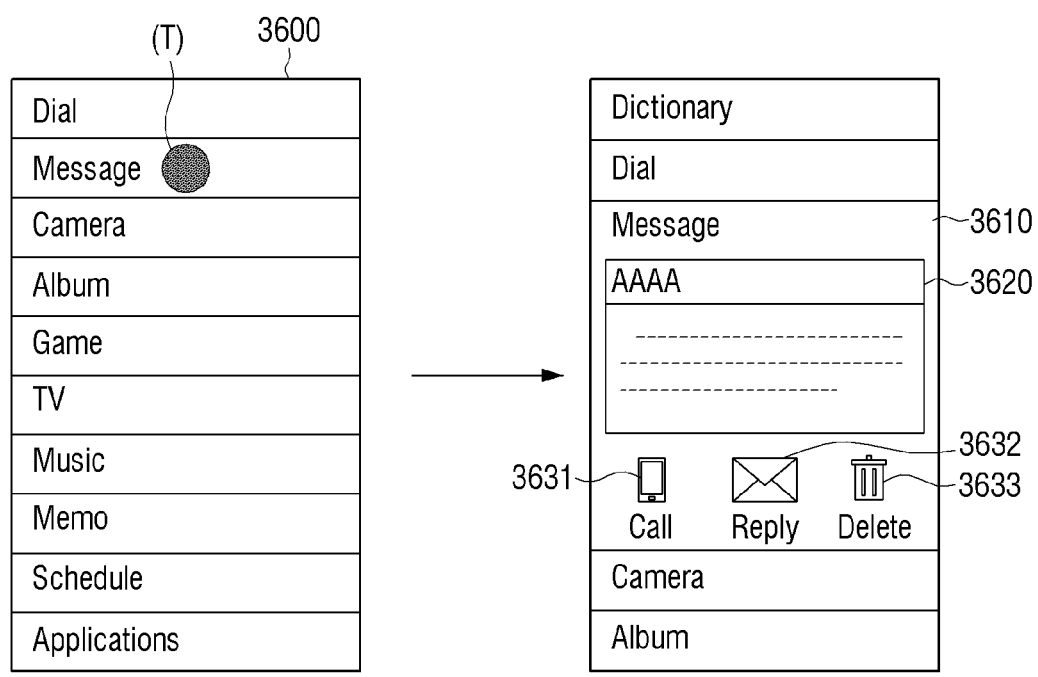
FIGS. 36A and 36B are views illustrating a screen configuration of a mobile device according to an embodiment of the present disclosure.

FIGS. 36A and 36B are views illustrating a screen configuration of a mobile device according to an embodiment of the present disclosure.

Referring to FIGS. 36A and 36B, the display 3310 of the mobile device 3300 displays a list UI 3600 including application items. The user may select an application item that the user wants to view. When a message application item is touched (e.g., as denoted by reference letter T) as shown in FIG. 36A, the touched item is moved to a specific location of the list UI and an execution screen 3610 is opened. According to various embodiments of the present disclosure, the specific location at which the list UI and the execution screen 3610 is opened may be a visible area that is frequently viewed by the user in the list UI. According to various embodiments of the present disclosure, the execution screen 3610 may be opened at a position substantially corresponding to the position at which the application item that is touched was previously displayed (e.g., before the touch event).

A transmitted or received message 3620 and various menu icons 3631, 3632, and 3633 are displayed in the execution screen 3610. In FIG. 36B, menu icons 3631, 3632, and 3633 to perform various functions such as calling, replying, deleting, and the like, are displayed. Accordingly, an important function may be directly performed on the list UI without significant interaction. For example, a user may perform an important (e.g., or predefined) function based on a direct interaction (e.g., a touch) with the list UI (e.g., a menu icon).

As described above, the mobile device is formed in the bangle type. The display 3310 may be disposed along the entire outer surface of the body of the bangle type. Accordingly, the list UI may be displayed on the entire outer surface of the mobile device.

Figures 37A, 37B:
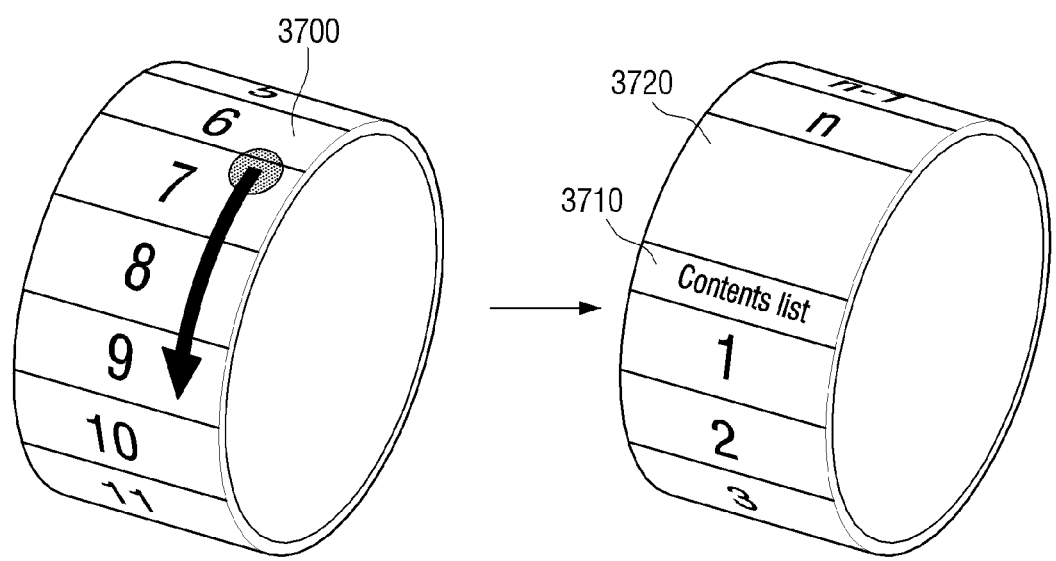
FIGS. 37A and 37B are views illustrating a list UI which is displayed on a mobile device of a bangle type according to an embodiment of the present disclosure.

FIGS. 37A and 37B are views illustrating a list UI which is displayed on a mobile device of a bangle type according to an embodiment of the present disclosure.

Referring to FIG. 37A, a list UI 3700 is displayed on an entire outer surface of the mobile device. The list UI 3700 may be a cyclic UI that is circulated according to a user manipulation. For example, the user rotates the list UI 3700 by touching the list UI and then dragging or flicking in a direction parallel to an item arrangement direction as shown in FIG. 37A.

A distinct area 3720 may be displayed between a first item and a last item of the application items as shown in FIG. 37B. In addition, a display area 3710 informing that the UI is the list UI may be further displayed on an upper end of the first item. The distinct area 3720 may be an empty space that does not display any extra information or may be displayed in a different color or image.

According to various embodiments of the present disclosure, when many applications are installed, all of the application items may not be displayed on a single screen. In addition, searching for an application item that the user wants throughout the list UI may not be easy. Accordingly, according to various embodiments of the present disclosure, an indicator for directly searching for each application item may be further displayed.

FIGS. 38A, 38B, and 38C are views illustrating a screen on which a list UI is displayed along with indicators according to an embodiment of the present disclosure.

Referring to FIGS. 38A, 38B, and 38C, indicators 3810 regarding applications stored in the storage 3320 are displayed on one side of a list UI 3800. The indicators 3810 refer to identifiers corresponding to a plurality of groups into which a plurality of application items are classified according to a certain classifying criterion. For example, the application items may be classified with reference to an initial sound or a first letter of the name of the application item, or may be classified with reference to a kind of application such as a game, a document, and utility. In addition, a predetermined number of application items may be classified according to an installation order. In FIG. 38A, the indicators 3810 like A to F are displayed.

When the user drags in a direction as the user wants as shown in FIGS. 38A and 38B, a display state of the list UI is changed. In this case, the indicators 3810 may be fixed at the same position.

When one of the indicators is selected, the controller 3330 may rotate the list UI to display an application item corresponding to the selected indicator on a visible area. For example, when the user selects the indicator E as shown in FIG. 38C, application items belonging to the indicator E are displayed on the list UI 3800. Although the list UI 3800 consisting of only the application items is illustrated in FIGS. 38A, 38B, and 38C, some of the application items may be displayed in the form of an execution screen as described above. In this case, an application item that is displayed on a specific location of the changed list UI 3800 from among the applications belonging to the selected indicator may be automatically displayed in the form of the execution screen.

According to various embodiments of the present disclosure, a location of each application item in the list UI may be arbitrarily adjusted by the user. For example, the user may configure at least one order in which the application items in the list UI may be adjusted. The list UI may arrange the applications according to favorites, most frequently used, most recently downloaded and/or installed, and the like.

Figure 39A:
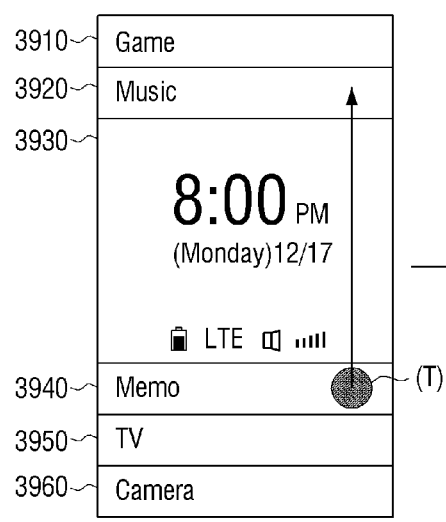
FIGS. 39A and 39B are views illustrating a method for changing a display location of an application item according to an embodiment of the present disclosure.
Figure 39B:
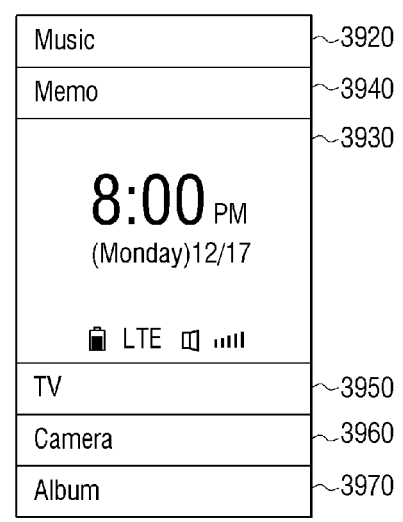

FIGS. 39A and 39B are views illustrating a method for changing a display location of an application item according to an embodiment of the present disclosure.

Referring to FIGS. 39A and 39B, a list UI includes a plurality of application items 3910 to 3960 as shown in FIG. 39A, a plurality of application items 3920 to 3970 as shown in FIG. 39B. An application item 3930 of a specific location from among the application items may be displayed in the form of an execution screen. As shown in FIGS. 39A and 39B, the execution screen may be a main screen that indicates a battery level, a communication state, date, time, and/or the like of the mobile device.

In this state, when the user touches one application item 3940 for a long time (e.g., for a time period that is greater than a predefined threshold) and drags the touch to a location of another application item 3920, a display location of the selected application item 3940 is changed as shown in FIG. 39B. According to various embodiments of the present disclosure, an application item to be moved may be selected by using various manipulations other than the long touch, such as, for example, a double touch, menu selection, and/or the like.

According to various embodiments of the present disclosure, the application items included in the plurality of application items may be identical before the touch for moving a location of a selected application item as the application items included in the plurality of application items after the touch for moving the location of selected application items is input. For example, the touch for moving the location of the selected application items may not change the set of application items being displayed.

In the various embodiments of the present disclosure described above, the list UI has application items arranged in sequence. However, the shapes of the list UI and the application items may be changed variously.

For example, a list UI in the form of a water drop may be provided. Specifically, an application execution screen may be displayed when small bubbles in water come up above water, are absorbed into an existing air bubble, and the air bubble becomes gradually bigger. In addition, an application execution screen may be displayed when an air bubble in the form of a sphere is pressed and becomes gradually thinner. In addition, an application execution screen may be displayed when air is injected into an air bubble and the air bubble is expanded and bursts.

FIGS. 40A, 40B, 40C, 40D, and 40E are views illustrating a configuration of a mobile device according to an embodiment of the present disclosure.

Figure 40A:
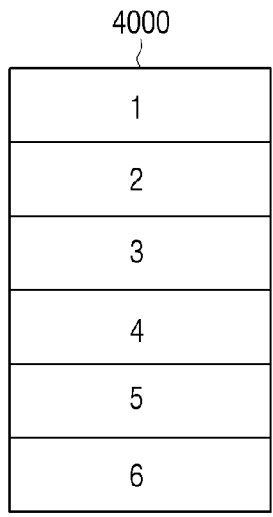
FIGS. 40A, 40B, 40C, 40D, and 40E are views illustrating a configuration of a mobile device according to an embodiment of the present disclosure.
Figure 40B:
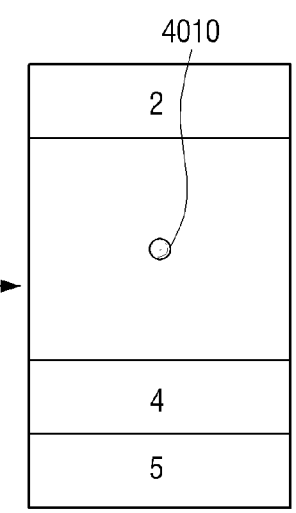
Figure 40C:
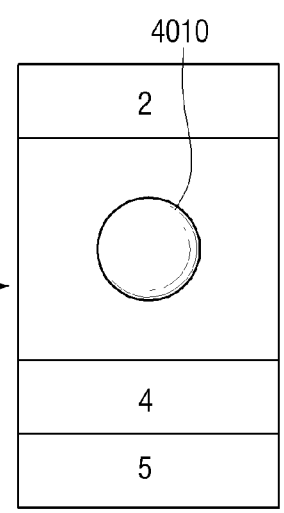
Figure 40D:
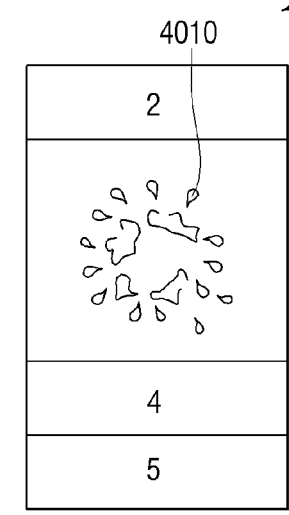
Figure 40E:
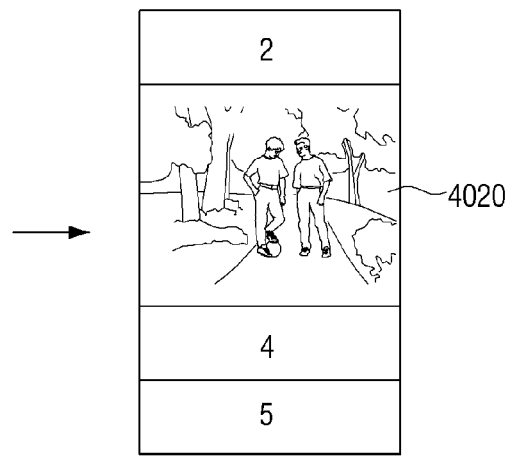

Referring to FIG. 40A, the mobile device displays a list UI 4000. In this state, when one application item is selected or is placed on a visible area, the area at which the application item is displayed is enlarged as shown in FIG. 40B. In FIG. 40B, the third application item is enlarged and an object 4010 in the form of a small water drop is displayed on the area of the application item. When the water drop object 4010 is gradually expanded and bursts as shown in FIGS. 40C and 40D, the object 4010 is substituted with an execution screen 4020 of the corresponding application item as shown in FIG. 40E.

Figures 41A, 41B:
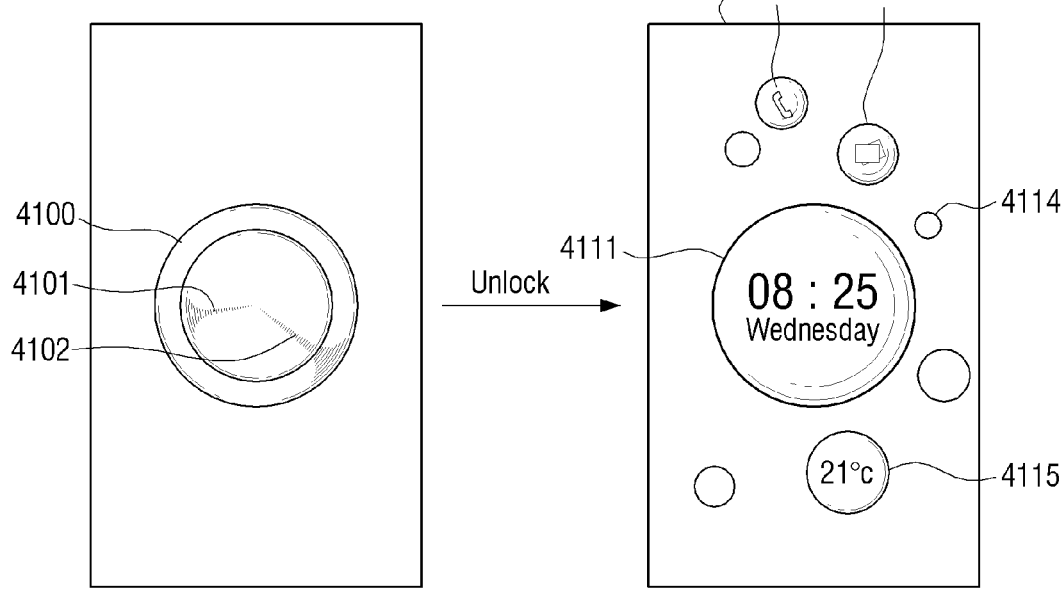
FIGS. 41A and 41B are views illustrating a list UI which is generated in a form of a water drop according to an embodiment of the present disclosure.

FIGS. 41A and 41B are views illustrating a list UI which is generated in a form of a water drop according to an embodiment of the present disclosure.

Referring to FIG. 41A, the mobile device displays a standby screen 4100. The standby screen 4100 may be displayed in a lock state or a standby state. An object in the form of a water drop including a minute hand 4101 and an hour hand 4102 of a clock may be displayed in the standby screen 4100. A location of the object may be shaken according to a motion of the mobile device.

In a state in which the standby screen shown in FIG. 41A is displayed, when the user inputs a gesture to unlock or selects a button, the standby screen is changed to a list UI screen 4110 as shown in FIG. 41B.

As shown in FIG. 41B, a plurality of application items 4111 to 4115 may be displayed in the list UI screen 4110. The application items 4111 to 4115 are displayed in the form of a water drop object as shown in FIG. 41B. According to various embodiments of the present disclosure, information on a corresponding application or an execution screen may be displayed in the object as a thumbnail image (e.g., within the associated application item 4111 to 4115).

A highlight effect may be provided to an application item placed on a specific area in the list UI screen 4110. In FIG. 41B, the first application item 4111 placed at the center area is displayed as a large and bright image. The application items 4111 to 4115 may be displayed as fixed images. However, an object display location or a surface shape may be displayed as if it is shaken according to a motion of the user wearing the mobile device.

FIGS. 42A, 42B, 42C, and 42D are views to illustrate a method for changing a list UI such as, for example, the method for changing the list UI shown in FIGS. 41A and 41B according to an embodiment of the present disclosure.

Figure 42A:
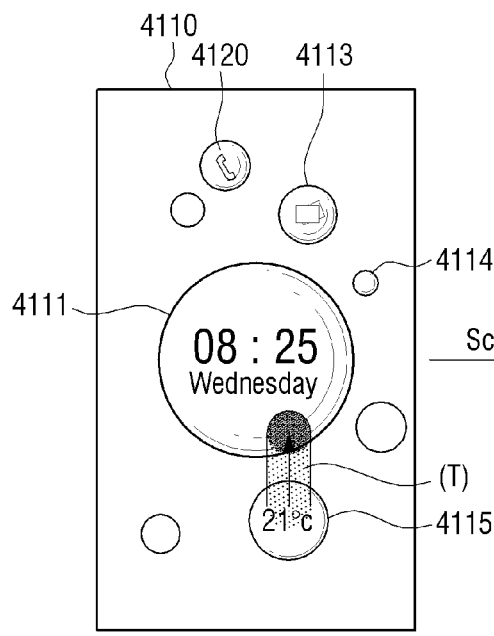
FIGS. 42A, 42B, 42C, and 42D are views to illustrate a method for changing a list UI such as, for example, the method for changing the list UI shown in FIGS. 41A and 41B according to an embodiment of the present disclosure.

As shown in FIG. 42A, the list UI 4110 in which the application items 4111 to 4115 are displayed in the form of a water drop may be displayed. The application items 4111 to 4115 are randomly arranged in the screen. According to various embodiments of the present disclosure, a user may configure an arrangement of the application items 4111 to 4115. According to various embodiments of the present disclosure, the application item corresponding to the largest displayed application item may be configured by a user as a favorite application item, a most recently used application item, a most frequently used application item, and/or the like. According to various embodiments of the present disclosure an application item that is displayed as the largest application item by default may be configured by the user.

The user may change the application item placed at the center by scrolling up and down. Specifically, when the user touches the screen (e.g., as denoted by reference letter T illustrated in FIG. 42A) and drags, or flicks the touch, and/or the like, the list UI 4110 is changed according to a direction of the manipulation and display locations of the application items 4111 to 4115 are also changed. Accordingly, when an application item 4116 placed under a bottom side is placed at the center area as shown in FIG. 42B, the application item 4116 is enlarged and displayed brightly and an execution screen of the corresponding application is displayed in the application item 4116.

Figure 42B:
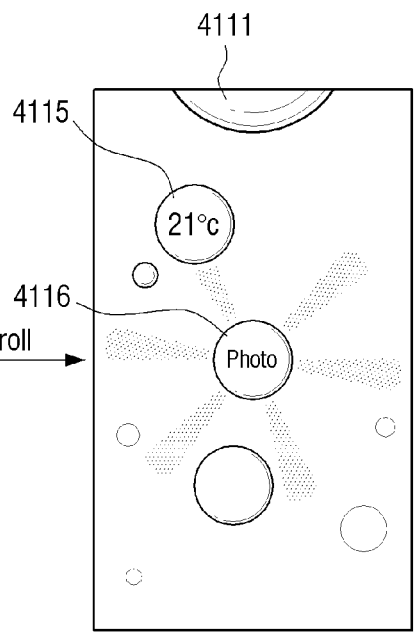
Figure 42C:
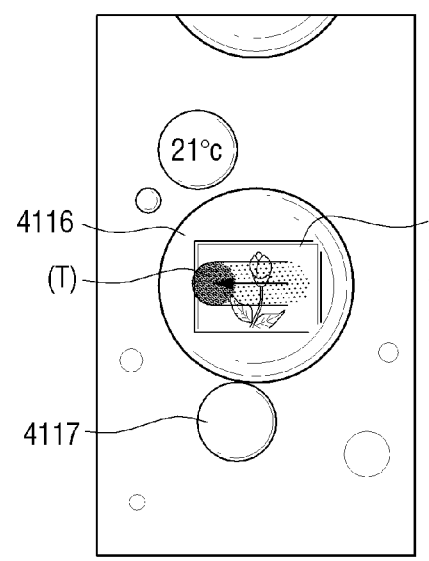
Figure 42D:
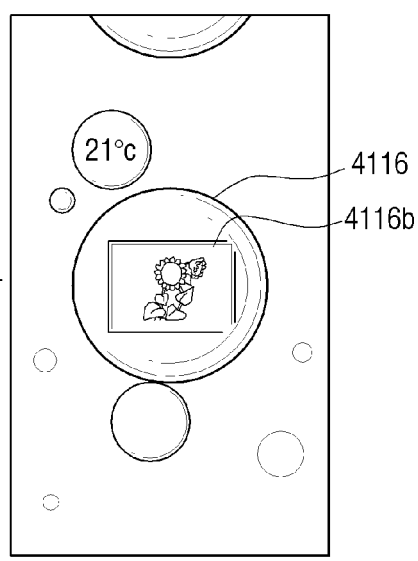

FIG. 42B illustrates a case in which the corresponding application is a photo album application. In this case, as shown in FIG. 42C, one 4116a of the stored photos may be displayed in the water drop. In this state, when the user drags or flicks in the horizontal direction, another photo 4116b is displayed in the water drop as shown in FIG. 42D. In addition, various menus selectable by the user as well as content may be displayed in the water drop object according to a kind of application. When one water drop object is directly selected, the selected water drop object may be enlarged and displayed as if the water drop is viewed from a close range and may additionally display information and a function.

FIGS. 43A, 43B, 43C, and 43D are views illustrating a water drop object which is enlarged and displayed according to an embodiment of the present disclosure.

Figure 43A:
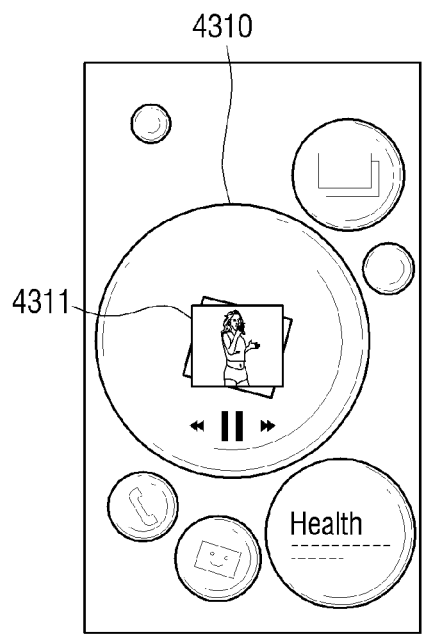
FIGS. 43A, 43B, 43C, and 43D are views illustrating a water drop object which is enlarged and displayed according to an embodiment of the present disclosure.
Figure 43B:
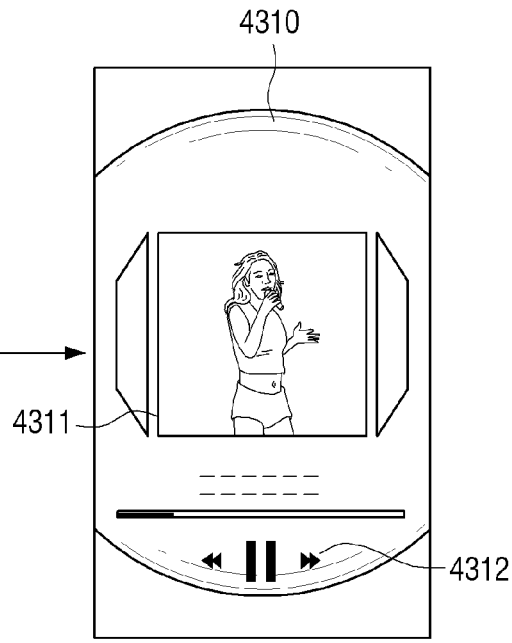

When one 4310 of the water drop objects is selected as shown in FIG. 43A, the selected water drop object is enlarged and displayed on the full screen as shown in FIG. 43B. In FIGS. 43A, 43B, 43C, and 43D, a music application is selected. In this case, a representative image 4311 on one of the music contents and control menus 4312 thereof are displayed. The user may play back the music content by manipulating the control menus 4312.

In this state, when the user flicks in the horizontal direction, the content is changed to another content. Accordingly, a representative image 4313 on the new content and control menus 4312 are displayed. A color of the water drop object or background may be changed according to a kind of content.

Figure 43C:
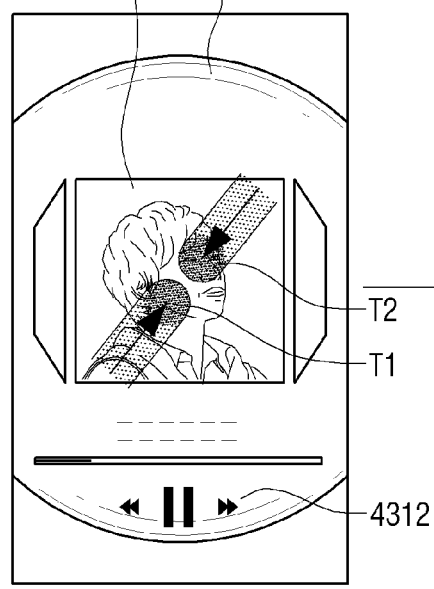
Figure 43D:
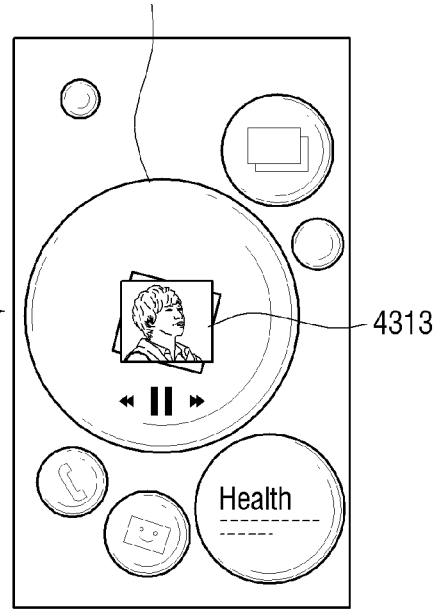

When the user wants to return to the original state, the user may select a button matching a back function or may input a gesture matching the back function. For example, FIG. 43C illustrates a pinch in manipulation in which the user touches two points T1 and T2 with fingers and move the fingers closer together. Accordingly, as shown in FIG. 43D, the controller 3330 may change the list UI to the original state and display the list UI. In this case, the representative image 4313 of the changed content may be displayed in the application item 4310 displayed at the center area. Accordingly, the user may directly check (e.g., determine) the content that has been most recently played back on the list UI.

In addition, the list UI may be displayed in various shapes.

FIGS. 44A, 44B, 44C, and 44D illustrate an example of the list UI shape according to an embodiment of the present disclosure.

Referring to FIG. 44A, a list UI 4400 is displayed in the form of a familiar tool that is easy to have in a real life such as a drawer, a bookshelf, a box, and the like, and an application item is displayed in the form of paper, photo, and file that is piled in the tool in sequence.

FIG. 44A illustrates application items which are displayed in the form of files. An application name may be recorded on each file. In this state, when the user selects one file 4410, a graphic effect is provided as if the selected file is opened and an execution screen of the corresponding application is displayed. In FIG. 44B, a memo application is selected and an execution screen 4410 displaying a content of a memo is displayed. When the memo content is long, a menu 4411 for scrolling the memo content may also be displayed. In addition, when many memos are stored, an image 4412 shown as if a plurality of documents are piled may be additionally displayed on a lower portion of the execution screen 4410.

In this state, when the user touches a corner of the memo and drags or flicks the touch as if the user turns over the page, the previous memo disappears as if the memo is torn off and another memo is displayed in the execution screen 4410 as shown in FIG. 44C. For example, the execution screen may be expressed like an adhesive memo pad.

In addition, the user may check additional information by touching the execution screen 4410 or touching the image 4412. In FIG. 44D, when the user touches the execution screen 4410, detailed information 4413 such as a creation date or a writer of the memo may be displayed at the touch point. Also, when the user touches the image 4412, a message 4414 indicating a number of stored memos may be displayed.

According to various embodiments of the present disclosure, the mobile device may be implemented in a bangle type as described above. In this case, when the user sees the mobile device with the user's naked eyes, only half of the outer surface comes into view. Therefore, even when the display 3310 is disposed enclosing the entire outer surface of the mobile device or occupies more than half of the area, an area that is visible to the user is limited. The area that is actually visible to the user is referred to as a visible area in the specification. When the mobile device is rotated, the visible area is changed. When the visible area is changed, the controller 3330 may change the list UI accordingly.

Figures 45A, 45B, 45C:
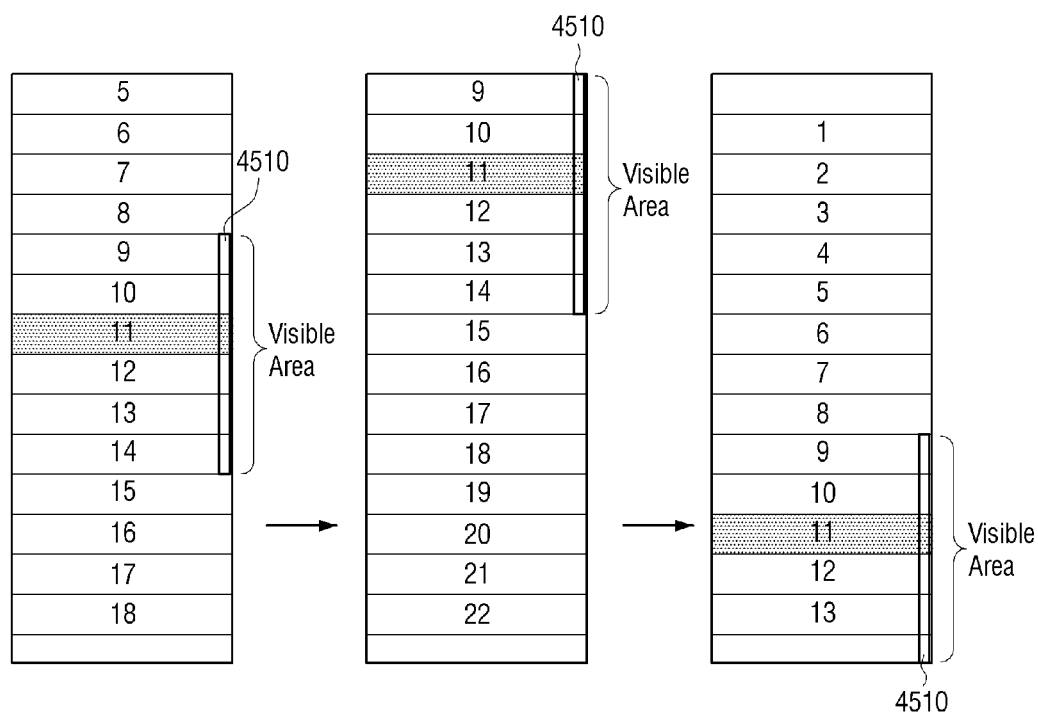
FIGS. 45A, 45B, and 45C are views to illustrate a process of changing a list UI according to a change of a visible area according to an embodiment of the present disclosure.

FIGS. 45A, 45B, and 45C are views to illustrate a process of changing a list UI according to a change of a visible area according to an embodiment of the present disclosure.

FIG. 45A illustrates a case in which the user sees a middle area when the mobile device of the bangle type is unfolded. In this case, a visible area is placed on the middle area from among all areas of the display 3310. Accordingly, a $11^{th}$ application item placed in the middle area is highlighted and indicators 4510 are displayed around the $11^{th}$ application item. An execution screen of the application may be displayed on the highlighted application item as in the above-described embodiment of the present disclosure.

In this state, when the user sees an upper area of the display 3310, the visible area is moved to the upper area. Accordingly, the list UI slides in an upward direction and $9^{th}$ to $15^{th}$ application items displayed in the previous visible area are displayed on the upper area as shown in FIG. 45B. In addition, the indicators 4510 are moved to the upper area.

In contrast, when the user sees a lower area, the list UI slides in a downward direction and the $9^{th}$ to $15^{th}$ application items displayed in the previous visible area are displayed on the lower area as shown in FIG. 45C. In addition, the indicators 4510 are moved to the lower area.

A non-visible area that cannot be seen by the user may be processed differently according to an embodiment of the present disclosure.

Figures 46A, 46B, 46C:
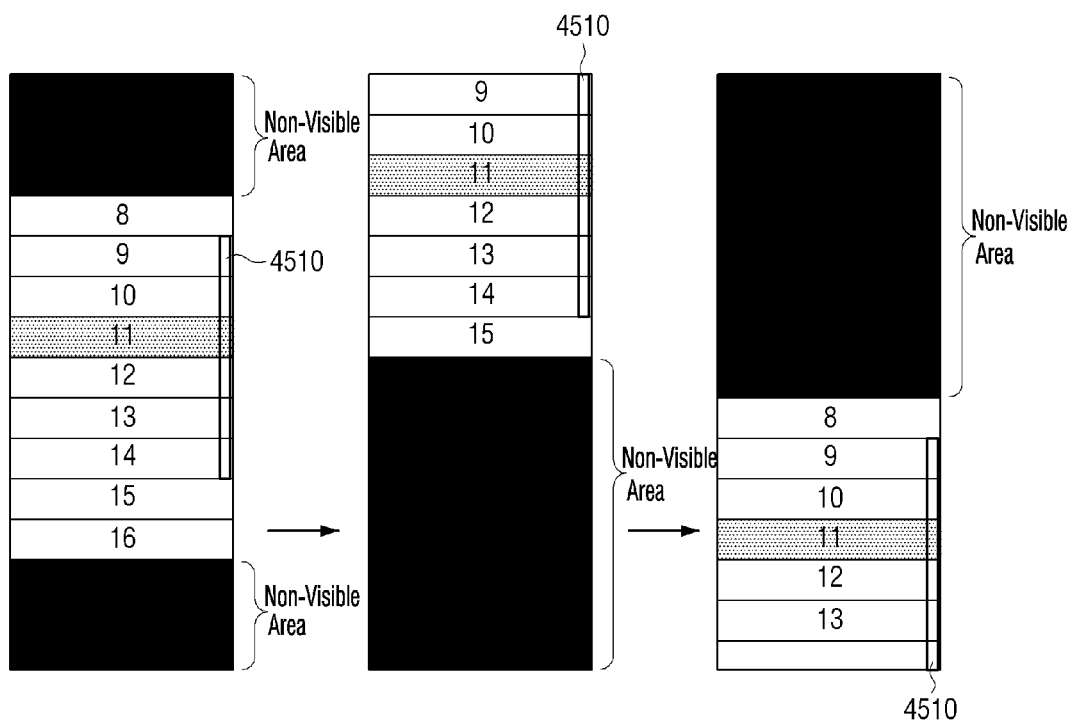
FIGS. 46A, 46B, and 46C are views illustrating a screen configuration according to a list UI display method according to an embodiment of the present disclosure.

FIGS. 46A, 46B, and 46C are views illustrating a screen configuration according to a list UI display method according to an embodiment of the present disclosure.

Referring to FIG. 46A, application items and indicators 4510 are displayed in a visible area out of the whole area of the display 3310 and the other areas, for example, non-visible areas that are not visible to the user's eyes are turned off in part. As shown in FIGS. 46B and 46C, when the user's eyes move in an upward direction or a downward direction, the location of the visible area is changed according to the moving direction. When the display 3310 includes an Organic Light Emitting Diode (OLED) or the like, and a pixel represents black, the pixel does not consume power and a power saving effect can be obtained.

Although the list UI is changed according to the location of the visible area in FIGS. 45A to 46C, the screen of the display 3310 may be maintained if necessary even when the visible area is changed. For example, the user may rotate the mobile device of the bangle type to see an image of a part that the user wants to see. Accordingly, when a predetermined user gesture is detected, the controller 3330 may fix the screen of the display 3310 according to a current configuration thereof even when the visible area is changed. For example, when a user gesture of gripping the body of the mobile device with the user's palm and rotating the mobile device is detected, or when the visible area is changed after a specific menu displayed on the screen is selected, the screen may be fixed.

According to various embodiments of the present disclosure, the above-described indicators may be always fixed, but may not be displayed usually and may be displayed when the indicators are used. Alternatively, the indicators may usually be displayed in simple and small sizes, and, when a specific event occurs, the indicators may be changed to detailed indicators.

Figures 47A, 47B, 47C:
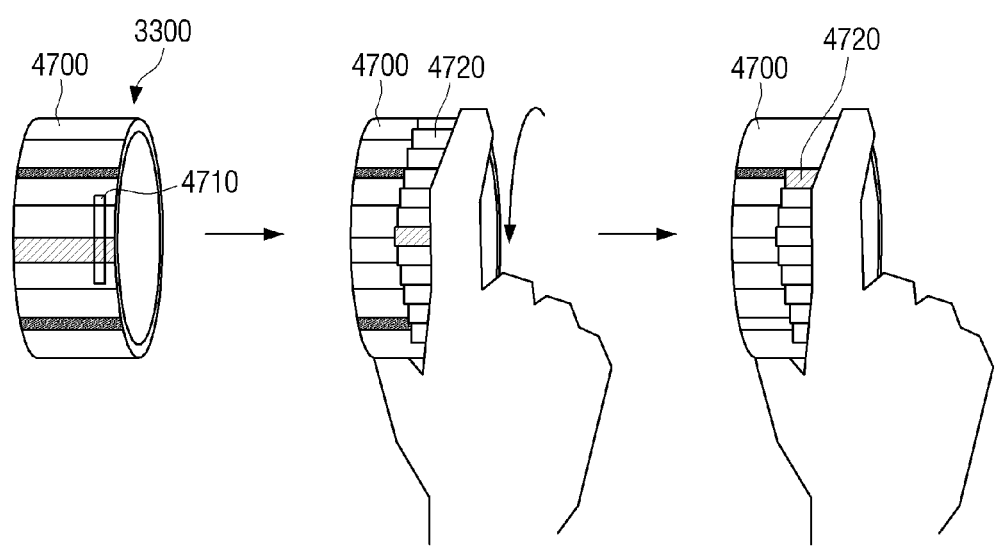
FIGS. 47A, 47B, and 47C are views illustrating an example of a user gesture to display indicators according to an embodiment of the present disclosure.

FIGS. 47A, 47B, and 47C illustrate a user gesture to display indicators according to an embodiment of the present disclosure.

Referring to FIG. 47A, the mobile device 3300 displays a first indicator 4710 in a list UI 4700. In this state, when the user long-taps the first indicator 4710 or holds the first indicator 4710 with the user's hand, a second indicator 4720 is displayed beside the user's finger as shown in FIG. 47B. The second indicator 4720 may be comprised of index information that is greater and more specific than the first indicator 4710. The user may move the list on an index basis by scrolling or rubbing while tapping or holding the second indicator 4720.

Figures 48A, 48B:
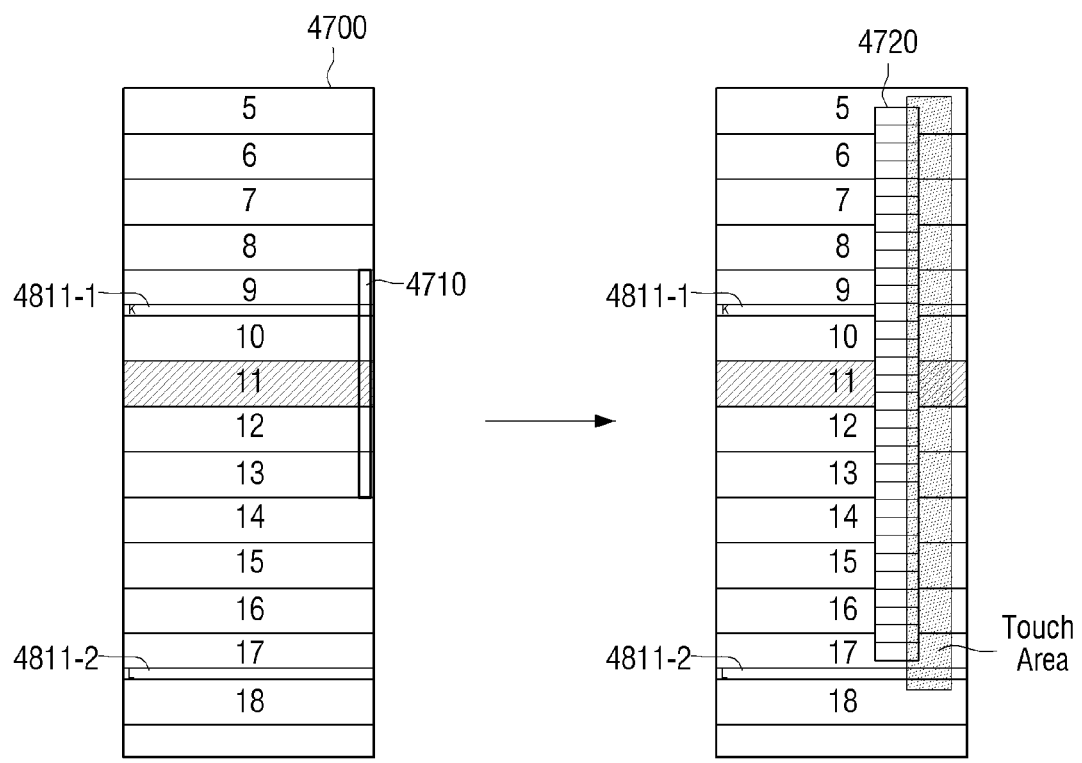
FIGS. 48A and 48B are views illustrating a configuration of a list UI to which indicators are added according to an embodiment of the present disclosure.

FIGS. 48A and 48B are views illustrating a configuration of a list UI to which indicators are added according to an embodiment of the present disclosure. For example, FIGS. 48A and 48B are views enlarging the screens of FIGS. 47A, 47B, and 47C according to an embodiment of the present disclosure.

Referring to FIG. 48A, index information 4811-1, 4811-2 of a corresponding group is additionally displayed for the first item of each group from among the application items in the list UI 4700.

In this state, when the user makes a gesture of long tapping or holding with the user's hand, the first indicator 4710 is changed to the second indicator 4720 as shown in FIG. 48B. In this state, when the user drags up the user's hand, application items belonging to a group L, which are next to application items belonging to a group K currently displayed on the visible area, may be displayed directly.

As described above, various list UIs may be provided considering shape characteristics of the mobile device of the bangle type.

According to the various embodiments of the present disclosure explained in relation FIGS. 33 to 48B, the user changes the list UI through various touch manipulations. However, the operation of the list UI may be controlled according to a motion of the mobile device or a location of the user as described above. For example, the mobile device explained in FIG. 33 may be implemented in combination with the various embodiments of the present disclosure explained in relation to FIGS. 1 to 32. Accordingly, the mobile device may determine the visible area in various methods other than the user touch manipulation and may automatically change the list UI.

FIGS. 49A to 50C illustrate a method for determining a visible area according to various embodiments of the present disclosure.

Figures 49A, 49B, 49C:
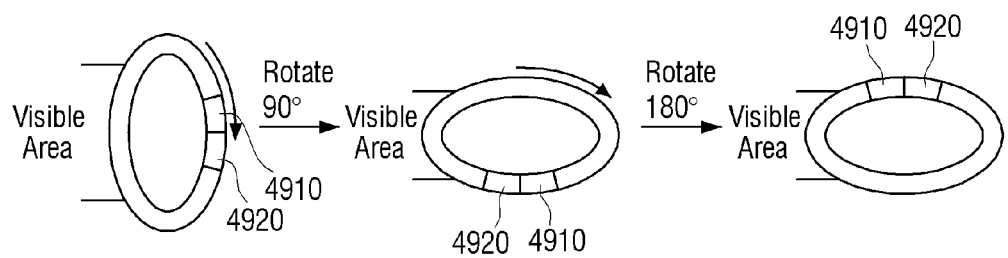
FIGS. 49A, 49B, 49C, 50A, 50B, and 50C are views to illustrate various methods for determining a visible area according to an embodiment of the present disclosure.

Referring to FIGS. 49A, 49B, and 49C, a method for determining a visible area using a gyro sensor, a geomagnetic sensor, an acceleration sensor, and the like, is illustrated. Because the method for detecting a motion of the mobile device using these sensors has been described in detail in the above-described embodiments of the present disclosure, a redundant explanation is omitted.

FIG. 49A illustrates a visible area in a normal state. Although the mobile device is fixed in a bangle state by means of securing means 4910 and 4920 in FIGS. 49A, 49B, and 49C, the mobile device may be implemented as a flexible device or may be implemented in any other shape as described above.

The normal state recited herein refers to a state in which at least one of a pitch angle, a roll angle, and a yaw angle that is detected when the user wears the mobile device on the user's wrist and adjusts the back of the user's hand to the user's eyes satisfies an angle range. For example, when the pitch angle and the roll angle measured in the horizontal state are 0°, the normal state is determined when the pitch angle and the roll angle are measured in the range of −20~+20°. Such an angle range may be measured in advance through an experiment and may be stored in the storage 3320 of the mobile device. According to various embodiments of the present disclosure, the angle range may be configurable by the user (e.g., according to user preferences). In the normal state, the middle area out of the whole area of the display 3310 of the mobile device is determined as a visible area.

In this state, when the user rotates the user's wrist in an upward direction by 90°, the securing means 4910 and 4920 are oriented downwardly and the visible area is changed to a lower area out of the whole area of the display 3310 as shown in FIG. 49B. In contrast, when the user rotates the user's wrist in a downward direction by 90° in the state shown in FIG. 49A, or rotates the user's wrist by 180° in the state shown in FIG. 49B, the securing means 4910 and 4920 are oriented upwardly. Accordingly, the visible area is changed to an upper area out of the whole area of the display 3310 as shown in FIG. 49C.

Figures 50A, 50B, 50C:
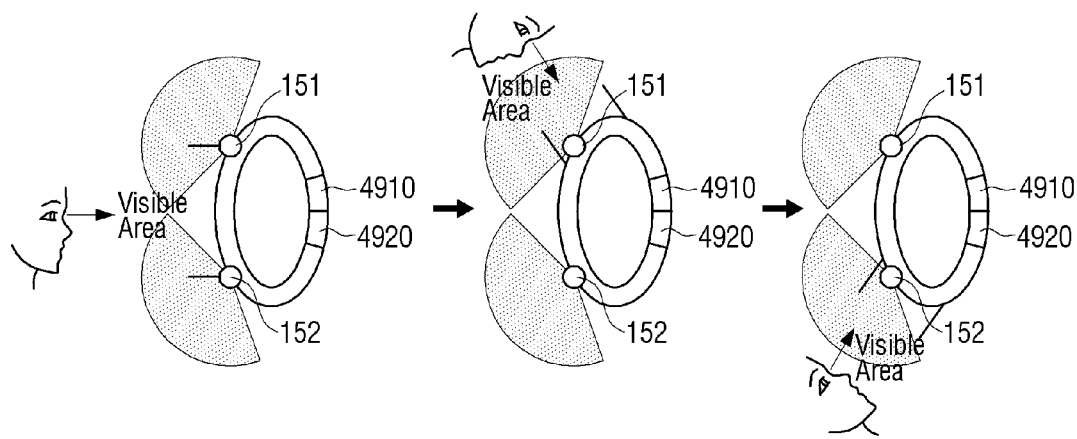

Referring to FIGS. 50A, 50B, and 50C, a method for determining a visible area by photographing the user according to an embodiment of the present disclosure is illustrated. At least one sensor, camera, and/or the like may be implemented and used to determine the visible area more exactly. In FIGS. 50A, 50B, and 50C, two sensors, cameras, and/or the like are included.

As shown in FIG. 50A, two sensors, cameras, and/or the like 151 and 152 may be spaced apart from each other by more than a predetermined distance in the display 3310 of the mobile device. To avoid a limit of screen display, each sensor, camera, and/or the like 151 and 152 may be placed on a side of the mobile device.

The controller 3330 analyzes images photographed by the two sensor, camera, and/or the like 151 and 152 and identifies a subject. Specifically, the controller 3330 recognizes a facial area of the user. Because the method for recognizing a face has been already described in the above-described embodiments of the present disclosure, a redundant explanation is omitted. In a normal state in which the user looks ahead of the mobile device as shown in FIG. 50A, the user's face may be photographed by the two sensors, cameras, and/or the like 151 and 152. When a facial area is recognized from the whole image photographed by the two sensors, cameras, and/or the like 151 and 152, the controller 3330 determines the normal state and determines a screen area of the display 3310 placed between the two sensors, cameras, and/or the like 151 and 152 as a visible area.

According to various embodiments of the present disclosure, when the user's face is detected only by the first sensors, cameras, and/or the like 151, as shown in FIG. 50B, a screen area of the display 3310 disposed around the first photographer 151 is determined as a visible area, and, when the user's face is detected only by the second sensors, cameras, and/or the like 152, as shown in FIG. 50C, a screen area of the display 3310 disposed around the second photographer 152 is determined as a visible area.

When the user visible area is determined, the controller 3330 may execute an application corresponding to an item displayed on a predetermined location of the visible area and may display an execution screen of the executed application on the corresponding location.

According to the various embodiments of the present disclosure described above, the mobile device provides the list UI regarding the installed applications and provides execution screens of some of the applications along with the list UI, so that the user can easily use the applications.

Figure 51:
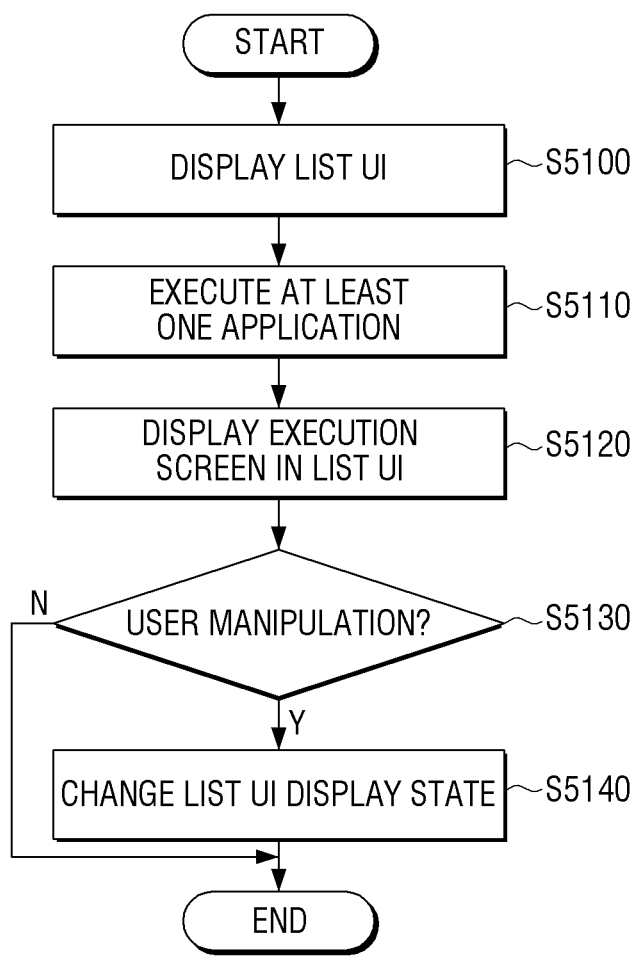
FIG. 51 is a flowchart to illustrate a method for displaying a UI of a mobile device according to an embodiment of the present disclosure.

FIG. 51 is a flowchart to illustrate a UI display method according to various embodiments of the present disclosure.

Referring to FIG. 51, at operation S5100 the mobile device displays a list UI.

At operation S5110, at least one application is executed.

At operation S5120, a resulting execution screen is displayed in the list UI. According to an embodiment of the present disclosure, the execution screen may be directly displayed on the initial list UI or may be displayed only when being selected by the user.

In this state, the user may manipulate the list UI in various directions. At operation S5130, the mobile device determines whether the user manipulated the list UI.

If the mobile device determines that the user manipulates the list UI at operation S5130, then the mobile device may proceed to operation S5140 at which the mobile device changes a display state of the list UI according to a user manipulation direction. For example, the mobile device may change application items displayed on the list UI or may change a content displayed on the execution screen of the application.

In contrast, if the mobile device determines that the user did not manipulate the list UI at operation S5130, then the mobile device may continue to poll for indication of user manipulation of the list UI. As an example, the mobile device may perform other corresponding functions or operations while polling for an indication of user manipulation.

In addition, the list UI and the execution screen may be provided in various shapes as described in relation to FIGS. 33 to 50C.

Accordingly, the mobile device of the bangle type can be used more effectively and easily.

Because the mobile device of the bangle type is carried by the user while being directly worn on the user's body as described above, the mobile device may be used when the user does exercise such as running or gymnastics. Accordingly, the mobile device may provide various services such as measuring an amount of exercise, managing health, and managing a body shape. It may be difficult to control the mobile device in a manipulation method using touch, motion gesture, voice recognition, and/or the like because the mobile device is greatly shaken and is affected by ambient noise when the user does exercise. Accordingly, manipulating the mobile device in a simpler method according to a use environment of the mobile device may be necessary. Hereinafter, various scenarios in which the mobile device of the bangle type is used, and examples of a UI configuration thereof will be explained in detail.

FIGS. 52, 53, 54, 55, 56A, 56B, and 56C are views to illustrate a UI display method using a display of a seamless form according to an embodiment of the present disclosure. For example, FIGS. 52 to 55 are views to illustrate an example of a screen display method of a mobile device which is implemented to have a display larger than a visible area according to various embodiments of the present disclosure.

As explained in relation to FIGS. 2A to 4C, the display 110 may be disposed on the entire outer surface of the mobile device 100 in a seamless form. According to various embodiments of the present disclosure, the display 110 may be implemented to be rotatable with reference to the body on the surface of the mobile device 100.

In this case, even when an execution screen of an application stored in the storage 130 is displayed on an entire display area of the display 110, a part of the execution screen is shown in a visible area which is actually visible to the user. For example, when the mobile device 100 is implemented as a bangle type, only a display area that the user looks is shown and an execution screen displayed on a display area behind the forward display area is not shown.

When a user interaction is detected by a sensor such as the touch sensor 174 and the motion sensor 140, the controller 120 may change the part of the execution screen displayed in the visible area according to the user interaction. The user interaction may refer to various manipulations such as a rubbing operation which covers the surface of the display 110 with the user's palm and drags up or down in one direction, simply touching the surface of the display 110 and dragging or flicking, and moving or twisting a body wearing the mobile device 100. When the user interaction is detected, the controller 120 may change the part shown in the visible area by scrolling the execution screen in a direction matching the user interaction.

Figure 52:
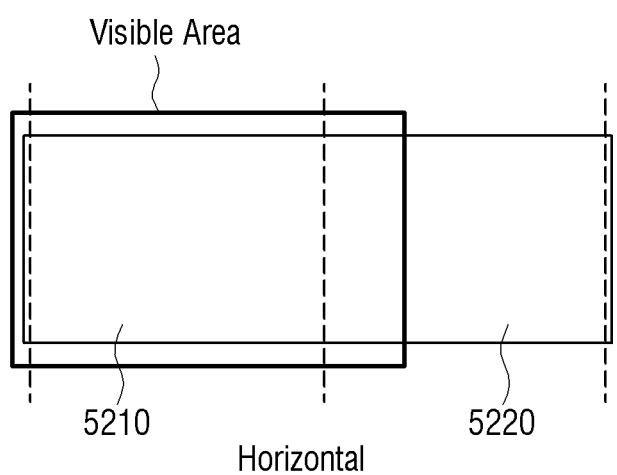

FIG. 52 illustrates the display which is placed in a horizontal direction. In this case, only a part 5210 of the execution screen 5210 and 5220 is shown in the visible area. In this state, when the user performs a defined interaction, the other part 5220 is shown in the visible area.

Figure 53:
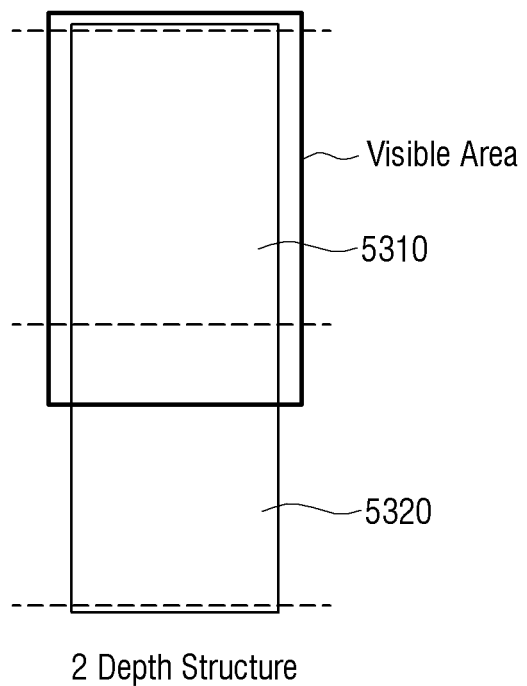

FIG. 53 illustrates the display which is placed in a vertical direction. In this case, a part of the execution screen 5310 and 5320 that is shown in the visible area is adjusted according to a user interaction.

Figure 54:
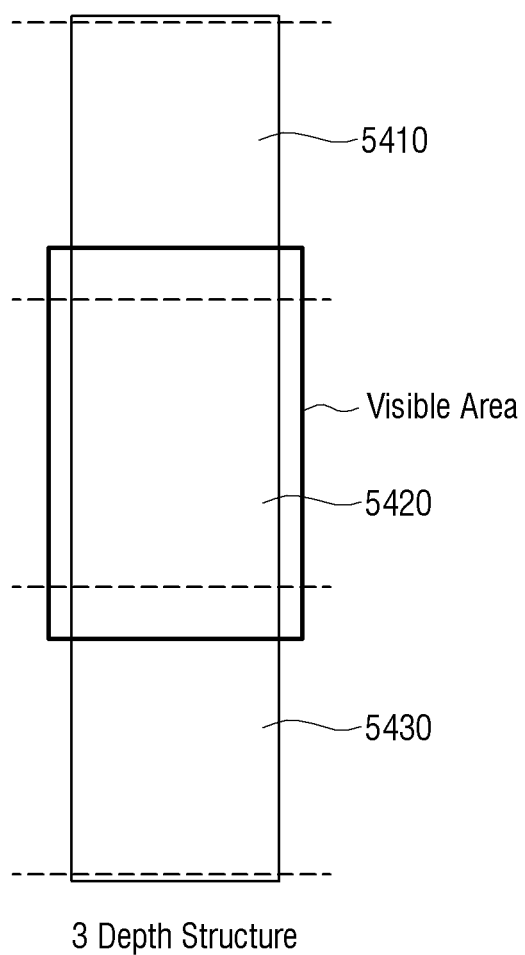

In FIGS. 52 and 53, the screen is changed in 2 depth when the whole display area is about 2 times larger than the visible area. However, the whole display area may be more than 2 times larger than the visible area, FIG. 54 illustrates an example in which the screen is changed in 3 depth. Referring to FIG. 54, the execution screen may be divided into 3 phases 5410, 5420, and 5430 and each screen unit may be displayed in the visible area.

Figure 55:
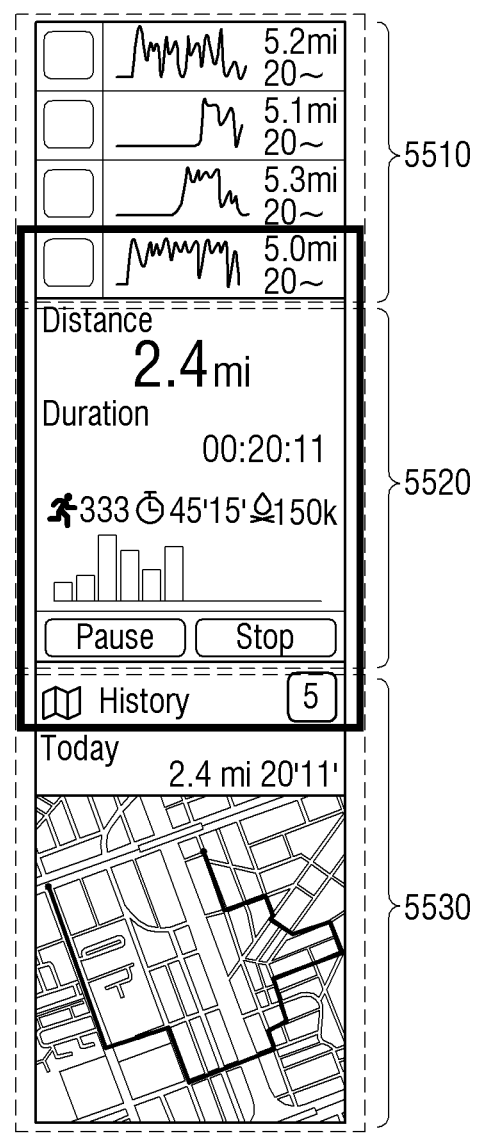

FIG. 55 illustrates an example of an execution screen which is implemented in 3 depth. Specifically, FIG. 55 illustrates an execution screen which is displayed on the whole display area of the display 110 when the controller 120 executes a run management application. As shown in FIG. 55, the whole execution screen (e.g., including phases 5510, 5520, and 5530) is larger than the visible area. Accordingly, the controller 120 may display the execution screen in phases (e.g. phases 5510, 5520, and 5530) according to a user interaction.

FIGS. 56A, 56B, and 56C are views illustrating a method for changing a screen displayed on a visible area and an example of an execution screen displayed in the visible area accordingly according to an embodiment of the present disclosure.

Referring to FIG. 56A, a middle part 5520 of the execution screen of FIG. 55 is displayed in the visible area. Referring to FIG. 56A, distance that the user has run, elapsed time, speed graph, various menus, and the like may be displayed. According to various embodiments of the present disclosure, a part of the upper part 5510 of the execution screen is displayed on an upper end of the visible area, and a part of the lower part 5530 of the execution screen is displayed on a lower end of the visible area.

In this state, when the user performs a first user interaction, the upper part 5510 moves down and is displayed in the visible area as shown in FIG. 56B. The upper part 5510 may display information on running history of friends of the user. In contrast, when the user performs a second user interaction, the lower part 5530 moves up and is displayed in the visible area as shown in FIG. 56C. The lower part 5530 of the execution screen may display information on running course and distance.

Figure 57A:
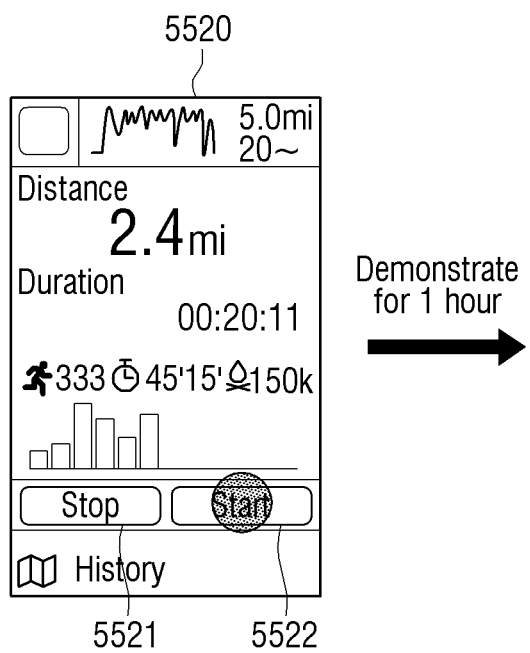
FIGS. 57A and 57B are views to illustrate a method for using a run management application according to an embodiment of the present disclosure.
Figure 57B:
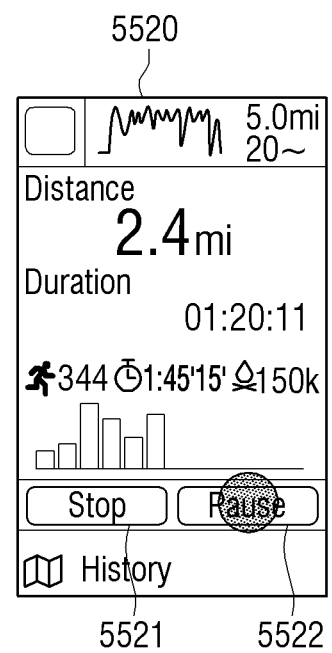

FIGS. 57A and 57B are views to illustrate a method for using a run management application according to an embodiment of the present disclosure.

Referring to FIGS. 57A and 57B, an execution screen 5520 displays information such as distance that the user has run, elapsed time, and hourly speed, and buttons 5521 and 5522. The user manages the user's own exercise by pressing the start button 5522 and starting exercising, and pressing the end button 5521 when finishing exercising.

FIGS. 58A to 58G are views to illustrate a method for using a whole execution screen of a run management application according to an embodiment of the present disclosure.

Referring to FIGS. 58A to 58G, a visible area out of the whole display area of the display 110 is illustrated. FIG. 58A illustrates a middle screen part 5520 of the execution screen that is displayed in the visible area. In this state, when the user makes a gesture of rubbing downwardly or tilting the user's wrist wearing the mobile device to the right, an upper screen part 5510 of the execution screen moves down and is displayed in the visible area as shown in FIG. 48B. A user interaction to change the screen displayed in the visible area may be set variously. However, in the present embodiment of the present disclosure, the screen is set to be changed by the gesture of rubbing downwardly or tilting the user's wrist wearing the mobile device to the right, or by a gesture of rubbing upwardly or tilting the user's wrist wearing the mobile device 100 to the left. For the convenience of explanation, the gesture of rubbing downwardly or tilting the user's wrist wearing the mobile device 100 to the right is defined as a first user interaction, and the opposing gesture is defined as a second user interaction.

As shown in FIG. 58B, the upper screen part 5510 may display exercise records of persons registered as user's friends in the form of a list. The user may touch and drag the screen. Accordingly, the list displayed on the upper screen part 5510 may be scrolled and exercise records of other persons may be displayed as shown in FIG. 58C.

In this state, when the second user interaction is performed, the screen is changed back to the middle screen part 5520 as shown in FIG. 58D. In contrast, when the middle screen part 5520 is displayed as shown in FIG. 58A or 58D, and the second user interaction is performed, a lower screen part 5530 is displayed as shown in FIG. 58E. The lower screen part 5530 may display running course, distance of the day, and elapsed time. In addition, a history menu for viewing previous running records may be displayed. When the history menu is selected, previous records are displayed as shown in FIG. 58F. When the lower screen part 5530 is displayed and the first user interaction is performed, the middle screen part 5520 is displayed again as shown in FIG. 58G.

In addition, the screen may be changed to another form when the user does not see the mobile device.

FIGS. 59A, 59B and 59C illustrate change in the screen when a user lowers a mobile device while the mobile device is executing a run management application according to an embodiment of the present disclosure.

Referring to FIGS. 59A, 59B, and 59C, as an example, when the middle screen part 5520 of the whole execution screen of the run management application is displayed as shown in FIG. 59A, and when the user lowers the user's hand wearing the mobile device 100 as shown in FIG. 59B, the screen is changed as shown in FIG. 59C. FIG. 59C illustrates a running situation as a histogram image 5900. By providing vibration and visual feedback, the mobile device 100 can allow the user to know a current pace intuitively while running. It is determined whether the user lowers the user's hand or not using the motion sensor 140.

According to various embodiments of the present disclosure, when an event other than the user interaction occurs, the screen may be changed.

Figure 60A:
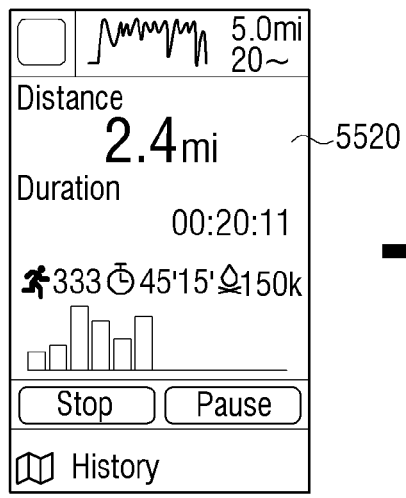
FIGS. 60A, 60B, and 60C are views to illustrate displaying information on the behavior of others according to an embodiment of the present disclosure.
Figure 60B:
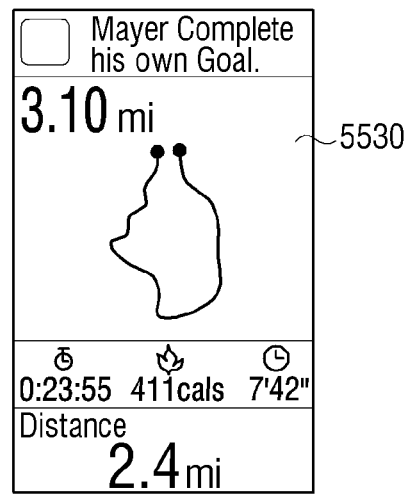
Figure 60C:
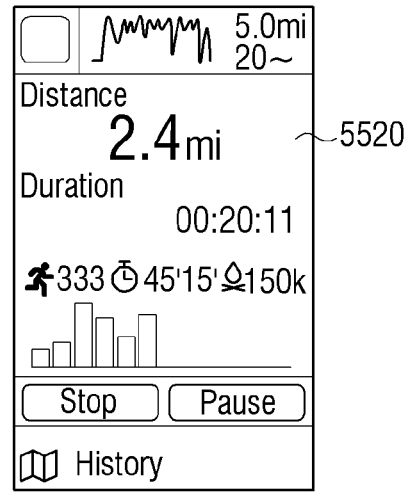

FIGS. 60A, 60B, and 60C are views to illustrate displaying information on the behavior of others according to an embodiment of the present disclosure.

Referring to FIGS. 60A, 60B, and 60C, when the middle screen part 5520 of the execution screen of the run management application is displayed as shown in FIG. 60A, and running of another person registered at the mobile device 100 finishes or another person sets a record, the upper screen part 5510 moves down as shown in FIG. 60B and information on the related person is spread. When a predetermined time (e.g., 3 seconds) elapses, the original screen 5520 is displayed again as shown in FIG. 60C even if there is no extra user interaction. The information related to other persons may be provided by a server apparatus communicating with the mobile device 100. The server apparatus may be implemented in various forms such as a web server, a cloud server, and the like. Although the information on the friends of the user is automatically notified in FIGS. 60A, 60B, and 60C, the information on the friends may be notified in various ways. For example, when the user touches a certain point or a hidden area on the screen shown in FIG. 60A, a screen 5530 as shown in FIG. 60B may be displayed. In addition, when the upper screen part 5510 is displayed first and the user selects one item of the list, information on the selected person may be displayed.

In addition, a variety of personal information as well as the running course may be displayed by the run management application.

FIGS. 61A, 61B, 61C, 61D, and 61E are views to illustrate a method for displaying a screen of a mobile device according to an embodiment of the present disclosure.

Referring to FIGS. 61A, 61B, 61C, 61D, and 61E, the screen 5520 is displayed and the second user interaction is performed as shown in FIG. 61A, the lower screen part 5530 is displayed as shown in FIG. 61B. As described above, the lower screen part 5530 displays the running course of the day in the form of a map. According to various embodiments of the present disclosure, a menu 5540 indicating a number of photos taken around the course is displayed on the lower screen part 5530. As shown in FIG. 61C, 5 photos are stored.

When the user selects the menu 5540, thumbnail images 5531 to 5535 of the photos are displayed at respective photographing locations of the photos on the course. In this state, when one thumbnail image 5533 is selected as shown in FIG. 61D, the selected thumbnail image 5533 is enlarged and displayed as shown in FIG. 61E. As described above, the run management application provides various services related to running so that the user can have an interest in running.

Figure 62:
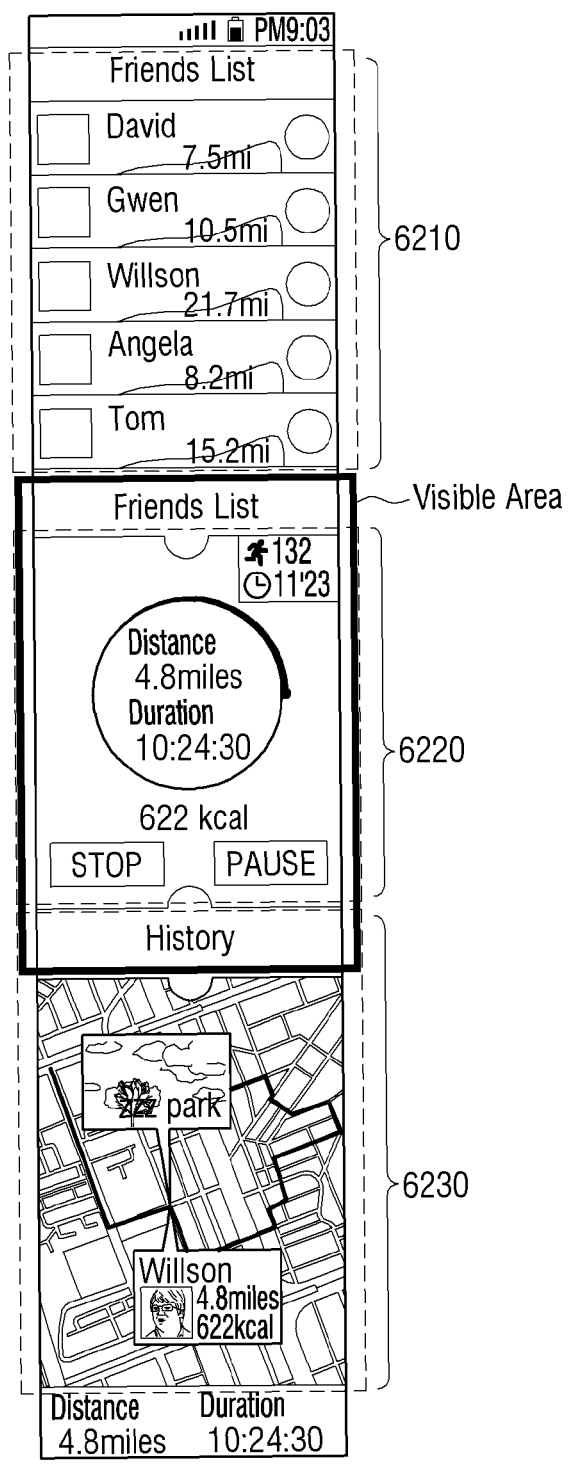
FIG. 62 is a view illustrating a configuration example of an execution screen of a run management application according to an embodiment of the present disclosure.

FIG. 62 is a view illustrating a configuration example of an execution screen of a run management application according to an embodiment of the present disclosure.

Referring to FIG. 62, an upper screen part 6210 of the execution screen displays information like photos of friends, speed in each section, distance, and elapsed time in the form of a list. A middle screen part 6220 may display information like distance, duration, average speed, average calorie burned, calorie burned in each section, and a number of steps, and menus such as pause, stop, start, and the like. A lower screen part 6230 may display a tracking map, a number of photos of the day, a history menu, and the like. The user may manage the running exercise effectively by changing the screen according to various user interactions as described above.

Figure 63:
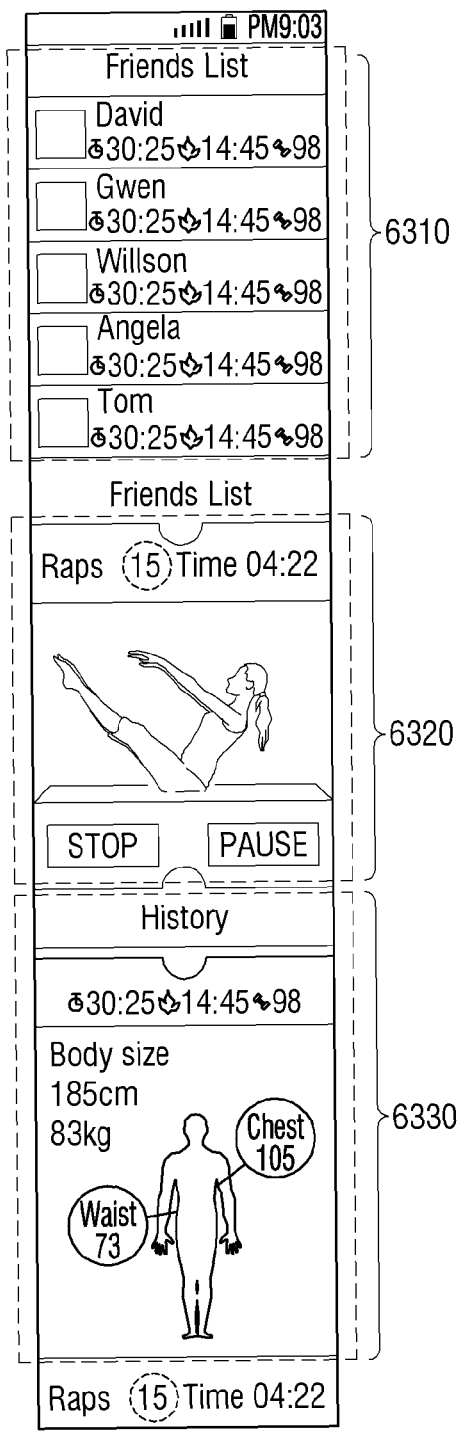
FIG. 63 is a view illustrating an execution screen of a fitness application according to an embodiment of the present disclosure.

FIG. 63 is a view illustrating an execution screen of a fitness application according to an embodiment of the present disclosure.

Referring to FIG. 63, the execution screen of the fitness application may be divided into 3 unit screens. An upper screen part 6310 displays information like icons or photos and names of registered friends, date, an amount of exercise with a goal, time, calorie burned, and the like.

A middle screen part 6320 displays various contents and information related to the user's exercise. Specifically, a target number of exercise, a target time, moving image/image guide, and exercise start/end selection menus may be displayed. A lower screen part 6330 displays an amount of user's exercise by mapping the amount of exercise onto the user's body. Specifically, an exercise history menu, an amount of exercise with a goal, time, calorie burned, a body size, a whole body image, and an exercising part of the body are displayed as a graphic image.

FIGS. 64A, 64B, and 64C are views to illustrate a method for changing an execution screen such as, for example, the execution screen of FIG. 63 according to a user interaction according to an embodiment of the present disclosure.

Referring to FIGS. 64A, 64B, and 64C, similar to the other various embodiments of the present disclosure such as exemplary embodiments described above, the execution screen may be changed to the upper screen part according to the second user interaction as illustrated in FIGS. 64A and 64B, or may be changed to the lower screen part according to the first user interaction as illustrated in FIGS. 64B and 64C.

As described above, the run management service or the fitness service may be provided on the mobile device. These applications may be implemented as a single application such as a health application. In addition, these applications may be displayed in the list UI explained above in relation to FIGS. 34A, 34B, and 34C.

FIGS. 65A, 65B, 65C, and 65D are views illustrating an example of a list UI in which a variety of application information including a health application is displayed according to an embodiment of the present disclosure.

Referring to FIG. 65A, a list UI screen 6500 displays various application items including an execution screen 6510 of a health application. The execution screen 6510 includes a run management menu 6511, user information 6512, and a fitness menu 6513.

As shown in FIG. 65B, when the user touches the run management menu 6511, a first screen 6520 to manage running exercise is displayed. In contrast, as shown in FIG. 65C, when the user touches the fitness menu 6513, a second screen 6530 to manage fitness exercise is displayed. As shown in FIG. 65D, when a stop menu of each screen 6520 and 6530 is selected, the original screen 6500 is displayed again.

Figures 66A, 66B:
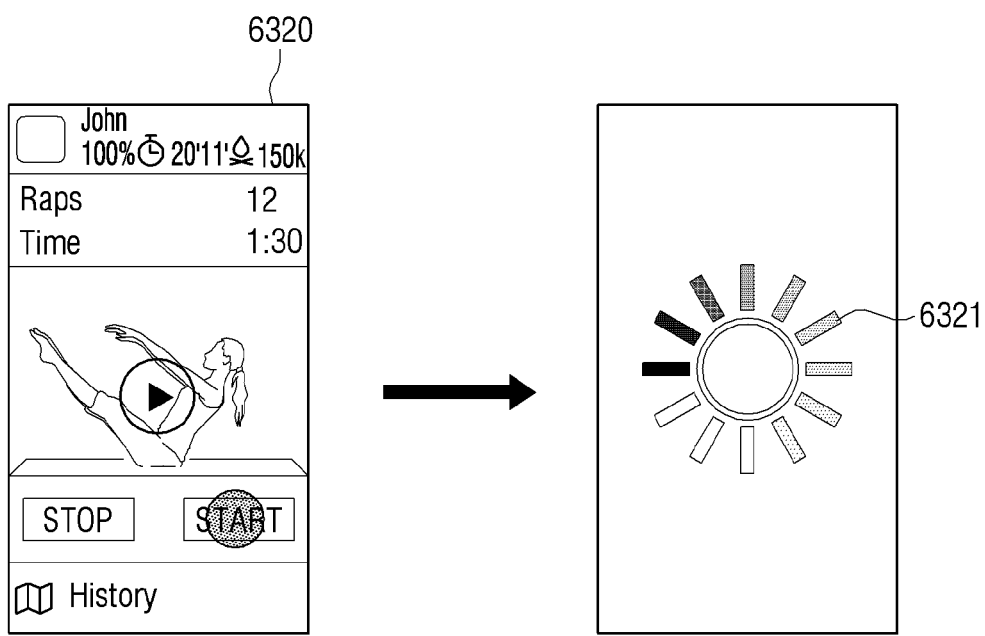
FIGS. 66A and 66B are views illustrating an example of a screen which is displayed while the user is exercising according to an embodiment of the present disclosure.

FIGS. 66A and 66B are views illustrating an example of a screen which is displayed while the user is exercising according to an embodiment of the present disclosure.

Referring to FIG. 66A, an execution screen 6320 of the fitness application is illustrated. When a start menu of the execution screen 6320 is selected, an image 6321 indicating a degree of exercise is displayed as shown in FIG. 66B. The image 6321 is divided into a plurality of unit images. The controller 120 changes color or shape of the unit image in phases according to the degree of exercise. For example, when the user does barbell lift exercise, colors of the unit images are changed one by one according to a number of lifts.

As described above, the mobile device may execute various applications related to health, and the execution screen of the application is freely changed according to characteristics of the mobile device. There are various applications that are executed in the mobile device.

Figure 67:
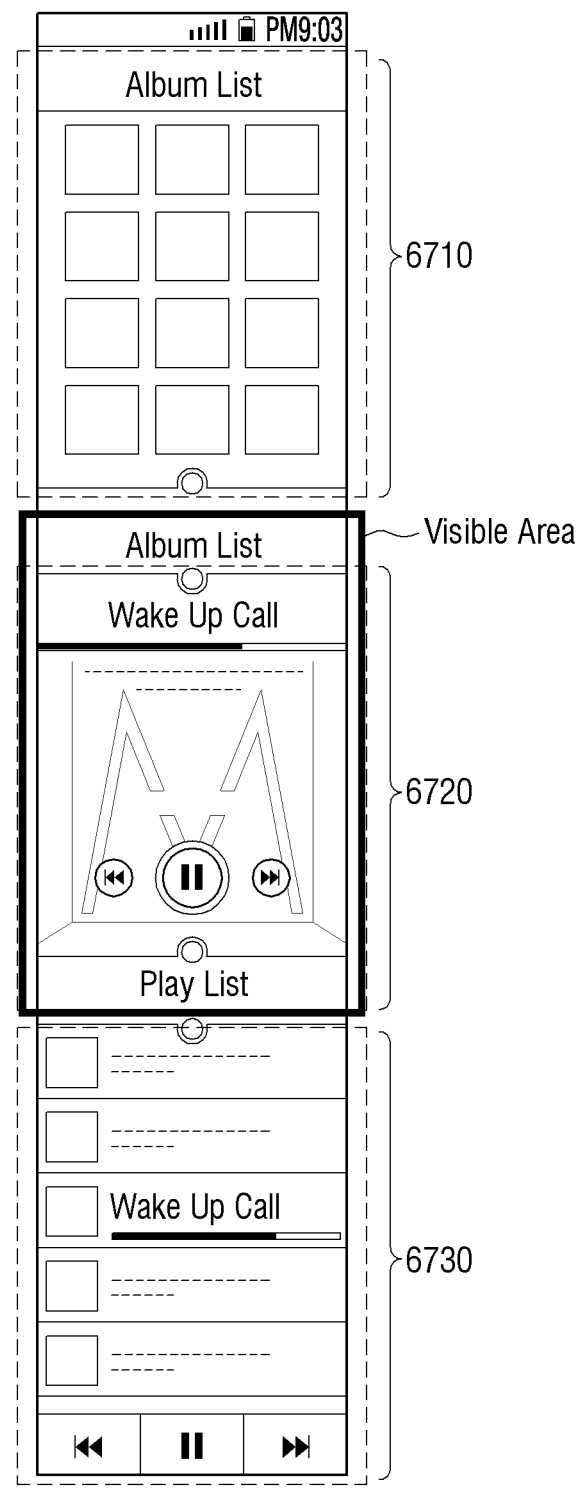
FIG. 67 is a view illustrating an example of an execution screen of a music application according to an embodiment of the present disclosure.

FIG. 67 is a view illustrating an example of an execution screen of a music application according to an embodiment of the present disclosure.

Referring to FIG. 67, the whole execution screen is divided into an upper screen part 6710, a middle screen part 6720, and a lower screen part 6730. The upper screen part 6710 displays an album list in which covers of music albums displayable by the music application are arranged in the form of a thumbnail image. The middle screen part 6720 displays a playback screen of a music content. The playback screen displays information like title, singer, and album photo of music being played back, various menus like shuffle, playback of previous song, playback of next song, playback, pause, and repeat playback, and a playback bar indicating a playback time and a remaining time, and a current degree of playback. The lower screen part 6730 displays a music list that the user selects to play back. Each music item of the music list may display information such as, for example, album photo, music title, singer, and the like. The music that is currently played back in the music list may be highlighted.

FIGS. 68A, 68B, 68C, 68D, 68E, 68F, 68G, and 68F are views to illustrate a method for manipulating an execution screen of a music application according to an embodiment of the present disclosure.

Referring to FIG. 68A, an execution screen 6811 of a music application may be displayed in a list UI 6810. When the user touches the execution screen 6811, the execution screen is changed to a full application screen as shown in FIG. 68B. In this state, when the user performs the second user interaction, a music list 6820 is displayed as shown in FIG. 68D. A music item that is currently played back in the music list 6820 is highlighted. When the user selects another item in the music list 6820, a music content of the selected item is played back and the highlight display is changed as shown in FIG. 68E.

In this state, when the first user interaction is performed, the screen is changed to a playback screen 6830 as shown in FIG. 68F. The playback screen 6830 may display an album photo, a title, and the like of a newly played back music content. In this state, when the second user interaction is performed, an album list screen 6840 is displayed as shown in FIG. 68G.

In contrast, when the user lowers the user's hand wearing the mobile device 100, the execution screen may be changed to another form.

FIGS. 69A, 69B, 69C, and 69D are views illustrating a change example of an execution screen according to an embodiment of the present disclosure.

Referring to FIG. 69A, when the playback screen 6830 is displayed and the user lowers the user's hand as shown in FIG. 69D, an equalizer screen 6840 is displayed as shown in FIG. 69B. In this state, when the user makes a gesture of flicking the user's wrist, a next music content is played back and an equalizer screen 6850 corresponding to the changed music content is displayed as shown in FIG. 69C.

As described above, the mobile device may perform various control operations according to the user interaction performed on the surface of the display 110 or the user interaction to move the mobile device itself. For example, an unlock operation to change a lock state to an unlock state may also be automatically performed by the user interaction.

FIGS. 70A, 70B, 70C, and 70D are views illustrating an example of a screen manipulation method of a mobile device according to an embodiment of the present disclosure. For example, FIGS. 70A, 70B, 70C, and 70D are views to illustrate a process of performing an unlock operation according to a user interaction according to an embodiment of the present disclosure.

Referring to FIG. 70A, when the user lowers the user's arm, the mobile device operates in a power saving mode or a lock mode. In this state, brief information (e.g., clock information) 6911 may be displayed on a black screen 6910.

In this state, as shown in FIG. 70B, when the user raises the user's arm, the controller 120 displays additional information. For example, when the user raises the user's arm, a visual effect is added and a variety of additional information 6921 and 6922 like weather or date information, notification of a received message, a communication state, a battery level, and the like may be displayed in a screen 6920 in addition to the clock information 6911.

In this state, when the user keeps eyes on the screen, the controller 120 identifies the user's eyes. The controller 120 may identify the user's eyes by photographing the user's face using a plurality of photographers as shown in FIG. 50. As shown in FIG. 70C, a predetermined 'a' second (e.g., 'a' is a predetermined number) elapses after the user's eyes are identified or the user raises the user's arm, the controller 120 displays a list UI 6930. Thereafter, the controller 120 executes an application corresponding to an application item placed in the middle of the list UI 6930, and automatically displays an execution screen in the list UI as shown in FIG. 70D. In FIG. 70D, a photo application placed in the middle of the list UI 6930 is executed and an execution screen thereof is displayed.

The list UI may not be necessarily displayed on the full screen. The list UI may be hidden in the display 110 or in an edge of the display 110 and may be displayed according to a user interaction.

Figures 71A, 71B, 71C:
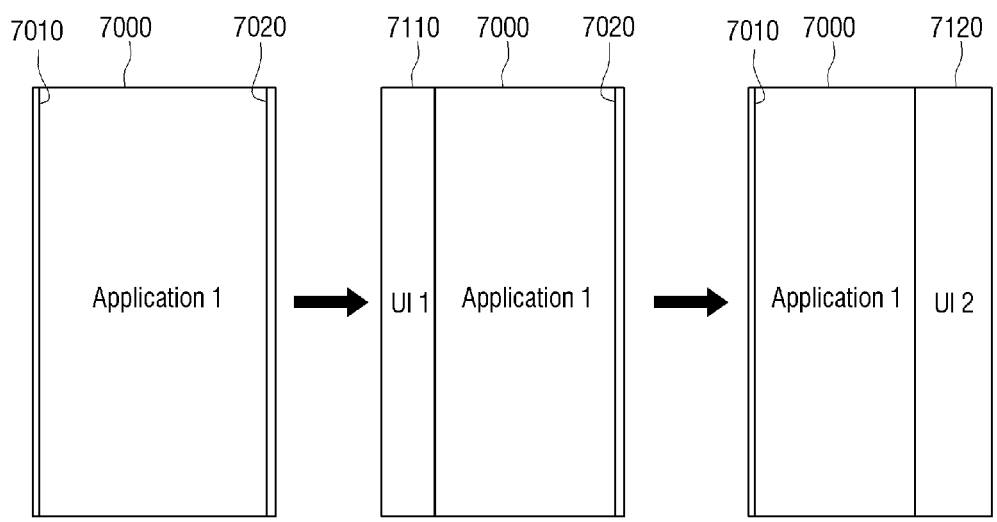
FIGS. 71A, 71B, and 71C are views to illustrate a method for displaying a UI according to an embodiment of the present disclosure.

FIGS. 71A, 71B, and 71C are views to illustrate a method for displaying a UI according to an embodiment of the present disclosure.

Referring to FIG. 71A, a screen 7000 of the mobile device displays a first guide image 7010 and a second guide image 7020. The first and second guide images 7010 and 7020 may be images for intuitively informing the user that hidden UIs (or UIs not otherwise displayed) exist in such directions. In addition, a part of a line UI may be used as a guide image. In FIGS. 71A, 71B, and 71C, the first and second guide images are displayed along edges of the screen 7000 in the form of a small line.

In this state, as shown in FIG. 71B, when the user performs a first user interaction of touching the screen and then dragging to the right or tilting the user's wrist to the right, a first line UI 7110 is displayed. Specifically, when the first user interaction is detected, the controller 120 moves the first guide image 7010 inside the screen and gradually changes the first guide image 7010 to the first line UI 7110. In contrast, as shown in FIG. 71C, when the user performs a second user interaction of touching the screen and then dragging to the left or tilting the user's wrist to the left, a second line UI 7120 is displayed. When the second user interaction is performed in the state shown in FIG. 71B, the controller 120 makes the first line UI 7110 disappear into the edge. The controller 120 moves the second guide image 7020 inside the screen and gradually changes the second guide image 7020 to the second line UI 7120.

Figure 72A:
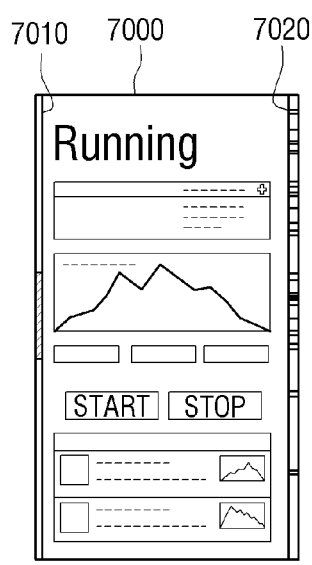
FIGS. 72A, 72B, and 72C are views illustrating an example of a real UI screen according to an embodiment of the present disclosure.
Figure 72B:
Figure 72C:
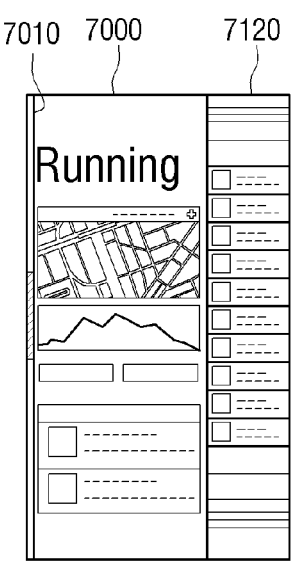

FIGS. 72A, 72B, and 72C are views illustrating an example of a real UI screen according to an embodiment of the present disclosure.

Referring to FIG. 72A, an execution screen 7000 of a run management application is illustrated. A first guide image 7010 and a second guide image 7020 are displayed on opposite edges of the execution screen 7000.

In this state, as shown in FIG. 72B, when the first user interaction is performed, the first guide image 7010 is changed to a first line UI 7110. The first line UI 7110 may be a UI for displaying icons corresponding to applications installed in the mobile device 100. In addition, as shown in FIG. 72C, when the second user interaction is performed, the second guide image 7020 is changed to a second line UI 7120. The second line UI 7120 may be a UI for displaying use records which are arranged in chronological sequence. Specifically, the second line UI 7120 may display messages sent or received by the user, photos taken by the user, SNS message, and the like.

When one icon of the first line UI 7110 is selected, the controller 120 directly executes an application corresponding to the selected icon and displays an execution screen of the application. In addition, when a use record item of the second line UI 7120 is touched, the controller 120 executes an application corresponding to the touched item and displays an execution screen of the application.

In FIGS. 71A to 72C, the guide images and the line UIs are used altogether. However, the display of the guide images may be omitted. In addition, the guide images or the line UIs may be provided on a standby screen other than the execution screen of the application.

Figure 73A:
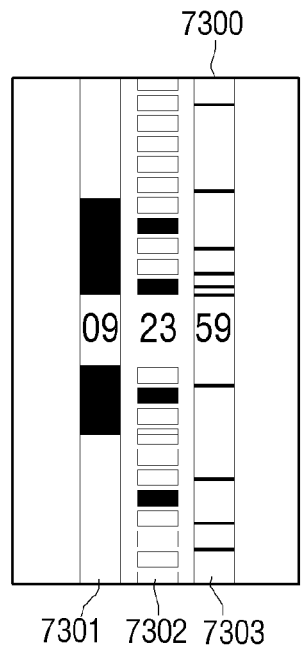
FIGS. 73A, 73B, 73C, and 73D are views to illustrate a method for displaying an application execution screen using a line UI according to an embodiment of the present disclosure.
Figure 73B:
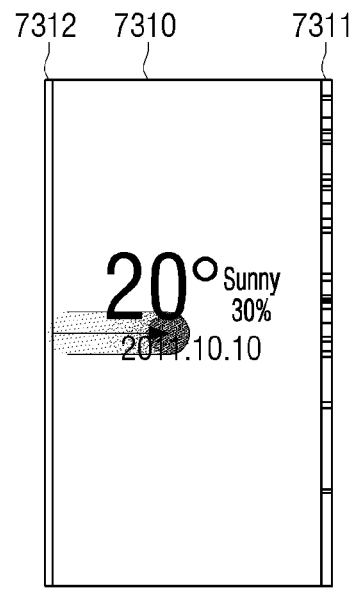
Figure 73C:
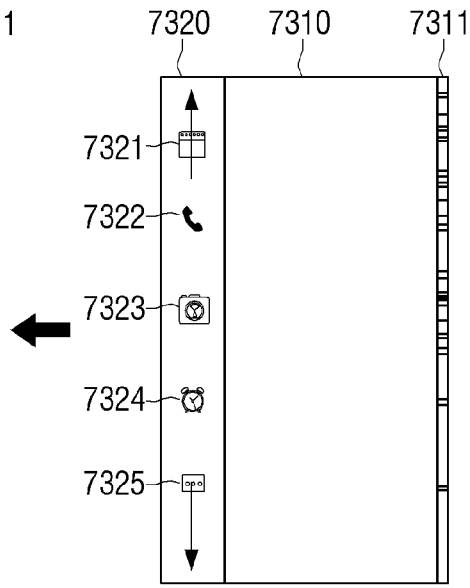

FIGS. 73A, 73B, and 73C are views to illustrate a method for displaying an application execution screen using a line UI according to an embodiment of the present disclosure.

Referring to FIG. 73A, an example of a standby screen 7300 is illustrated. The standby screen 7300 displays time lines 7301, 7302, and 7303 of hour, minute, and second units. The time lines 7301, 7302, and 7303 are displayed in a lengthwise direction according to a shape of the mobile device, and each time line 7301, 7302, 7303 displays time by moving blocks one by one as the time elapses. Specifically, the standby screen 7300 displays a current time by moving down blocks of the lines 7301, 7302, and 7303 of hour, minute, and second as if a second hand is rotated.

When an unlock operation is performed in this state, the time lines of hour, minute, and second are integrated into a single long time line in the standby screen 7300, and move and disappear into one side of the screen. In FIG. 73B, the integrated time line moves to the right of the screen and is changed to a second guide image 7312.

As shown in FIG. 73B, when the standby screen 7300 disappears, the controller 120 displays a home screen 7310. The home screen 7310 displays a first guide image 7311 and the second guide image 7312 on opposite edges. In this state, when the user performs a user interaction of touching the screen and then dragging to the right or tilting the user's wrist wearing the mobile device 100 to the right, the first guide image 7311 is changed to a first line UI 7320. A plurality of icons 7321 to 7325 are displayed on the second line UI 7320. A user may select an icon of the plurality of icons 7321 to 7325 to perform a corresponding function (e.g., launch an associated application). As shown in FIG. 73C, the user may identify icons of installed applications by scrolling up or down the first line UI 7320.

Figure 73D:
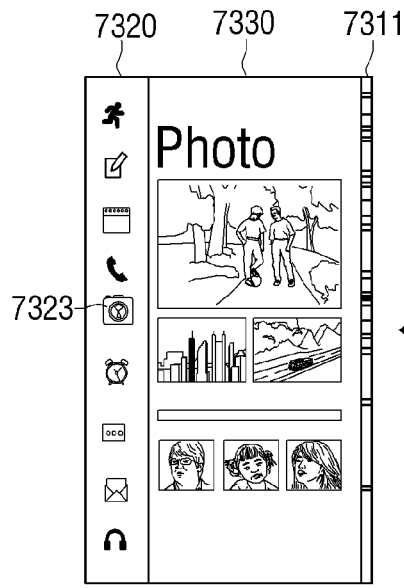

The controller 120 may display a preview screen 7330 on an application corresponding to an icon displayed at a specific location of the first line UI 7320. In FIG. 73D, a preview screen 7330 of an icon 7323 displayed at a middle location of the first line UI 7320 is displayed. When a specific icon is displayed at the middle location for more than a predetermined time or an icon is selected on the first line UI 7320, the controller 120 may display an application execution screen of the icon on the full screen.

FIGS. 74A, 74B, 74C, 74D, and 74E are views illustrating a process of displaying a second line UI according to an embodiment of the present disclosure.

Figure 74A:
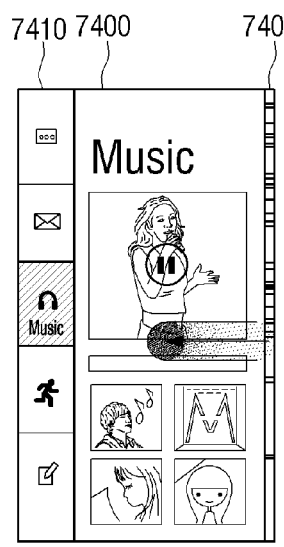
FIGS. 74A, 74B, 74C, 74D, and 74E are views illustrating a process of displaying a second line UI according to an embodiment of the present disclosure.
Figure 74B:
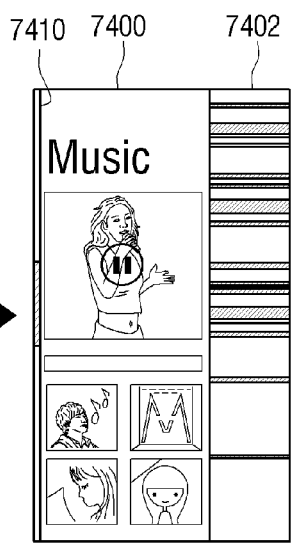
Figure 74C:
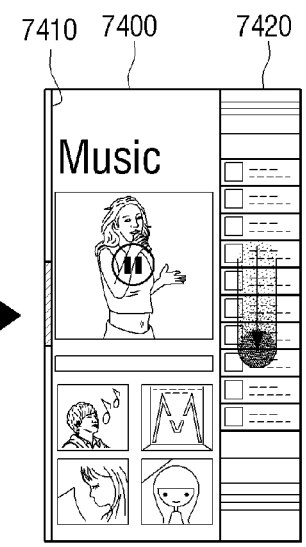

FIG. 74A illustrates an example of an execution screen 7400 which is displayed when a music application in a first line UI 7410 is selected. A second guide image 7402 is displayed on the right edge of the execution screen 7400 in the form of a thin line. The execution screen 7400 may display a music content playback screen and information of various selectable music contents. In this state, when the user performs a user interaction of touching and dragging from the right to the left or tilting the user's wrist to the left, the second guide image 7402 displayed on the right edge moves in as shown in FIG. 74B. The second guide image 7402 is automatically enlarged so that information can be identified and is changed to a second line UI 7420 as shown in FIG. 74C, The second line UI 7420 displays information on previously executed applications and other use records. The controller 120 may display applications of similar attributes in the same color. When the user scrolls the second line UI 7420, a content displayed on the second line UI 7420 is changed as shown in FIGS. 74C and 74D.

Figure 74E:
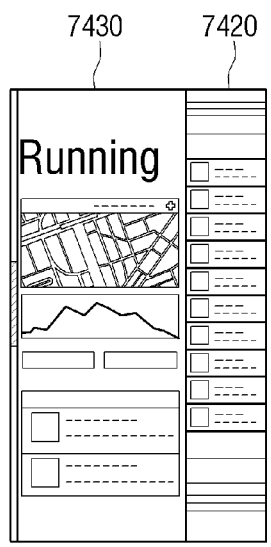
Figure 74D:
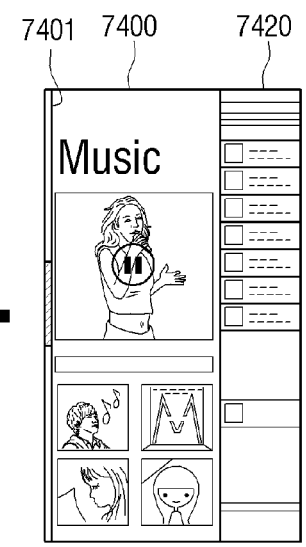

In this state, as shown in FIG. 74E, when one piece of information is selected, an application corresponding to the selected information is executed and an execution screen 7430 of the application is displayed. In contrast, the screen of the mobile device may be changed according to various events other than the user interaction. For example, when a message such as a mail or text is transmitted from another person, the controller 120 may briefly display the received message on the standby screen.

FIGS. 75A, 75B, 75C, and 75D are views illustrating a screen configuration of a mobile device according to various embodiments of the present disclosure.

Figure 75A:
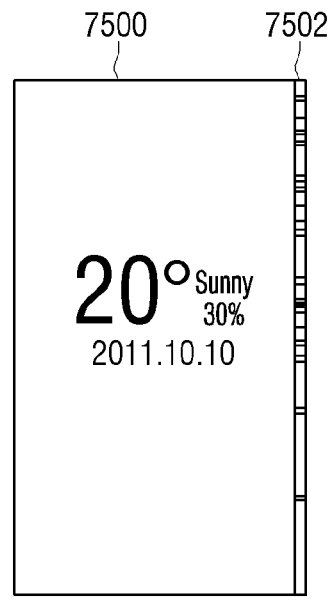
FIGS. 75A, 75B, 75C, and 75D are views illustrating a screen configuration of a mobile device according to various embodiments of the present disclosure.
Figure 75B:
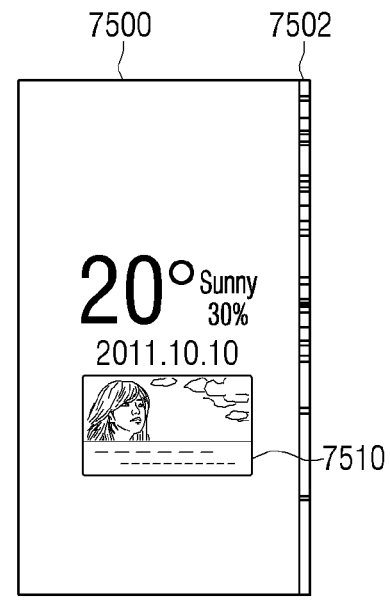
Figure 75D:
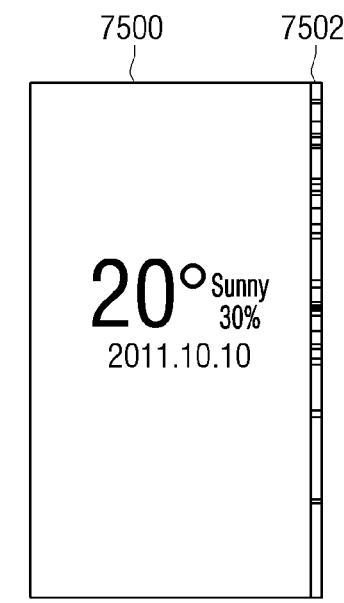
Figure 75C:
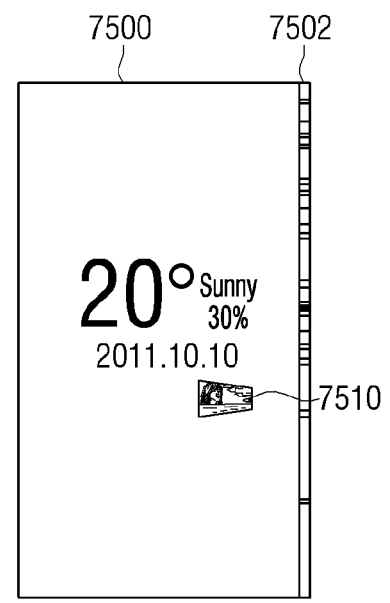

FIG. 75A illustrates a standby screen 7500. The standby screen 7500 displays a second guide image 7502. When a message is received in this state, the controller 120 displays the received message 7510 on the standby screen 7500 as shown in FIG. 75B. As shown in FIG. 75C. When a predetermined time elapses after the message 7510 is displayed, the controller 120 moves the message 7510 toward the second guide image 7502 while reducing the message 7510. As a result, as shown in FIG. 75D, the message 7510 completely moves toward the second guide image 7502 and disappears, and the standby screen 7500 is displayed. In FIGS. 75A, 75B, 75C, and 75D, a process in which a message temporarily displayed on the standby screen 7500 disappears has been described. However, a similar graphic effect may be provided in various situations. For example, when an application being executed is terminated, an execution screen of the application may disappear into the second guide image 7502 as shown in FIGS. 75B to 75D.

Figure 76:
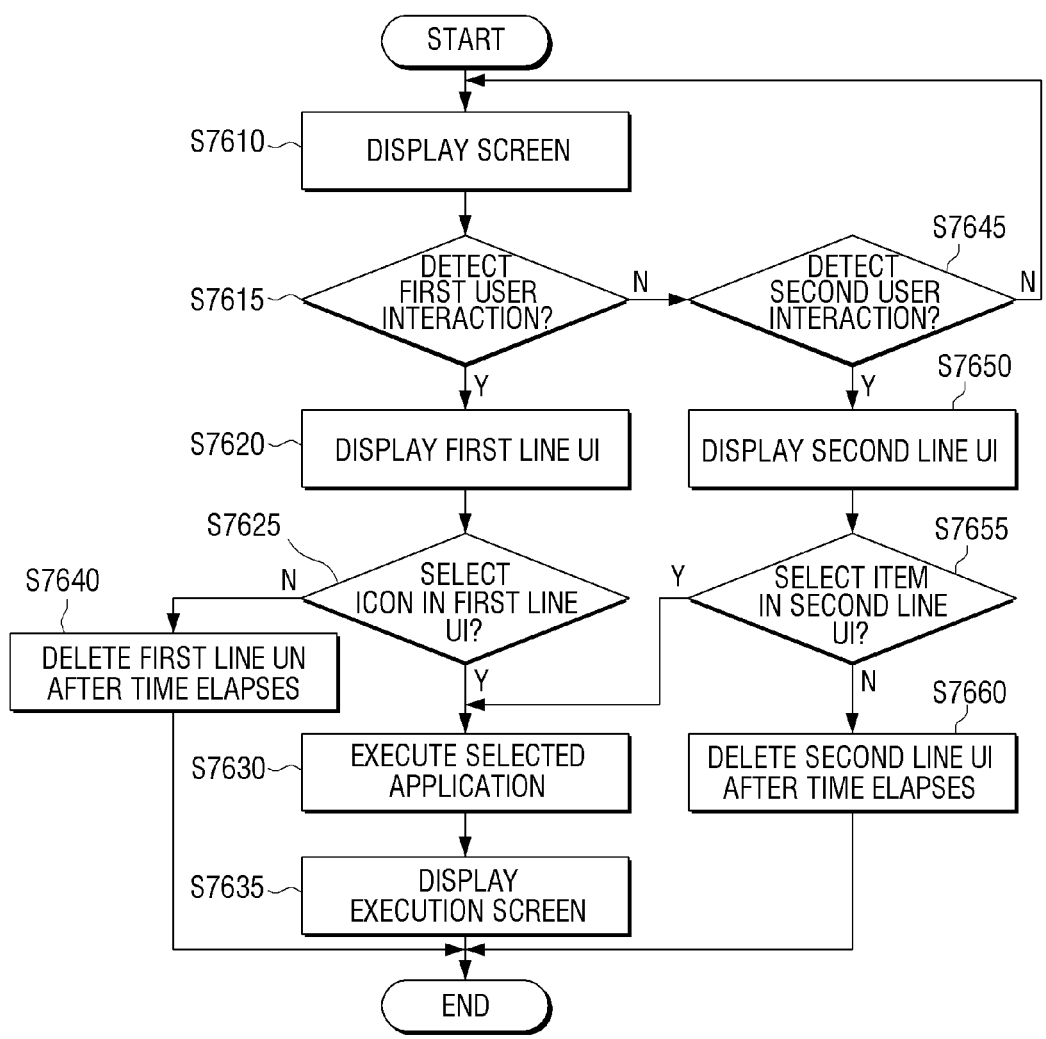
FIG. 76 is a flowchart to illustrate a method for displaying a UI of a mobile device which provides a line UI according to an embodiment of the present disclosure.

FIG. 76 is a flowchart to illustrate a method for displaying a UI of a mobile device which provides a line UI according to an embodiment of the present disclosure. For example, FIG. 76 is a flowchart to illustrate a method for displaying a UI of a mobile device according to the embodiments of the present disclosure illustrated in FIGS. 71 to 75 according to an embodiment of the present disclosure.

Referring to FIG. 76, at operation S7610, the mobile device displays a screen.

When the mobile device displays various screens such as a home screen, a desktop screen, an application execution screen, and the like at operation S7610, the mobile device determines whether a user interaction is detected. The user interaction may include various manipulations such as touching the screen and dragging or flicking, rotating or tilting a body wearing the mobile device, inputting a voice command, making a motion gesture, pressing a button, and the like. For example, at operation S7615, the mobile device determines whether a first user interaction is detected.

When the mobile device determines that a predetermined first user interaction is detected at operation S7615, the mobile device proceeds to operation S7620 at which the mobile device displays a first line UI. Thereafter, the mobile device proceeds to operation S7625.

In contrast, when the mobile device determines that a first user interaction is not detected at operation S7615, then the mobile device proceeds to operation S7645 at which the mobile device determines whether a second user interaction is detected.

When the mobile device determines that a predetermined second user interaction is detected at operation S7645, the mobile device proceeds to operation S7650 at which the mobile device displays a second line UI. Thereafter, the mobile device proceeds to operation S7655.

In the above-described embodiment of the present disclosure, the first line UI is a UI for displaying an application icon and the second line UI is an UI for displaying execution record information in chronological sequence. However, the first and second line UIs are not limited to such examples. For example, the first and second line UIs may be implemented by using various UIs, such as a UI displaying execution record information in chronological sequence, a UI displaying preferred application information, and a UI indicating an executable content.

At operation S7625, the mobile device determines whether an icon in a first line UI is selected.

When the first line UI is displayed and the mobile device determines that the user selects one of the icons at operation S7625, the mobile device proceeds to operation S7630 at which the mobile device executes an application corresponding to the selected icon. Thereafter, the mobile device proceeds to operation S7365.

At operation S7635, the mobile device displays an execution screen of the application.

In contrast, when the mobile device determines that an icon in the first line UI is not selected at operation S7325, then the mobile device proceeds to operation S7640 at which the mobile device deletes the first line UI after a predetermined time elapses.

At operation S7655, the mobile device determines whether an item (e.g., information) in a second line UI is selected.

When the second line UI is displayed and the mobile device determines that the user selects an item (e.g., information) at operation S7655, the mobile device proceeds to operation S7360 at which the mobile device executes an application corresponding to the selected information. Thereafter, the mobile device proceeds to operation S7635 at which the mobile device displays a screen of the application. In this case, the selected information may be directly displayed on an application execution screen.

In contrast, when the mobile device determines that an item (e.g., information) in the second line UI is not selected at operation S7655, then the mobile device proceeds to operation S7660 at which the mobile device deletes the second line UI after a predetermined time elapses.

In the above-described embodiment of the present disclosure, the first line UI is displayed as an icon UI and the second line UI is displayed as an execution record UI. However, according to various embodiment of the present disclosure, the first and second line UIs may be displayed differently according to a state of the mobile device at a time when the first and second user interactions occur.

For example, when the standby screen or the home screen is displayed and the first user interaction occurs, the controller 120 displays an application icon in the first line UI, and, when the second user interaction occurs, the controller 120 displays execution record information in the second line UI. In contrast, when a music application is executed and the first user interaction occurs, the controller 120 may display content information selectable by the user in the first line UI and display content information that has been previously played back by the user in the second line UI. When a run management application is executed, the first line UI may display information on friends and the second line UI may display previous running records.

Also, in the above-described various embodiments of the present disclosure, the UI of the line type is opened from the left or right edge. However, the shape and the display direction of the UI are not limited to this. For example, the UI may be opened from the upper or lower edge or may be expanded from the center.

As described above, the mobile device may provide various UIs suitable for the bangle shape and the UI may be changed according to a user interaction suitable for the shape of the mobile device. Accordingly, the user can use various applications effectively while easily carrying the mobile device.

The configuration of the mobile device according to the various embodiments of the present disclosure described in relation to FIGS. 52 to 76 may be implemented by configurations of the mobile device disclosed in the descriptions of FIGS. 1 to 51 or a combination thereof.

For example, the mobile device may include a storage 130, 3320, a display 110, 3310 formed on an outer surface of the mobile device seamlessly and displaying an execution screen of an application stored in the storage 130, 3320 on a whole display area, a sensor (at least one of sensors 174 and 140) to detect a user interaction, and a controller 120, 3330 to change a part of the screen displayed on a visible area of the whole display area in the execution screen according to a user interaction.

In addition, the mobile device may include a storage 130, 3320 to store a pre-installed application, a sensor (at least one of sensors 174 and 140) to detect a user interaction, a display 110, 3310, and a controller 120, 3330 to display a first line UI on a first edge of a screen of the display when a first user interaction is detected, and display a second line UI on a second edge of the screen of the display when a second user interaction is detected.

In addition, the mobile device may be implemented by using a device including an overall configuration as explained in FIG. 32.

According to various embodiments of the present disclosure, the control method, the screen display method, and the UI display method may be coded as software and may be stored in a non-transitory computer readable medium. The non-transitory computer readable medium may be connected to or mounted in various types of mobile devices as described above, and may support the corresponding device to perform the above-described methods.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a Digital Versatile disk (DVD), a hard disk, a Blu-ray disk, a Universal Serial Bus (USB), a memory card, and a Read Only Memory (ROM), and may be provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A mobile device comprising:
   a flexible display;
   a bending sensor configured to detect a bending state of the flexible device;
   a storage configured to store control information which is differently set according to the detected bending state of the flexible display; and
   a controller configured to control the flexible display according to the detected bending state of the flexible display,
   wherein, if the flexible display is in a flat state, the controller controls to deactivate the flexible display, and wherein, if the flexible display is changed to be curved while the flexible display is deactivated, the controller controls to activate the flexible display.

2. The mobile device of claim 1,
wherein, when the mobile device is moved in a first direction while a content is being played back, the controller changes a screen to a previous content playback screen, and
wherein, when the mobile device is moved in a second direction opposite to the first direction, the controller changes the screen to a next content playback screen.

3. The mobile device of claim 1,
wherein, when the mobile device is moved in a first direction, the controller changes a screen to a zoom-out screen, and
wherein, when the mobile device is moved in a second direction opposite to the first direction, the controller changes the screen to a zoom-in screen.

4. The mobile device of claim 1, wherein the controller performs at least one of operations of changing a content, zooming in/zooming out, changing a screen arrangement direction, activating the flexible display, deactivating the flexible display, turning off, turning on, unlocking, authenticating and selecting an application, according to a motion detected by a motion sensor.

5. The mobile device of claim 1,
wherein, when a detecting result of the bending sensor satisfies a predetermined non-use condition, the controller deactivates the flexible display, and
wherein, when a detecting result of the bending sensor satisfies a predetermined use condition, the controller activates the flexible display.

6. The mobile device of claim 1, further comprising a camera configured to capture,
wherein, when a detecting result of the bending sensor satisfies a predetermined condition while the mobile device is in a locked state, the controller controls the camera to perform capture, and
wherein, when a user is recognized in a captured image, the controller performs an unlock operation.

7. The mobile device of claim 1,
wherein the mobile device comprises a body which is made of a flexible material such that the body is wound around the user body,
wherein the flexible display is formed on an entire surface of one side of the body, and
wherein, when one end of the body is unfolded while the body is worn on the user body, the controller displays a key pad on a display area provided on the one end.

8. The mobile device of claim 1, wherein the mobile device further comprises:
a cushion provided on an inner surface of a body of the mobile device; and
an air driver configured to:
expand the cushion and bring the cushion into close contact with the user body when the mobile device is worn on the user body, and
when a command to remove the mobile device is input, contract the cushion into an original state.

9. The mobile device of claim 1, further comprising a body which is comprised of a flexible band, and
wherein the flexible display, the bending sensor, and the controller are an integrated module which is mountable in or dismountable from the body.

10. The mobile device of claim 1,
wherein, when a predetermined event occurs, the controller displays a list user interface (UI) in which an application item corresponding to each application stored in the storage is arranged,
wherein the controller displays an execution screen of an application corresponding to at least one of the application items on a display location of the corresponding application item in the list UI, and
wherein the controller controls the flexible display to change a display state of the list UI according to a user manipulation.

11. The mobile device of claim 10,
wherein, when a first user manipulation is performed in a direction parallel to an arrangement direction of the item in the list UI, the controller rotates the list UI according to the direction of the first user manipulation and changes the execution screen of the application to an execution screen of another application, and
wherein, when a second user manipulation is performed in a direction perpendicular to the arrangement direction on the execution screen of the application, the controller changes a content displayed on the execution screen of the application according to the direction of the second user manipulation.

12. A mobile device comprising:
a body of a wearable bangle type;
a flexible display disposed on at least one area of a surface of the body and rotatable on the body;
a bending sensor configured to detect a bending state of the flexible display;
a storage configured to store control information which is differently set according to the detected bending state of the flexible display; and
a controller configured to control the flexible display according to the detected bending state of the flexible display detected by the bending sensor,
wherein, if the flexible display is in a flat state, the controller controls to deactivate the flexible display, and
wherein, if the flexible display is changed to be curved while the flexible display is deactivated, the controller controls to activate the flexible display.

13. The mobile device of claim 12, wherein the body comprises:
a first part in which the flexible display is mounted;
a second part;
first protrusions formed on the first part so as to be spaced a predetermined distance apart from one another; and
second protrusions formed on the second part to be engaged with the first protrusions, and configured to support the first part to slide along an outer surface of the second part in phases,
wherein, when the first part slides along the second part and is rotated, the controller displays a screen corresponding to a sliding phase.

14. The mobile device of claim 12, wherein the controller performs at least one of operations of changing a content, zooming in, zooming out, changing a screen arrangement direction, activating the flexible display, deactivating the display, turning off, turning on, unlocking, authenticating, and selecting an application, according to a motion detected by a motion sensor.

15. The mobile device of claim 12,
wherein, when a predetermined event occurs, the controller displays a list user interface (UI) in which an application item corresponding to each application stored in the storage is arranged,
wherein the controller displays an execution screen of an application corresponding to at least one of the application items on a display location of the corresponding application item in the list UI, and wherein the controller changes a display state of the list UI according to a rotation state of the flexible display.

16. The mobile device of claim 15, wherein, when a first user manipulation is performed in a direction parallel to an arrangement direction of the item in the list UI, the controller rotates the list UI according to the direction of the first user manipulation and changes the execution screen of the application to an execution screen of another application, and wherein, when a second user manipulation is performed in a direction perpendicular to the arrangement direction on the execution screen of the application, the controller changes a content displayed on the execution screen of the application according to the direction of the second user manipulation.

17. A method for controlling a mobile device, the method comprising:

detecting a bending state of a flexible display of the mobile device; and changing a screen displayed on the flexible display according to the detected bending state, wherein, if the flexible display is in a flat state, a controller controls to deactivate the flexible display, and wherein, if the flexible display is changed to be curved while the flexible display is deactivated, the controller controls to activate the flexible display.

18. The method of claim 17, wherein the changing of the screen comprises:

when the flexible display is moved in a first direction while a content is being played back, changing the screen to a previous content playback screen; and when the flexible display is moved in a second direction opposite to the first direction, changing the screen to a next content playback screen.

19. The method of claim 17, wherein the changing of the screen comprises:

when the flexible display is moved in a first direction, changing the screen to a zoom-out screen; and when the flexible display is moved in a second direction opposite to the first direction, changing the screen to a zoom-in screen.

20. The method of claim 17, wherein the method further comprises:

performing at least one of operations of changing a content, zooming in/zooming out, changing a screen arrangement direction, activating the flexible display, deactivating the flexible display, turning off, turning on, unlocking, authenticating and selecting an application, according to a detected motion, and wherein the detected motion comprises at least one of a rotation motion of the flexible display rotating around an outer circumference of the body, and a moving motion of the mobile device.

21. The method of claim 17, further comprising:

capturing an image;

determining a user position using at least one of a result of the capturing and a motion of the mobile device; and performing a control operation corresponding to the determined user position.

22. The method of claim 17, further comprising:

when a motion state of the mobile device satisfies a predetermined non-use condition, deactivating the flexible display; and when a motion state of the mobile device satisfies a predetermined use condition, activating the flexible display.

23. The method of claim 17, further comprising:

when a predetermined event occurs, displaying a list user interface (UI) in which an application item corresponding to each application pre-stored and displaying an execution screen of an application corresponding to at least one of the application items on a display location of the corresponding application item in the list UI; and changing a display state of the list UI according to a user manipulation.

24. A non-transitory computer-readable storage medium storing instructions that, when executed, cause at least one processor to perform the method of claim 17.

25. A method for controlling a mobile device, the method comprising:

detecting a bending state of a flexible display of the mobile device; and controlling an operation of the mobile device according to the detected bending state, wherein, if a body of the flexible display is in a flat state, a controller controls to deactivate the flexible display, and wherein, if the body of the flexible display is changed to be curved while the flexible display is deactivated, the controller controls to activate the flexible display.

* * * * *